(12) United States Patent
Harada et al.

(10) Patent No.: US 9,850,335 B2
(45) Date of Patent: *Dec. 26, 2017

(54) COPOLYMER, AQUEOUS INK, AND INK CARTRIDGE

(71) Applicant: RICOH COMPANY, LTD., Tokyo (JP)

(72) Inventors: Shigeyuki Harada, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP); Tomoyuki Shimada, Shizuoka (JP); Yoshiki Yanagawa, Shizuoka (JP); Akiyoshi Sabu, Shizuoka (JP); Akihiko Matsuyama, Shizuoka (JP); Takuya Yamazaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 14/800,064

(22) Filed: Jul. 15, 2015

(65) Prior Publication Data
US 2016/0017075 A1    Jan. 21, 2016

(30) Foreign Application Priority Data

| Jul. 16, 2014 | (JP) | 2014-145583 |
| Oct. 3, 2014 | (JP) | 2014-204560 |
| Mar. 12, 2015 | (JP) | 2015-049114 |
| May 14, 2015 | (JP) | 2015-099036 |

(51) Int. Cl.
C08F 220/34   (2006.01)
C08F 220/36   (2006.01)
C08F 222/10   (2006.01)
C09D 11/322   (2014.01)
C09D 11/38    (2014.01)
C09D 11/107   (2014.01)

(52) U.S. Cl.
CPC .......... *C08F 222/10* (2013.01); *C08F 220/36* (2013.01); *C09D 11/107* (2013.01); *C09D 11/322* (2013.01); *C09D 11/38* (2013.01)

(58) Field of Classification Search
CPC . C08F 220/36; C08F 2220/365; C08F 222/10
See application file for complete search history.

(56) References Cited

U.S. PATENT DOCUMENTS

| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |

FOREIGN PATENT DOCUMENTS

| CN | 101117468 A | 2/2008 |
| EP | 1 932 894 A1 | 6/2008 |
| EP | 2 295 511 A1 | 3/2011 |
| EP | 2 754 679 A1 | 7/2014 |
| JP | 3-160068 | 7/1991 |
| JP | 5-306309 | 11/1993 |
| JP | 2002-167537 A | 6/2002 |
| JP | 2003-147243 | 5/2003 |
| JP | 2005-298802 | 10/2005 |

(Continued)

OTHER PUBLICATIONS

Extended European Search Report dated Nov. 18, 2015 in Patent Application No. 15176588.0.

(Continued)

*Primary Examiner* — Karuna P Reddy
(74) *Attorney, Agent, or Firm* — Oblon, McClelland, Maier & Neustadt, L.L.P.

(57) ABSTRACT

A copolymer includes a structure unit represented by Chemical Formula I; and a structure unit represented by Chemical Formula II,

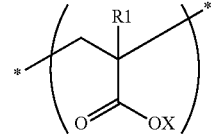

Chemical Formula I

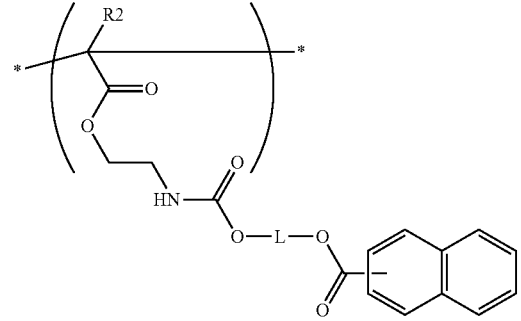

Chemical Formula II where $R_1$ and $R_2$ each, independently represent hydrogen atoms or methyl groups, X represents a hydrogen atom or a cation, and L represents an alkylene group having 2 to 18 carbon atoms.

13 Claims, 4 Drawing Sheets

(56) References Cited

FOREIGN PATENT DOCUMENTS

| JP | 2006-147202 | 6/2006 |
|---|---|---|
| JP | 2006-188624 | 7/2006 |
| JP | 2007-186604 | 7/2007 |
| JP | 2008-143920 | 6/2008 |
| JP | 2008-536963 | 9/2008 |
| JP | 2009-513802 | 4/2009 |
| JP | 2011-105866 | 6/2011 |
| JP | 2012-051357 | 3/2012 |
| JP | 2012-052027 | 3/2012 |
| JP | 2012-198527 | 10/2012 |
| JP | 2013-040323 | 2/2013 |
| JP | 2015-117354 | 6/2015 |
| KR | 10-1211839 B1 | 12/2012 |
| WO | WO2006/099551 A2 | 9/2006 |
| WO | WO2007/053563 A2 | 5/2007 |

OTHER PUBLICATIONS

U.S. Appl. No. 14/793,981, filed Jul. 8, 2015, Harada, et al.
U.S. Appl. No. 14/793,981, filed Jul. 8, 2015 Inventor: Harada, et al.
Combined Office Action and Search Report dated Aug. 2, 2017 in Chinese Patent Application No. 201610021410.3 (with English translation of category of cited document).

COPOLYMER, AQUEOUS INK, AND INK CARTRIDGE

CROSS-REFERENCE TO RELATED APPLICATIONS

This patent application is based on and claims priority pursuant to 35 U.S.C. §119(a) to Japanese Patent Application Nos. 2014-145583, 2014-204560, 2015-049114, and 2015-099036, filed on Jul. 16, 2014, Oct. 3, 2014, Mar. 12, 2015, and May 14, 2015, respectively, in the Japan Patent Office, the entire disclosures of which are hereby incorporated by reference herein.

BACKGROUND

Technical Field

The present invention relates to a copolymer, an aqueous ink, and an ink cartridge.

Background Art

Inkjet recording methods are advantageous in comparison with other recording methods in that since the process is simple, full colorization is easy and high definition images can be obtained by a device having a simple configuration. For this reason, the inkjet recording is widely diffusing from home use to office use, commercial printing, and industrial printing. In such an inkjet recording, aqueous ink compositions using water soluble dye as coloring materials are mainly used. However, its water resistance and light resistance are inferior so that the development of a pigment ink using a water insoluble pigment is in advance in place of the water soluble dye.

For inkjet ink printing for office use, recording media, typically plain paper, are used and high image density is demanded. In general, when images are printed on plain paper using a pigment ink, the pigment ink does not stay on the surface of the paper but permeates into the paper, so that the pigment density on the surface decreases and consequently the image density lowers. As the pigment concentration in the ink increases, the image density increases. However, the ink becomes viscous, thereby degrading the discharging stability of the ink.

Moreover, water contained in the pigment ink swells the surface of plain paper immediately after the ink droplets land on the paper. As a result, the extension percentage differs between the top surface and the bottom surface of the paper, thereby causing the paper to curl. This kind of phenomenon does not create a problem at low speed printing since curling is canceled as drying proceeds. However, as the printing speed increases, recording media are transferred before curling is canceled after printing, which naturally leads to occurrence of paper jam. To prevent paper jam, it is suitable to add a permeating agent to a pigment ink to promote water to permeate into paper. However, ink becomes hydrophobic by the agent, which makes it difficult to secure storage stability of the ink. Also, the pigment ink more easily permeates into a recording medium, thereby furthermore decreasing the image density.

SUMMARY

According to the present disclosure, provided is an improved copolymer including a structure unit represented by Chemical Formula I and a structure unit represented by Chemical Formula II.

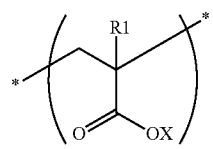

Chemical Formula I

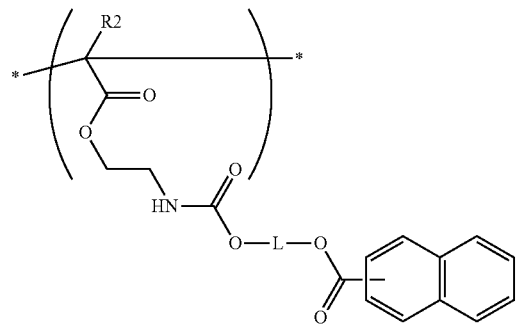

Chemical Formula II

In Chemical Formula I and Chemical Formula II, where R1 and R2 each, independently represent hydrogen atoms or methyl groups, X represents a hydrogen atom or a cation, and L represents an alkylene group having 2 to 18 carbon atoms.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
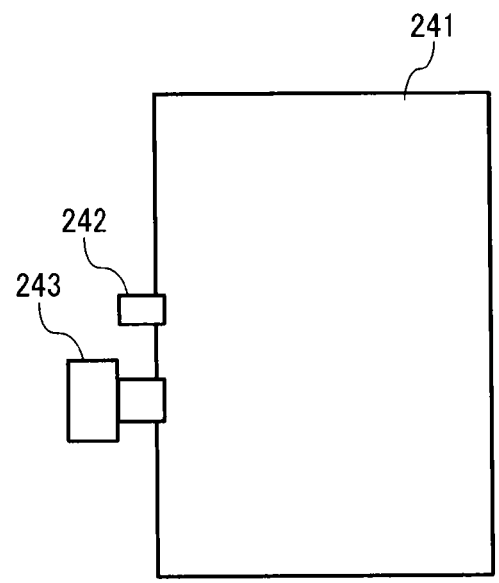
FIG. 1 is a diagram illustrating an example of the ink cartridge according to an embodiment of the present invention.

According to the present disclosure, provided are a copolymer for use in binder resins or pigment dispersion resin, an aqueous ink containing the copolymer, and an ink cartridge for the aqueous ink.

When the copolymer of the present disclosure is used as a binder resin in an aqueous ink, images having a high resolution and clarity can be formed on various recording media even at high performance.

In addition, if the copolymer of the present disclosure is used as a dispersion resin of a pigment, the obtained dispersion element of a pigment has a high level of dispersibility and is stable for a long time.

In addition, high image density is achieved by an aqueous ink even on plain paper when the aqueous ink uses the copolymer of the present disclosure. Moreover, the aqueous ink has excellent storage stability and does not cause beading even at high performance.

This copolymer has excellent storage stability, demonstrates high image density for an image recorded on plain paper using the copolymer, and is free from beading during high performance. The copolymer is suitable for use in a binder resin of an aqueous ink to obtain an image with high definition on various recording media and in a pigment dispersion resin with high level of dispersibility for a long period of time.

Embodiments of the present disclosure are described with reference to accompanying drawings.

An embodiment (embodiment 1) of the present disclosure is a copolymer including a structure unit represented by Chemical Formula I and a structure unit represented by Chemical Formula II.

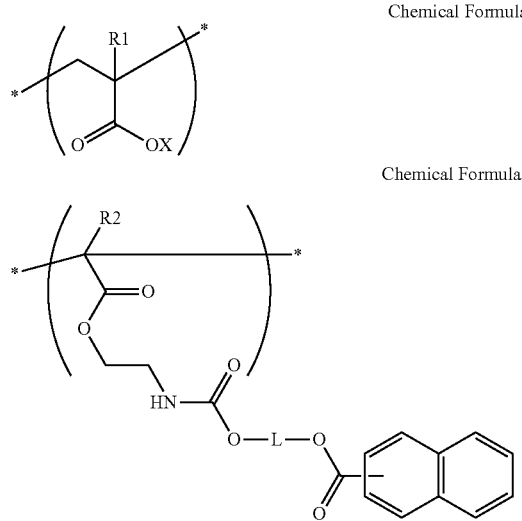

Chemical Formula I

Chemical Formula II

In Chemical Formula I and Chemical Formula II, where R1 and R2 each, independently represent hydrogen atoms or methyl groups, X represents a hydrogen atom or a cation, and L represents an alkylene group having 2 to 18 carbon atoms.

Embodiment 1 of the present disclosure described above includes the following embodiments 2 to 14 for copolymer, aqueous ink, and ink cartridge. These are also described in detail below.

2. The copolymer mentioned in 1, further comprising a structure unit represented by Chemical Formula III.

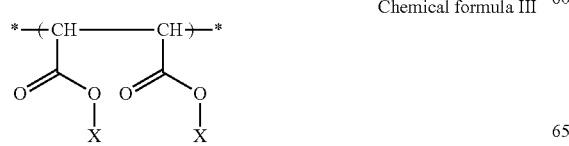

Chemical formula III

In Chemical Formula III, X each, independently represents a hydrogen atom or a cation.

3. The copolymer mentioned in 1, further including a structure unit represented by Chemical Formula IV and/or a structure unit represented by Chemical Formula V.

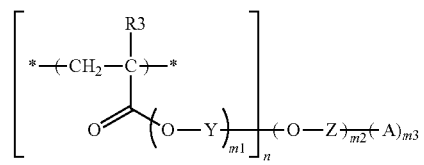

Chemical Formula IV

In Chemical Formula IV, R3 represents a hydrogen atom or a methyl group, Y represents a divalent organic group, Z represents a (n+m3) valent organic group having 1 to 15 carbon atoms, preferably from 2 to 10 carbon atoms, A represents a substituted or non-substituted monovalent alkyl group, a substituted or non-substituted monovalent aryl group, or a substituted or non-substituted monovalent heteroaryl group. A symbol n ranges from 1 to 15, preferably from 2 to 10 and m1, m2, and m3 each, independently, represent 0 or 1.

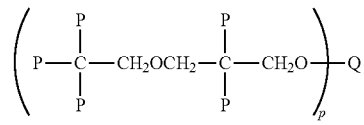

Chemical formula V

In Chemical Formula V, a symbol "P" is represented by Chemical formula VI, a symbol "Q" represents an alkylene group having one to six carbon atoms or p-valent organic group having 1 to 6 nitrogen atoms, 1 to 6 oxygen atoms, and 2 to 40 hydrogen atoms, where p represents 2 or 3.

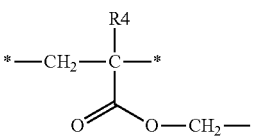

Chemical formula VI

In Chemical Formula VI, R4 represents a hydrogen atom or a methyl group.

4. The copolymer mentioned in 1, further including a structure unit represented by Chemical Formula VII.

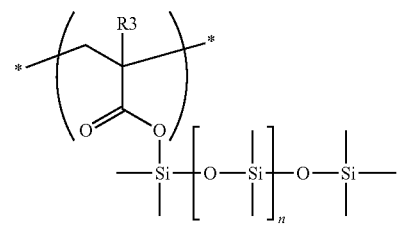

Chemical Formula VII

In Chemical Formula VII, R3 represents a hydrogen atom or a methyl group and n represents an integer of from 2 to 300.

5. The copolymer mentioned in 1, wherein the molar ratio of the structure unit represented by Chemical formula I to the structure unit represented by Chemical formula II ranges from 0.5:1 to 3:1.

6. The copolymer mentioned in 2, wherein the molar ratio of the structure unit represented by Chemical formula I to the structure unit represented by Chemical formula II to the structure unit represented by Chemical formula III ranges from 0.25 to 1.5:1:0.25 to 1.5.

7. The copolymer mentioned in 3, wherein the molar ratio of the structure unit represented by Chemical formula I to the structure unit represented by Chemical formula II to the structure unit represented by Chemical formula IV ranges from 0.5 to 3:1:0.01 to 0.15.

8. The copolymer mentioned in 4, wherein the structure unit represented by Chemical formula VII accounts for 1% by weight to 12% by weight of the total amount of the copolymer.

9. The copolymer mentioned in 1, synthesized from the compound represented by the following Chemical formula Ia and the compound represented by the following Chemical formula IIa.

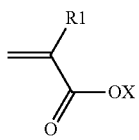

Chemical formula Ia

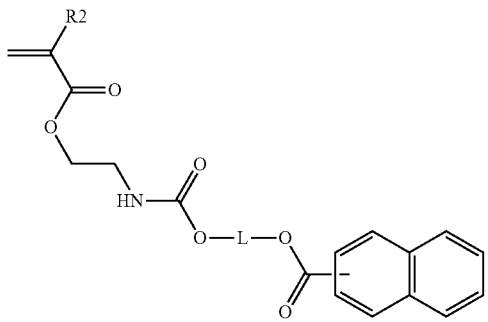

Chemical formula IIa

In Chemical formula Ia and Chemical formula IIa, R1 and R2 each, independently represent hydrogen atoms or methyl groups, X represents a hydrogen atom or a cation, and L represents an alkylene group having 2 to 18 carbon atoms.

10. The copolymer mentioned in 2, synthesized from the compound represented by the following Chemical formula Ia, the compound represented by the following Chemical formula IIa, and the compound represented by the following Chemical formula IIIa.

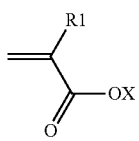

Chemical formula Ia

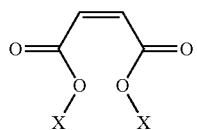

Chemical formula IIa

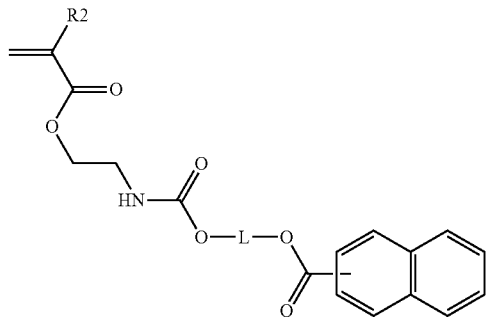

Chemical formula IIIa

In Chemical formula Ia, Chemical formula IIa, and Chemical formula IIIa, R1 and R2 each, independently represent hydrogen atoms or methyl groups, X represents a hydrogen atom or a cation, and L represents an alkylene group having 2 to 18 carbon atoms.

11. The copolymer mentioned in 3, synthesized from the compound represented by the following Chemical formula Ia, the compound represented by the following Chemical formula IIa, and the compound represented by the following Chemical formula IVa.

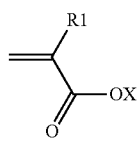

Chemical formula Ia

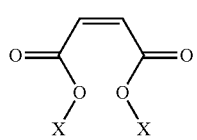

Chemical formula IIa

Chemical formula IVa

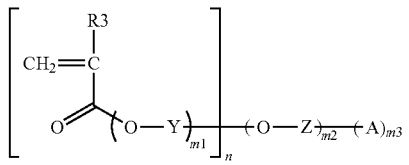

In Chemical formula Ia, Chemical formula IIa, and Chemical formula IVa, R1, R2 and R3 each, independently represent hydrogen atoms or methyl groups, X represents a hydrogen atom or a cation, and L represents an alkylene group having 2 to 18 carbon atoms. In Chemical Formula IV, Y represents a divalent organic group, a symbol "Z" represents a (n+m3) valent organic group having 1 to 15 carbon atoms, preferably from 2 to 10 carbon atoms, a symbol "A" represents a substituted or non-substituted monovalent alkyl group, a substituted or non-substituted monovalent aryl group, or a substituted or non-substituted monovalent heteroaryl group. A symbol "n" ranges from 1 to 15, preferably from 2 to 10 and symbols "m1", "m2", and "m3" each, independently, represent 0 or 1.

12. The copolymer mentioned in 4, synthesized from the compound represented by the following Chemical formula Ia, the compound represented by the following Chemical formula IIa, and the compound represented by the following Chemical formula VIIa.

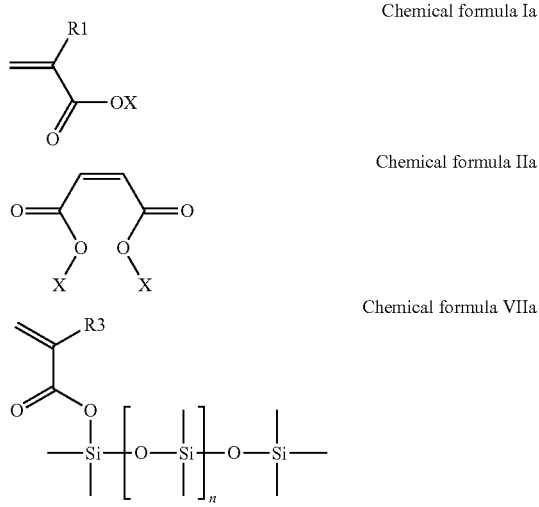

Chemical formula Ia

Chemical formula IIa

Chemical formula VIIa

In Chemical formula Ia, Chemical formula IIa, and Chemical formula VIIa, R1, R2 and R3 each, independently, represent hydrogen atoms or methyl groups, X represents a hydrogen atom or a cation, and L represents an alkylene group having 2 to 18 carbon atoms.

13. The copolymer mentioned in any one of 1 to 4, wherein L in the structure unit represented by Chemical formula II represents an alkylene group having 2 to 12 carbon atoms.

14. An aqueous ink including water, a coloring material, and the copolymer mentioned in any one of 1 to 13.

15. The aqueous ink mentioned in 14, wherein the coloring material is a pigment.

16. The aqueous ink mentioned in 14 or 15, further including one or more water soluble organic solvents and/or one or more surfactants.

17. An ink cartridge including a container accommodating the aqueous ink mentioned in any one of 14 to 16.

In addition, the present disclosure includes the following copolymer described in 18.

18. The copolymer mentioned in 3, wherein the molar ratio of the structure unit represented by Chemical formula I to the structure unit represented by Chemical formula II to the structure unit represented by Chemical formula V ranges from 0.05 to 5:1:0.05 to 5.

The copolymer of the present disclosure has the structure unit represented by the Chemical formula I and the structure unit represented by the Chemical formula II. The Chemical formula I can be said to be the structure unit of the particular portion I capable of forming a salt with Ca relatively being hydrophilic contained in paper in the anionic portion.

The structure of the Chemical formula II can be said to have a bulk group having relatively high hydrophobicity in the particular structure range. This description is only for the purpose of making the present disclosure understood better but not for limiting thereto.

Moreover, the combination of the structure unit of the Chemical structure I and the structure unit of the Chemical structure II makes it possible to strike the balance between an increase of image density and the storage stability of an ink.

Moreover, the anionic portion optionally contains the structure unit represented by the Chemical formula III in addition to the structure unit represented by the Chemical formula I.

In other words, the portion having the hydrophilic group can be said that a part of the structure unit represented by the Chemical formula I is substituted with the structure unit represented by the Chemical formula III, which is preferable. That is, the structure unit represented by the Chemical formula III has two adjacent hydrogen atoms or cations in its molecule. By this structure, when a colorant contacts paper, interaction with Ca salt contained in paper speeds up so that image density increases.

In addition, the copolymer of the present disclosure optionally has the structure unit represented by the Chemical formula IV and/or the structure unit represented by the Chemical formula V, in addition to the structure unit represented by the Chemical formula I and the structure unit represented by the Chemical formula II. The structure unit represented by the Chemical formula IV or the Chemical formula V demonstrates intermediate characteristics between the structure unit represented by the Chemical formula I and the structure unit represented by the Chemical formula II and can form bulky side-chain portions.

In addition, the copolymer of the present disclosure has the structure unit represented by the Chemical formula I, the structure unit represented by the Chemical formula II, and the structure unit represented by the Chemical formula VII.

In the Chemical formula 1 and the Chemical formula III, R represents a hydrogen atom or a methyl group, X represents a hydrogen atom or a cation. When X is a cation, the oxygen adjacent to the cation is existent as $O^-$.

Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

In the Chemical formula II, R2 represents a hydrogen atom or a methyl group. L is an alkylene group having 2 to 18 carbon atoms, preferably an alkylene group having 2 to 16 carbon atoms, and more preferably an alkylene group having 2 to 12 carbon atoms. When the number of carbon atoms is 2 to 12, the hydrophilic portion and the hydrophobic portion in the copolymer are spaced suitable distances apart so that good dispersion stability is demonstrated when used as a pigment dispersion resin.

Since a naphtyl group existing at the end via L has an excellent pigment adsorption power due to π-π stacking with pigments serving as coloring material in an aqueous ink (hereinafter referred to as ink), the pigments rapidly agglomerate on the surface of a recording medium upon contact between the group and the pigments on the recording medium so that beading can be prevented.

As described in the descriptions for the Chemical formula I, the Chemical formula II, and the Chemical formula III, the structure represented by the Chemical formula I, II, or III can form the main chain of a copolymer having a pendant group such as a naphtyl group pendulating via L or a carboxylic group in a side chain. However, this does not exclude a case in which a part is contained in a side chain.

For example, it is well known that it is difficult to completely exclude additional radical polymerization reaction that produced fork structures.

In addition, when a pigment dispersion in which a pigment is dispersed in water is prepared with the copolymer of the present disclosure, the copolymer tends to be adsorbed on the surface of the pigment due to the naphtyl group present at the end of the side chain of the copolymer so that a stable dispersion element having a good dispersibility for an extended period of time is obtained.

With regard to the copolymer described in embodiment 1, the molar ratio of the repeating unit represented by Chemical formula I and the repeating unit represented by Chemical formula II forming the copolymer of the present disclosure ranges from 0.1:1 to 10:1, preferably from 0.3:1 to 5:1, and more preferably from 0.5:1 to 3:1 in terms of the power to adsorb a pigment. If the ratio of the structure units represented by the Chemical formula I and Chemical formula II are shown in mass, it ranges from 37 percent by weight to 98 percent by weight, preferably from 54 percent by weight to 95 percent by weight, and more preferably from 66 percent by weight to 92 percent by weight.

Moreover, when the three structure units represented by the Chemical formula I, II, and III that form the copolymer of embodiment 2 are contained (i.e., a part of the structure unit represented by the Chemical formula I is substituted with the structure unit represented by the Chemical formula III), the molar ratio of Chemical formula I:Chemical formula III:Chemical formula II of the repeating unit ranges from 0.05 to 5:0.05 to 5:1, preferably 0.15 to 2.5:0.15 to 2.5:1, and more preferably 0.25 to 1.5:0.25 to 1.5:1.

Furthermore, the molar ratio I:II:IV of the structure unit represented by Chemical formula I, the structure unit represented by Chemical formula II, and Chemical formula IV forming the copolymer of embodiment 3 of the present disclosure ranges from 0.1 to 10:1:0.001 to 0.6, preferably from 0.3 to 5:1:0.01 to 0.3, and more preferably from 0.5 to 3:1:0.01 to 0.15 in terms of the power to adsorb a pigment. In addition, when the three structure units represented by the Chemical formula I, II, and V that form the copolymer of the present disclosure are contained, the molar ratio of I:II:V ranges from 0.05 to 5:1:0.05 to 5, preferably from 0.5 to 3:1:0.01 to 0.15, and more preferably from 0.25 to 1.5:1: 0.01 to 0.1 in terms of the power to adsorb a pigment.

Moreover, with regard to the copolymer of embodiment 4 of the present disclosure, in the Chemical formula VII, n represents an integer of from 2 to 300. The structure represented by the Chemical formula VII contributes to improving prevention of beading and dispersion stability when it coexists with the structure units represented by the Chemical formula I and Chemical formula II. In terms of this improvement, the structure unit represented by Chemical formula VII accounts for 1% by weight to 12% by weight of the total content of the copolymer. When the content is less than 1% by weight, the characteristics are the same as in the case containing no structure unit represented by the Chemical formula III. When the content is greater than 12% by weight, dispersion stability deteriorates to the contrary.

That is, the ratio of the structure unit represented by the Chemical formula VII to the total of the structure units represented by the Chemical formula I and II depends on the molecular weight of the structure unit represented by the Chemical formula VII, that is, n in the Chemical formula VII.

The number average molecular weight and the weight average molecular weight of the copolymer of the present disclosure preferably range from 500 to 10,000 and 1,500 to 30,000, respectively, and more preferably range from 1,000 to 10,000 and 3,000 to 30,000, respectively, in polystyrene conversion.

The copolymer of the present disclosure optionally contains a structure unit formed of another polymerizable monomer in addition to the structure units represented by the Chemical formula I and II (in the case of the copolymer described in embodiment 1), the structure units represented by the Chemical formula I, II, and at least one of the structure unit represented by the Chemical formula IV and the structure units represented by the Chemical formula V (in the case of the copolymer described in embodiment 3), or the structure units represented by the Chemical formula I, II, and VII (in the case of the copolymer described in embodiment 4).

There is no specific limit to such other polymerizable monomers. These can be selected to particular applications. Examples thereof are polymerizable hydrophobic monomers, polymerizable hydrophilic monomers, and polymerizable surfactants.

Specific examples of the hydrophobic monomers include, but are not limited to, unsaturated ethylene monomers having aromatic ring such as styrene, α-methyl styrene, 4-t-butyl styrene, and 4-chloromethyl styrene; (meth)acrylic acid alkyl such as methyl (meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth) acrylate (C16), heptadecyl(meth)acrylate (C17), nonadecyl (meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination of two or more thereof.

Specific examples of the polymerizable hydrophilic monomers include, but are not limited to, anionic unsaturated ethylene monomers such as maleic acid or salts thereof, monomethyl maleate, itaconic acid, monomethyl itaconate, fumaric acid, 4-styrene sulfonic acid, 2-acrylic amide-2-methyl propane sulfonic acid, or anionic unsaturated ethylene monomers having phosphoric acid, phosphonic acid, alendronic acid, or etidronic acid; and nonionic unsaturated ethylene monomers such as 2-hydroxyethyl (meth)acrylic acid, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

With regard to the copolymer described in embodiments 1 and 2, one or more kinds of the polymerizable surfactants are mixed and the mixture accounts for 5 percent by weight to 100 percent by weight of the total of the monomers forming the structure unit of the Chemical formula I and the structure unit of the Chemical formula II or the total of the monomers forming the structure unit of the Chemical formula I, the structure unit of the Chemical formula II, and the structure unit of the Chemical formula III.

This is true in the case containing the copolymer containing the structure unit of the structure unit of the Chemical formula I, the structure unit of the Chemical formula II, and the structure unit of the Chemical formula III (the copolymer described in embodiment 2), the case containing the copolymer containing the structure unit of the structure unit of the Chemical formula I, the structure unit of the Chemical formula II, and at least one of the structure unit of the Chemical formula IV and the structure unit of the Chemical formula V (the copolymer described in embodiment 3), and the case containing the copolymer containing the structure unit of the Chemical formula I, the structure unit of the Chemical formula II, and the structure unit of the Chemical formula VII (the copolymer described in embodiment 4).

The polymerizable surfactant is an anionic or nonionic surfactant having at least one radically-polymerizable unsaturated double bond group in its molecule.

Specific examples of the anionic surfactant include, but are not limited to, a hydrocarbon compound having a sulfate salt group such as ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacylic group [($-CO-C(CH_3)=CH_2$], and an aromatic hydrocarbon compound having a sulfate group such as ammonium sulfate group ($-SO_3-NH_4^+$) and a 1-propenyl group ($-CH=CH_2CH_3$). Specific examples thereof include, but are not limited to, ELEMINOL JS-20 and RS-300 (both manufactured by Sanyo Chemical Industries, Ltd. and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_n-H$].

Specific examples thereof include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

With regard to the copolymer described in embodiments 1 and 2, one or more kinds of the polymerizable surfactants are mixed therewith and the mixture accounts for 0.1 percent by weight to 10 percent by weight of the total of the monomers forming the structure unit of the Chemical formula I and the structure unit of the Chemical formula II or the total of the monomers forming the structure unit of the Chemical formula I, the structure unit of the Chemical formula II, and the structure unit of the Chemical formula III.

The copolymer of the present disclosure having the structure unit of the Chemical formula I and the structure unit of the Chemical formula II is prepared as, for example, in the following chemical reaction formulae 1, 2, and 3: first, naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, 2-methacryloyloxy ethylisocyanate (A-3) and (A-2) are caused to react to obtain a monomer (A-4). Thereafter, under the presence of a radical polymerization initiator, (A-4) was copolymerized with (meth)acrylic monomer (A-5) to obtain the copolymer (A-6) of the present disclosure. The weight average molecular weight of the monomer (A-4) is from 357 to 596 because L in the Chemical formula 2 is an alkylene group having 2 to 18 carbon atoms and R2 is a hydrogen atom or a methyl group.

Chemical reaction formula 1

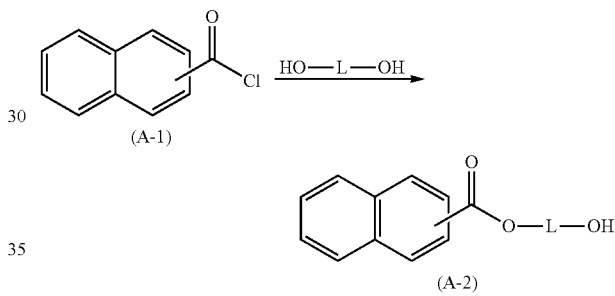

Chemical reaction formula 2

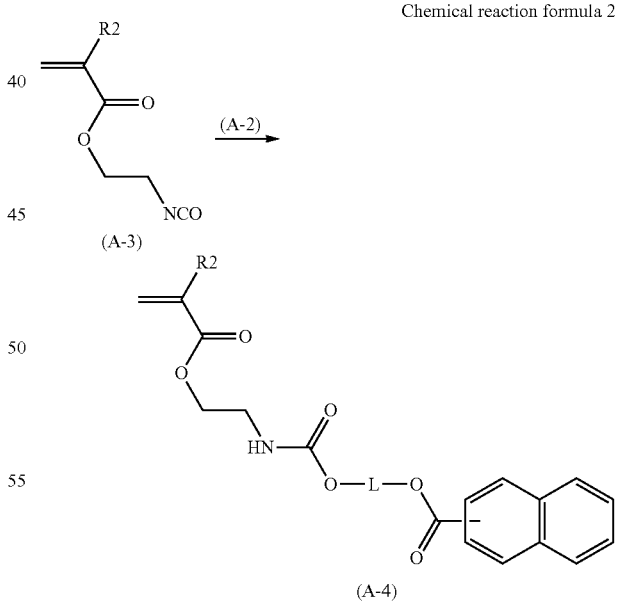

Chemical reaction formula 3

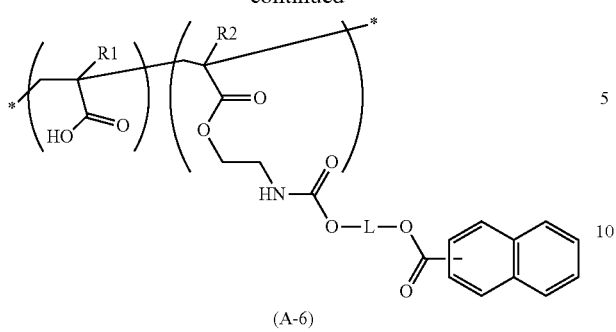

(A-6)

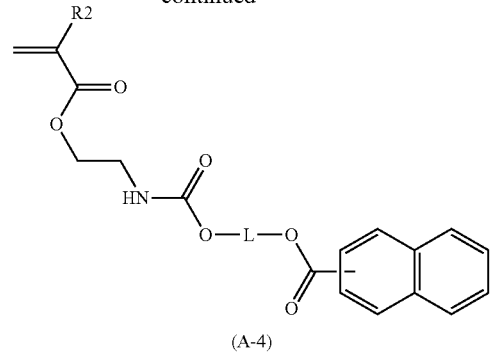

(A-4)

The copolymer described in the embodiment 2 of the present disclosure which contains the structure unit of the Chemical formula I, the structure unit of the Chemical formula II, and the structure unit of the Chemical formula III is prepared as in the following chemical reaction formulae 1, 2, and 4: first, naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, 2-methacryloyloxy ethylisocyanate (A-3) and (A-2) are caused to conduct reaction to obtain a monomer (A-4). Thereafter, under the presence of a radical polymerization initiator, (A-4) was caused to conduct copolymerization with (meth)acrylic monomer (A-5) and maleic acid (A-7) to obtain the copolymer (A-8) of the present disclosure.

Instead, for example, the copolymer (A-8) of the present disclosure can be obtained in a modified manner such that: (meth)acrylic acid monomer (A-5) of Chemical formula Ia and (meth)acrylic acid monomer having an isocyanate group, and maleic acid (A-7) of Chemical formula IIIa are copolymerized in the reaction condition free from active hydrogen groups and thereafter naphthalene carboxylic acid hydroxyalkylester (A-2) are added to the thus-obtained copolymer.

Chemical reaction formula 1

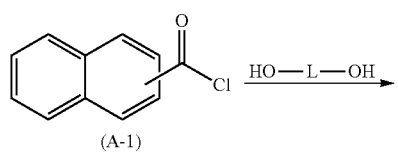

Chemical reaction formula 2

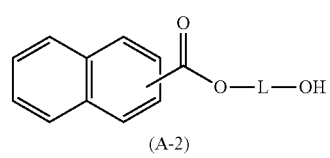

Chemical reaction formula 4

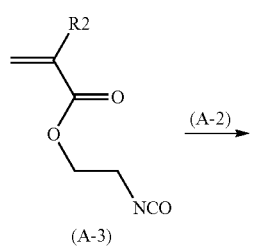

The structure unit represented by the Chemical formula IV can be introduced in the same manner as in the introduction of the structure unit represented by the Chemical formula II and the structure unit represented by the Chemical formula VII using bi- or more functional (meth)acrylic monomers.

In the structure unit represented by the Chemical formula IV, diol is suitably used to form an optionally contained side chain polyester portion (—YO— portion in the structure unit represented by the Chemical formula IIV)

In this case, Z has 1 to 15 carbon atoms and preferably 2 to 10. To form $—(Z)_{m2}$ portion, it is suitable to use, for example, three- or more functional polyhydroxy compound $[(HO)_{m2-1} Z]$.

In addition, examples of Z as the (n+m3) valent organic group are 2 to 6 valent substituted or non-substituted aliphatic hydrocarbon groups having 1 to 15 carbon atoms, substituted or non-substituted acicyclic hydrocarbon groups, and substituted or non-substituted heterocyclic groups.

To form $—(Z)_{m2}$ portion in the structure unit represented by the Chemical formula IV, it is suitable to use, for example, three- or more functional polyhydroxy compound $[(HO)_{m2-1} Z]$.

Specific examples of such diols include, but are not limited to, in addition to alkylene diol such as 1,2-ethane diol (ethylene glycol: $HO—CH_2—CH_2OH$), 1,3-propane diol, 1,4-butane diol ($HO—(CH_2)_4OH$), 1,6-hexane diol, 1,octane diol ($HO—(CH_2)_8OH$), 1,12-dodecane diol, and 1,18-octaethylene diol ($HO(CH_2)_{18}OH$), (poly)alkylene glycol such as glycerin aliphatic acid monoesters, glycerin monoalkylethers, diethylene glycol (HO—CH$_2$CH$_2$OCH$_2$CH$_2$OH), triethylene glycol (HO—CH$_2$CH$_2$OCH$_2$CH$_2$OCH$_2$CH$_2$OH), low molecular weight polyethylene glycol, and dipropylene glycol as alkylene oxide derivatives, adducts of alkylene oxide of glycerin aliphatic monoesters, and dioxy residual group of ω, ω' type diol as bisphenol residual groups such as adducts of bisphenol A with ethylene oxide (HO(CH$_2$CH$_2$O)n$_1$C$_6$H$_4$C(Me)$_2$C$_6$H$_4$(OCH$_2$CH$_2$)n$_2$OH), bisphenol A (HOC$_6$H$_4$C(Me)$_2$C$_6$H$_4$OH), bisphenol F (HOC$_6$H$_4$CH$_2$C$_6$H$_4$OH), bisphenol E (HOC$_6$H$_4$CH(CH$_3$)C$_6$H$_4$OH, bisphenol AF (HOC$_6$H$_4$C(CF$_3$)$_2$C$_6$H$_4$OH), bisphenol B (HOC$_6$H$_4$C(Me)(Et)C$_6$H$_4$OH), bisphenol S (HOC$_6$H$_4$SO$_2$C$_6$H$_4$OH). Of these, alkylene groups having 2 to 15 carbon atoms and polyoxyalkylene group are preferable and alkylene groups having 2 to 6 carbon atoms are particularly preferable.

In addition, specific example of the polyhydroxy compounds include, but are not limited to, triol, tetraol, heptaol, and hexaol. As triol, for example, trimethylol propane, glycerin, and trimethylol isocyanuric acid are suitably used.

As tetraol, for example, ditrimethylol propane, pentaerythriol, trihydrocyethylated pentaerythritol (HOCH$_2$C≡(CH$_2$OC$_2$H$_4$OH)$_3$, and hexane-1,2,5,6-tetraol are suitable.

As pentaol, for example, arabitol, xylitol, ribitol, and biphenyl pentaol are suitable.

There is no specific limit to the selection of the radical polymerization initiator. The radical polymerization initiator can be selected to particular applications.

Specific examples thereof include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrike), azobis(2,2'-isovaleronitrile), and non-cyano-based dimethyl-2,2'azobis isobutylate. Of these, organic peroxides and azo-based compounds are preferable and azo compounds are particularly preferable in terms of easiness of molecular weight control and low resolution temperature.

The copolymer (described in the embodiment 4) of the present disclosure is prepared as in the following chemical reaction formulae 1, 2, and 5: first, naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, 2-methacryloyloxy ethylisocyanate (A-3) and (A-2) are caused to react to obtain a monomer (A-4). Thereafter, under the presence of a radical polymerization initiator, (A-4) was caused to conduct copolymerization with (meth)acrylic monomer (A-5) and acrylic silicone monomer (A-9) to obtain the copolymer (A-10) of the present disclosure.

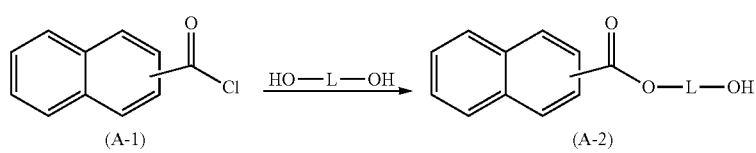

Chemical reaction formula 1

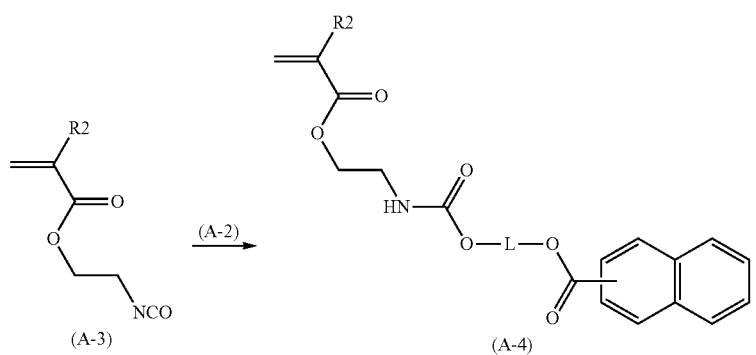

Chemical reaction formula 2

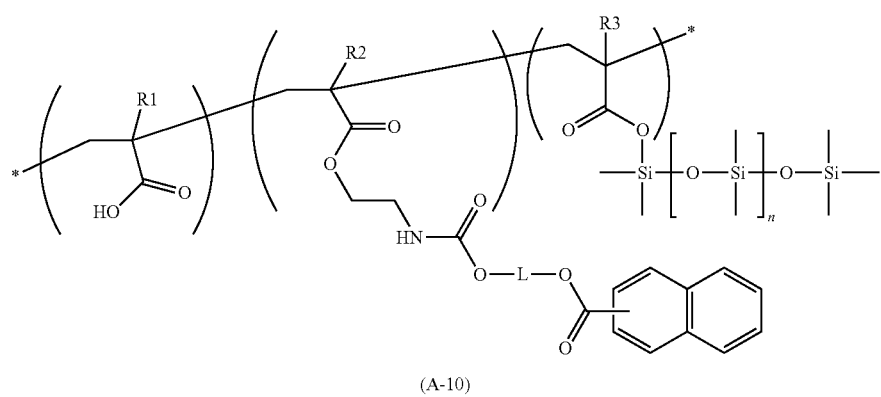

Chemical reaction formula 5

As hexaol, for example, dipentaerythritol and adducts of dipentaerythritol with ethylene oxide are suitable.

There is no specific limit to the selection of the radical polymerization initiator. The radical polymerization initiator can be selected to particular applications. Specific examples thereof include, but are not limited to, peroxy ketal, hydroperoxide, dialkyl peroxide, diacylperoxide, peroxydicarbonate, peroxyester, cyano-based azobisisobutylonitrile, azobis (2-methylbutylonitrike), azobis(2,2'-isovaleronitrile), and non-cyano-based dimethyl-2,2'azobis isobutylate. Of these, organic peroxides and azo-based compounds are preferable and azo compounds are particularly preferable in terms of easiness of molecular weight control and low dissolution temperature.

In addition, there is no specific limit to the content of the radical polymerization initiator and the content can be determined to a particular application. The content thereof is preferably from 1% by weight to 10 by weight based on the total amount of the polymerizable monomer.

To control the molecular weight of the copolymer, a chain transfer agent is optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

There is no specific limit to the polymerization temperature. The polymerization temperature is selected to a particular application. It is preferably from 50 degrees C. to 150 degrees C. and more preferably from 60 degrees C. to 100 degrees C. There is no specific limit to the polymerization time. The polymerization time can be suitably selected to a particular application. It is preferably from 3 hours to 48 hours.

Pigments and dyes can be used as the coloring material for the aqueous ink of the present disclosure. With regard to the adsorption power of the copolymer for a coloring material, pigments are superior to dyes. Moreover, pigments are preferable in terms of water resistance and light resistance.

There is no specific limit to the selection of pigments. These can be selected to particular applications. For example, inorganic pigments or organic pigments for black or color are suitable. These can be used alone or in combination.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

Specific examples of the black pigments include, but are not limited to, carbon black (C.I. Pigment Black 7) such as furnace black, lamp black, acetylene black, and channel black, metals such as copper, iron (C.I. Pigment Black 11), metal oxides such as titanium oxides, and organic pigments such as aniline black (C.I. Pigment Black 1).

It is suitable to use carbon black manufactured by a furnace method or channel method, which has a primary, particle diameter of from 15 nm to 40 nm, a specific surface area of from 50 m$^2$/g to 300 m$^2$/g according to Brun-auer-Emmett-Teller (BET) method, a dibutylphthalate (DPB) absorption oil amount of from 40 ml/100 g to 150 ml/100 g, a volatile content of from 0.5 percent to 10 percent, and pH of from 2 to 9.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

Of these pigments, in particular pigments having good affinity with water are preferably used.

Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

The dye chleates include, but are not limited to, bass dye type chleates, and acid dye type chleates.

There is no specific limit to the selection of the pigment for yellow, which can be selected to a particular application. Specific examples thereof include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

There is no specific limit to the selection of the pigment for magenta, which can be selected to a particular application. Specific examples thereof include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and C.I. Pigment Violet 19.

There is no specific limit to the selection of the pigment for cyan, which can be selected to a particular application.

Specific examples thereof include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Pigment Pat Blue 4, and C.I. Pigment Pat Blue 60.

By using C.I. Pigment Yellow 74 as yellow pigment, C.I. Pigment Red 122 and C.I. Pigment Violet 19 as magenta pigment, and C.I. Pigment Blue 15:3 as cyan pigment, a well-balanced ink is obtained which has excellent color tone and light resistance.

Colorants newly manufactured for the present disclosure can be used as the ink for the present disclosure.

In addition, in terms of coloring of obtained images, it is suitable to use a self-dispersion pigment and preferable to use anionic self-dispersion pigment. The anionic self-dispersion pigment is formed by introducing an anionic functional group to the surface of a pigment directly or via another atomic group for stable dispersion to stabilize dispersion.

Conventional pigments can be used as the pigment before stable dispersion.

In the anionic functional group, more than a half of hydrogen ions are dissociated at pH 7.0.

Specific examples of the anionic functional groups include, but are not limited to, a carboxyl group, a sulfo group, and a phosphonic acid group. Of these, to improve the optical density of obtained images, a carboxyl group or a phosphonic acid group is preferable.

An anionic functional group is introduced into the surface of a pigment by, for example, oxidation treatment of carbon black.

Specifically, there are methods using hypochlorite, ozone water, hydrogen peroxide, chlorite, or nitric acid for oxidization treatment or methods using a diazonium salt for surface treatment.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

There is no specific limit to the amount of the pigment in an aqueous ink. The amount can be suitably selected to a particular application. The amount preferably ranges from 0.5 percent by weight to 20 percent by weight and more preferably ranges from 1 percent by weight to 10 percent by weight.

As the dye, dyes classified into acidic dyes, direct dyes, basic dyes, reactive dyes, and food dyes in the color index can be used.

Specific examples of the acid dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C.I. Food Black 1 and 2, C.I. Food Yellow 3 and 4, and C.I. Food Red 7, 9, and 14. Specific examples of the direct dyes include, but are not limited to, C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102. Specific examples of the basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112. Specific examples of the reactive dyes include, but are not limited to, C.I. Reactive Black 3, 4, 7, 11, 12, and 17, C.I. Reactive Yellow 1, 5, 11, 13, 14, 20, 21, 22, 25, 40, 47, 51, 55, 65, and 67, C.I. Reactive Blue 1, 2, 7, 14, 15, 23, 32, 35, 38, 41, 63, 80, and 95, and C.I. Reactive Red 1, 14, 17, 25, 26, 32, 37, 44, 46, 55, 60, 66, 74, 79, 96, and 97.

The aqueous ink of the present disclosure preferably includes a water-soluble organic solvent in order to enhance the permeation of the aqueous ink into plain paper, coated paper, etc., thereby further suppressing the occurrence of beading and preventing the ink from drying due to moisturizing effect.

There is no specific limit to the selection of the water soluble organic solvent. Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and □-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These can be used alone or in combination.

Of these, in terms of prevention of curling of plain paper, preferred are 3-ethyl-3-hydroxymethyloxetane, isopropylidene glycerol, N,N-dimethyl-β-methoxy propionamide, and N,N-dimethyl-β-buthoxy propionamide.

Of these, diethylene glycol, triethylene glycol, 1,3-butanediol, 2,2,4-trimethyl-1,3-pentanediol, and glycerin are excellent to prevent discharge failure ascribable to evaporation of water.

Specific examples of the water soluble organic solvents having permeation property and relatively low level of wettability include, but are not limited to, 2-ethyl-1,3-hexanediol [solubility: 4.2% (25 degrees C.)] and 2,2,4-trimethyl-1,3-pentanediol [solubility: 2.0 percent (25 degrees C.)].

Specific examples of the other water soluble organic solvents include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butane diol, 2,4-dimethyl-2,4-pentane diol, 2,5-dimethyl-2,5-hexane diol, and 5-hexene-1,2-diol.

Another water-soluble organic solvent that can be used in combination with the above-described water soluble organic solvent can be appropriately selected to a particular application from alkyl or aryl ethers of polyhydric alcohols such as diethylene glycol monobutyl ether, propyleneglycol monobutyl ether, ethylene glycol monophenyl ether, diethylene glycol monophenyl ether, ethylene glycol monoallyl ether, and tetraethylene glycol chlorophenyl ether; and lower alcohols such as ethanol.

The aqueous ink of the present disclosure preferably includes a surfactant in order to enhance the permeation of the aqueous ink into plain paper, coated paper, etc., thereby further suppressing the occurrence of beading.

As the surfactants, for example, fluorine-containing surfactants, silicone-based surfactants, anionic surfactants, nonionic surfactants, and betaine-based surfactants can be suitably used. These surfactants can be used alone or in combination.

Of these, fluorine-containing surfactants and silicone-based surfactants are preferable because it can lower the surface tension of an ink to 30 mN/m or less.

The fluorine-containing surfactant include anionic fluorine-containing surfactants and nonionic fluorine-containing surfactants. Of these, the fluorine-containing surfactant having 2 to 16 fluorine-substituted carbon atoms is preferable and the one having 4 to 16 fluorine-substituted carbon atoms is more preferable. When the number of the carbon atoms is below 2, the specific effect of fluorine atoms may not be demonstrated. When the number of the carbon atom surpasses 16, storage problem may arise.

Specific examples of the nonionic fluorine-containing surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because of its low foaming property and the fluorine containing surfactant represented by the following Chemical formula 5 is more preferable.

$CF_3CF_2(CF_2CF_2)_m$—$CF_2CF_2(CF_2CF_2)_nH$    Chemical formula 5

In Chemical formula 5, m represents 0 to 10 and n represents 0 to 40.

Specific examples of the anionic fluorine-based surfactants include, but are not limited to, perfluoroalkyl sulfonic acid compounds, perfluoroalkyl carboxylic acid compounds, perfluoroalkyl phosphoric acid ester compounds, and polyoxyalkylene ether polymer compounds having a perfluoroalkyl ether group in its side chain.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-containing surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, and FS-300 UR (all manufactured by E. I. du Pont de Nemours and Company); FTERGENT FT-110, FT-250, FT-251, FT-400S, FT-150, and FT-400SW (all manufactured by NEOS COMPANY LIMITED); and POLYFOX PF-136A, PF-156A, PF-151N, PF-154, PF-159 (manufactured by OMNOVA SOLUTIONS INC.).

Of these, in terms of print quality, coloring and uniform dyeing for paper in particular, FS-300 (manufactured by E. I. du Pont de Nemours and Company), FTERGENT FT-110, FT-250, FT-251, FT-400S, FT-150 and FT-400SW (all manufactured by NEOS COMPANY LIMITED), and POLYFOX PF-151N (manufactured by OMNOVA SOLUTIONS INC.).

There is no specific limit to the silicone-based surfactant. The silicone-based surfactant can be suitably selected to a particular application. Specific examples thereof include, but are not limited to, side-chain-modified polydimethyl siloxane, both end-modified polydimethylsiloxane, one end modified polydimethylsiloxane, and side-chain both end modified polydimethylsiloxane. In particular, a polyether-modified silicone-containing surfactant that has a polyoxyethylene group or a polyoxyethylene polyoxypropylene group is preferable because of its good characteristics as an aqueous surfactant.

Commercial silicone-based surfactants are easily available from, for example, BYK Japan KK, Shin-Etsu Chemical Co., Ltd., Dow Corning Toray Silicone Co., Ltd., NIHON EMULSION Co., Ltd., or Kyoeisha Chemical Co., Ltd.

Specific examples of the anionic surfactants include, but are not limited to, polyoxyethylene alkyl ether acetates, dodecyl benzene sulfonates, laurates, and salts of polyoxyethylene alkyl ether sulfates.

Specific examples of the nonionic surface active agents include, but are not limited to, polyoxyethylene alkyl ether, polyoxypropylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

Known additives such as pH regulators, preservatives and fungicides, corrosion inhibitors, anti-oxidants, ultraviolet absorbers, oxygen absorbers, and light stabilizers can be optionally selected and added to the ink of the present disclosure.

The pH regulator can be any agent capable of adjusting the pH in the range of from 8.5 to 11 without having an adverse impact on formulated ink and suitably selected to a particular application.

Specific examples thereof include, but are not limited to, alcohol amines, hydroxides of alkali metal elements, hydroxides of ammonium, phosphonium hydroxides, and alkali metal carbonates. Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide. Specific examples of the hydroxides of ammonium include, but are not limited to, ammonium hydroxide and quaternary ammonium hydroxide. A specific example of the phosphonium hydroxides is quaternary phosphonium hydroxide. Specific examples of the alkali metal carbonates include, but are not limited to, lithium carbonate, sodium carbonate, and potassium carbonate.

Specific examples of the preservatives and fungicides include, but are not limited, dehydrosodium acetate, sodium sorbinate, 2-pyridine thiol-1-oxide sodium, sodium benzoate, and pentachlorophenol sodium.

Specific examples of the corrosion inhibitors include, but are not limited to, acid sulfite, thiosodium sulfate, thiodiglycolate ammon, diisopropyl ammonium nitrite, pentaerythritol tetranitrate, and dicyclohexyl ammonium nitrite.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

The aqueous ink of the present disclosure can be produced by, for example, dispersing or dissolving, in an aqueous medium, water, a water soluble organic solvent, a pigment, the above-described copolymer, and optional other components followed by stirring and mixing. The copolymer may be used as a pigment dispersion resin during preparation of a pigment dispersion.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc.

During the production, coarse particles are optionally filtered off with a filter, a centrifuge, etc. optionally followed by degassing.

There is no specific limit to the properties of the aqueous ink of the present disclosure, which can be suitably selected to a particular application. For example, the viscosity, the surface tension, etc. are preferable in the following ranges.

The viscosity of the ink is from 3 mPa·S to 20 mPa·S at 25 degrees C. When the ink viscosity is 3 mPa·S or greater, the printing density and the printing quality of the ink are improved. When the ink viscosity is 20 mPa·s or less, a suitable ink discharging property is secured.

The viscosity can be measured by, for example, a viscometer (RE-80L, manufactured by TOKI SANGYO CO., LTD.) at 25 degrees C.

The surface tension of the aqueous ink is preferably 40 mN/m or less at 25 degrees C.

The ink cartridge of the present disclosure has the aqueous ink in a container and other optional other members.

There is no specific limit to the container. The form, the structure, the size, and the material thereof can be suitably determined to particular applications. For example, a container having at least an ink bag formed of aluminum laminate film, a resin film, etc. is suitable.

Figure 2:
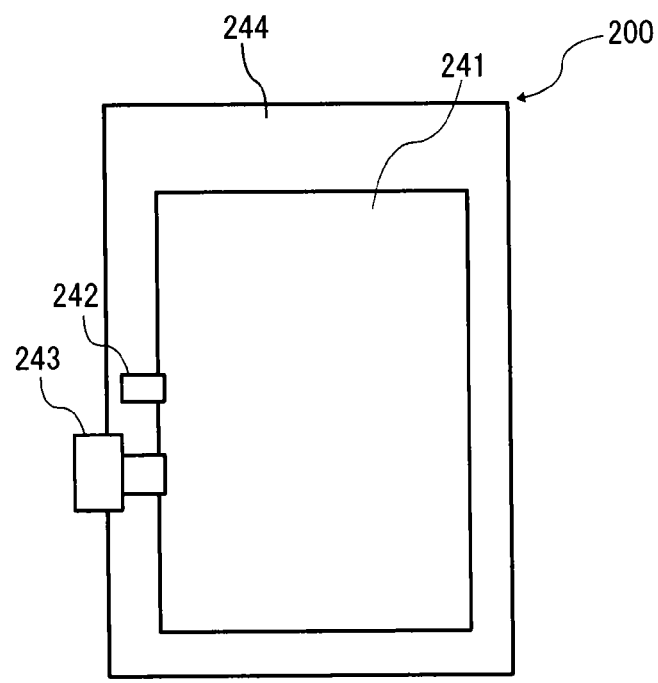
FIG. 2 is a diagram illustrating the ink cartridge illustrated in FIG. 1 including its housing.

Next, the ink cartridge is described in detail with reference to FIGS. 1 and 2. FIG. 1 is a diagram illustrating an example of the ink cartridge. FIG. 2 is a view illustrating the ink cartridge illustrated in FIG. 1 including the housing thereof. In an ink cartridge 200, an ink is supplied to an ink bag 241 through an ink inlet 242, the air remaining in the ink accommodating unit 241 is discharged, and thereafter the ink inlet 242 is closed by fusion.

When in use, an ink outlet 243 made of rubber is pierced by the needle installed onto an inkjet recording device to supply the ink into the device. The ink bag 241 is formed of a packaging material such as aluminum laminate film having no air permeability. The ink bag 241 is accommodated in a cartridge case 244 made of plastic as illustrated in FIG. 2 and detachably attachable to an inkjet recording device for use.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

The molecular weight of the copolymers obtained in Examples and Comparative Examples were obtained as follows:

Measuring of Molecular Weight of Copolymer

The molecular weight of a copolymer was measured by a typical gel permeation chromatography (GPC) under the following conditions:

Device: GPC-8020 (manufactured by TOSOH CORPORATION)
Column: TSK G2000 HXL and G4000 HXL (manufactured by TOSOH CORPORATION)
Temperature: 40 degrees C.
Solvent: tetrahydrofuran (THF)
Flow speed: 1.0 ml/minute 1 mL of the copolymer having a concentration of 0.5 percent by weight was infused into the column and the number average molecular weight Mn and the weight average molecular weight Mw were calculated by using the molecular weight calibration curve obtained based on a simple dispersion polystyrene standard sample from the molecular weight distribution of the copolymer measured under the conditions specified above.

Example 1 Synthesis of Copolymer CP-1

62.0 g (525 mmol) of 1,6-hexanediol (manufactured by Tokyo Chemical Industry Co., Ltd.) was dissolved in 700 mL of dichloromethane (manufactured by Tokyo Chemical Industry Co., Ltd.) and 20.7 g (262 mmol) of pyridine was further added.

To this solution, a solution in which 50.0 g (262 mmol of 2-naphthalene carbonyl chloride (manufacture by Tokyo Chemical Industry Co., Ltd.) was dissolved in 100 ml of dichloromethane (manufactured by Tokyo Chemical Industry Co., Ltd.) was dripped in two hours followed by stirring at room temperature for six hours. The reaction solution was rinsed with water and thereafter the organic phase was isolated followed by drying with magnesium sulfate and the solvent was distilled away. The remainder was refined by silica gel column chromatography with a solvent mixture of a methylene chloride and methanol with a volume rate of 98:2 serving as an eluent to obtain 52.5 g of 2-naphthoic acid-2-hydroxyethyl ester.

Next, 42.1 g (155 mmol) of 2-naphthoic acid-2-hydroxyethyl ester was dissolved in 80 mL of dried methylethylketone followed by heating to 60 degrees C. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour while being stirred followed by stirring at 70 degrees C. for 12 hours.

After cooled down to room temperature, the solvent was distilled away. The remainder was refined by silica gel column chromatography with a solvent mixture of a methylene chloride and methanol with a volume rate of 99:1 serving as an eluent to obtain 57.0 g of monomer M-1 represented by the following Chemical structure 1.

Chemical structure 1

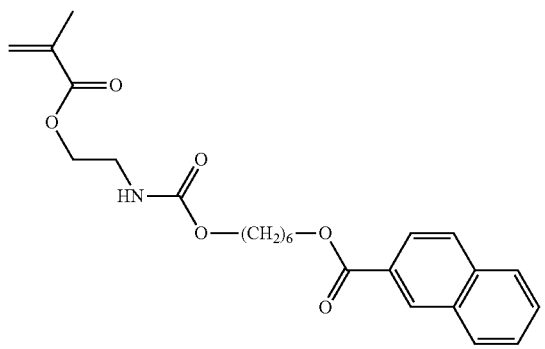

Figure 3:
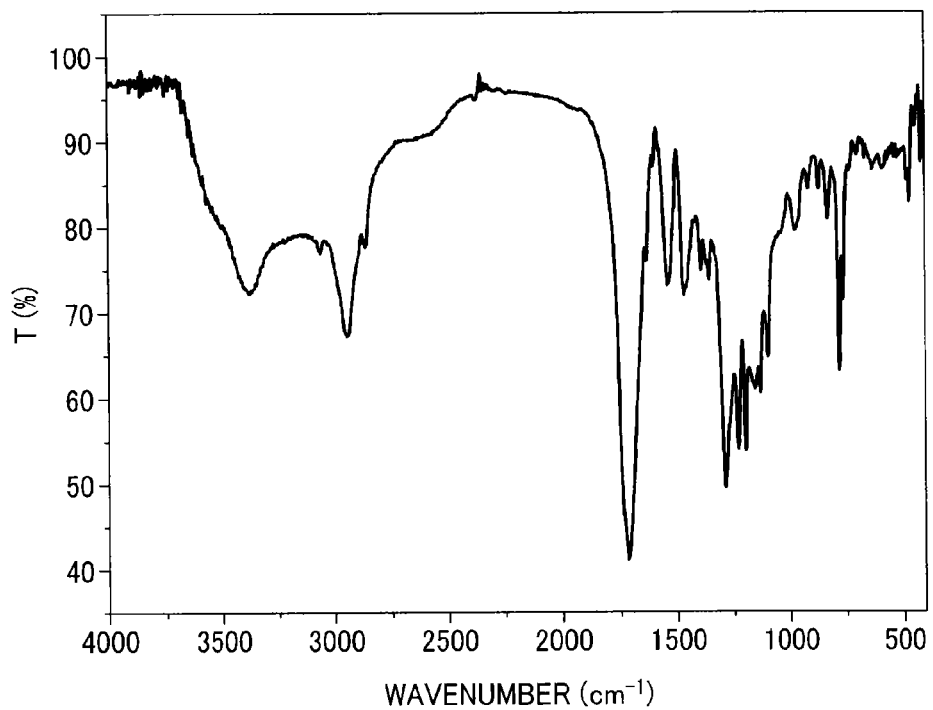
FIG. 3 is a graph illustrating IR spectrum of the copolymer CP-1 obtained in Example 1 described later.

1.20 g (16.7 mmol) of acrylic acid (manufactured by Sigma-Aldrich Corporation) and 7.12 g (16.7 mmol) of the monomer M-1 were dissolved in 40 mL of dried methylethyl ketone to prepare a monomer solution. After 10 percent of the monomer solution was heated to 75 degrees C. in an argon atmosphere, a solution in which 0.273 g (1.67 mmol) of 2,2'-azoiso(butylonitrile) (manufactured by Tokyo Chemical Industry Co., Ltd.) was dissolved in the rest of the monomer solution was dripped to the heated monomer solution in 1.5 hours followed by stirring at 75 degrees C. for six hours. The resultant was cooled down to room temperature and the thus-obtained reaction solution was dripped to hexane to precipitate a copolymer. The precipitated copolymer was filtrated followed by drying with a reduced pressure to obtain 8.13 g of a copolymer CP-1 (weight average molecular weight (Mw): 9,200, number average molecular weight (Mn): 3,100). FIG. 3 is a graph illustrating IR spectrum of the obtained Copolymer CP-1.

Thereafter, 2.00 g of the obtained copolymer CP-1 was dissolved in an aqueous solution of tetraethyl ammonium hydroxide in such a manner that the concentration of the copolymer CP-1 was 2.38 percent and the pH thereof was 8.0 to prepare an aqueous solution for pigment dispersion of the copolymer CP-1.

Example 2 Synthesis of Copolymer CP-2

A monomer M-2 represented by the following Chemical structure 2 was obtained in the same manner as in Example 1 except that 1,6-hexanediol was replaced with ethylene glycol (manufactured by TOKYO CHEMICAL INDUSTRY CO., LTD.).

Chemical structure 2

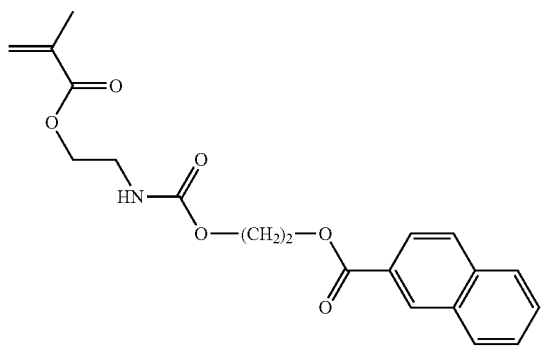

Thereafter, using acrylic acid and the obtained monomer M-2, a copolymer (weight average molecular weight (Mw): 8,700, number average molecular weight (Mn): 3,000) was obtained in the same manner as in Example 1 to prepare an aqueous solution for pigment dispersion of the copolymer CP-2 in the same manner as in Example 1. The IR spectrum of the thus-obtained copolymer CP-2 was similar to that of the copolymer CP-1.

Example 3 Synthesis of Copolymer CP-3

A monomer M-3 represented by the following Chemical structure 3 was obtained in the same manner as in Example 1 except that 1,6-hexanediol was replaced with 1,12-dodecane diol (manufactured by TOKYO CHEMICAL INDUSTRY CO., LTD.).

Chemical structure 3

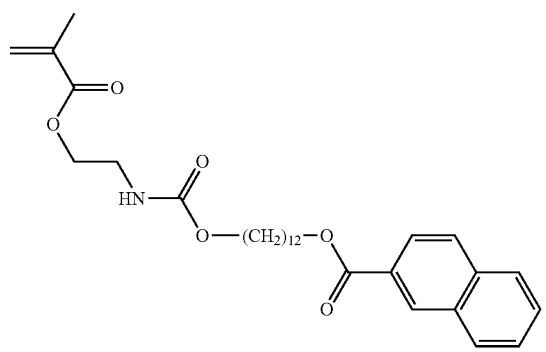

Thereafter, using acrylic acid and the obtained monomer M-3, a copolymer CP-3 (weight average molecular weight (Mw): 8,700, number average molecular weight (Mn): 3,000) was obtained in the same manner as in Example 1 to prepare an aqueous solution for pigment dispersion of the copolymer CP-3 in the same manner as in Example 1. The IR spectrum of the thus-obtained copolymer CP-3 was similar to that of the copolymer CP-1.

Example 4 Synthesis of Copolymer CP-4

A monomer M-4 represented by the following Chemical structure 4 was obtained in the same manner as in Example 1 except that 1,6-hexanediol was replaced with 1,16-hexadecane diol (manufactured by TOKYO CHEMICAL INDUSTRY CO., LTD.).

Chemical structure 4

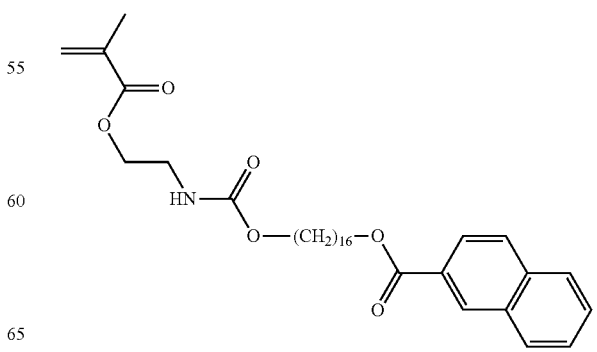

Thereafter, using acrylic acid and the obtained monomer M-4, a copolymer (weight average molecular weight (Mw): 9400, number average molecular weight (Mn): 3400) was obtained in the same manner as in Example 1 to prepare an aqueous solution for pigment dispersion of the copolymer CP-4 in the same manner as in Example 1. The IR spectrum of the thus-obtained copolymer CP-4 was similar to that of the copolymer CP-1.

Example 5 Synthesis of Copolymer CP-5

Figure 4:
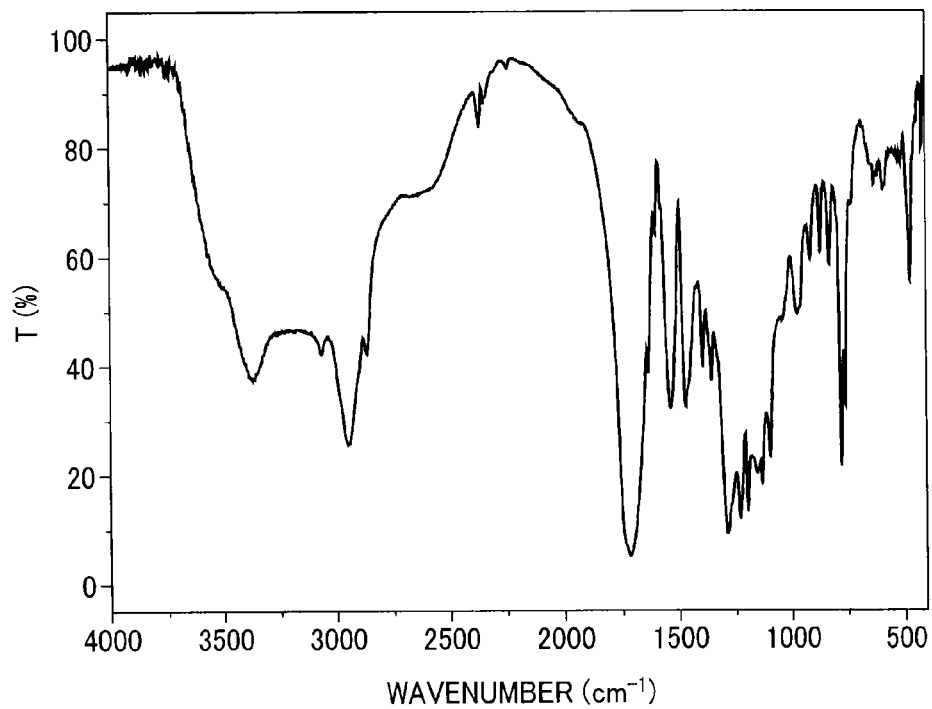
FIG. 4 is a graph illustrating IR spectrum of the copolymer CP-5 obtained in Example 5 described later.

Thereafter, using methacrylic acid and the monomer M-1 synthesized in Example 1, a copolymer CP-5 (weight average molecular weight (Mw): 9,300, number average molecular weight (Mn): 3,300) was obtained in the same manner as in Example 1 to prepare an aqueous solution of the copolymer CP-5 in the same manner as in Example 1. FIG. 4 is a graph illustrating IR spectrum of the obtained Copolymer CP-5.

Example 6 Synthesis of Copolymer CP-6

Using acrylic acid and the monomer M-1 synthesized in Example 1 while changing the ratio thereof to that shown in Table 1, a copolymer CP-6 (weight average molecular weight (Mw): 9,100, number average molecular weight (Mn): 3,100) was obtained in the same manner as in Example 1 to prepare an aqueous solution for pigment dispersion of the copolymer CP-6 in the same manner as in Example 1. The IR spectrum of the thus-obtained copolymer CP-6 was similar to that of the copolymer CP-1.

Example 7 Synthesis of Copolymer CP-7

Figure 5:
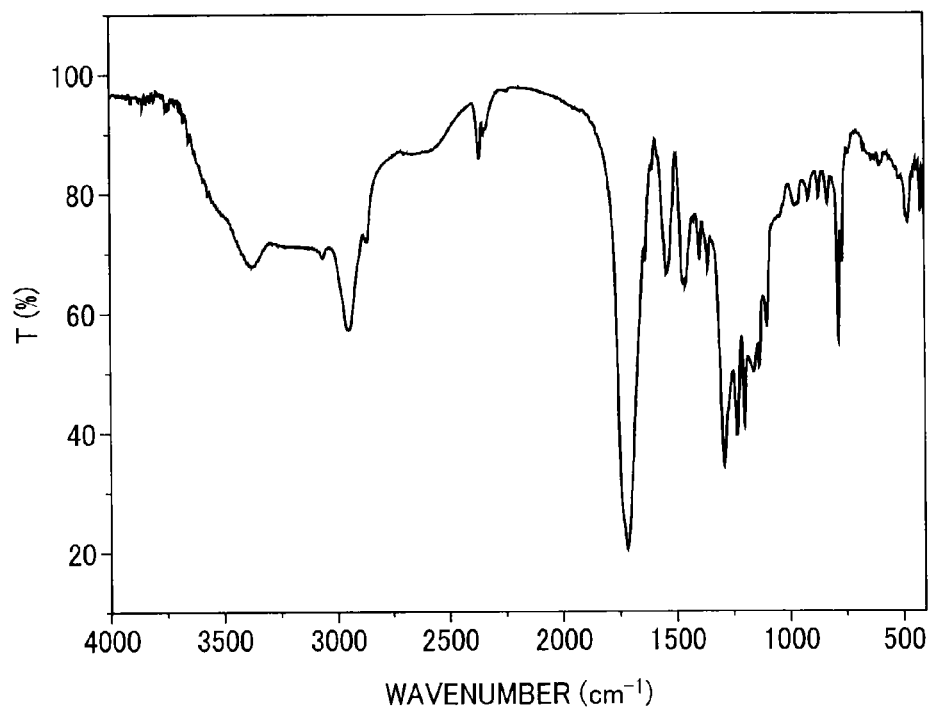
FIG. 5 is a graph illustrating IR spectrum of the copolymer CP-7 obtained in Example 7 described later.

Using acrylic acid and the monomer M-1 synthesized in Example 1 while changing the ratio thereof to that shown in Table 1, a copolymer CP-7 (weight average molecular weight (Mw): 8,700, number average molecular weight (Mn): 2,900) was obtained in the same manner as in Example 1 to prepare an aqueous solution for pigment dispersion of the copolymer CP-7 in the same manner as in Example 1. FIG. 5 is a graph illustrating IR spectrum of the obtained Copolymer CP-7.

Example 8 Synthesis of Copolymer CP-8

Using acrylic acid and the monomer M-1 synthesized in Example 1 while changing the ratio thereof to that shown in Table 1, a copolymer CP-8 (weight average molecular weight (Mw): 8,500, number average molecular weight (Mn): 2,800) was obtained in the same manner as in Example 1 to prepare an aqueous solution for pigment dispersion of the copolymer CP-8 in the same manner as in Example 1. The IR spectrum of the thus-obtained copolymer CP-8 was similar to that of the copolymer CP-7.

Example 9 Synthesis of Copolymer CP-9

Using acrylic acid and the monomer M-1 synthesized in Example 1, copolymer CP-9 (weight average molecular weight (Mw): 8,600, number average molecular weight (Mn): 3,000) was obtained in the same manner as in Example 1.

Thereafter, 2.00 g of the obtained copolymer CP-9 was dissolved in an aqueous solution of sodium hydroxide in such a manner that the concentration of the copolymer CP-9 was 2.38 percent and the pH thereof was 8.0 to prepare an aqueous solution for pigment dispersion of the copolymer CP-9. The IR spectrum of the thus-obtained copolymer CP-9 was similar to that of the copolymer CP-1.

Example 10 Synthesis of Copolymer CP-10

Using methacrylic acid and the monomer M-4 synthesized in Example 4 while changing the ratio thereof to that shown in Table 1, a copolymer CP-10 (weight average molecular weight (Mw): 9,400, number average molecular weight (Mn): 3,600) was obtained in the same manner as in Example 1 to prepare an aqueous solution for pigment dispersion of the copolymer CP-10 in the same manner as in Example 9. The IR spectrum of the thus-obtained copolymer CP-10 was similar to that of the copolymer CP-5.

Example 11 Synthesis of Copolymer CP-11

59.8 g (140 mmol) of monomer M-1 was dissolved in 2.02 g (28.0 mmol) of acrylic acid. 100 g of deionized water, 3.00 g of anionic radical reactive surfactant (Aqualon KH-10, manufactured by DKS Co. Ltd.), and 0.10 g of ammonium persulfate were added to the solution to form a pre-emulsion by a HOMOMIXER. Thereafter, 2.0 g of Aqualon KH-10 was added to 100 g of deionized water, which was thereafter heated to 80 degrees C. in argon atmosphere. Thereafter, 10 percent of the pre-emulsion was added to conduct initial polymerization for 30 minutes.

Thereafter, the rest of the pre-emulsion was dripped in two hours to conduct polymerization followed by further polymerization at 80 degrees C. for two hours. Subsequent to cooling down, the resultant was filtered and neutralized by ammonium water to obtain 0/W emulsion for addition of copolymer CP-11 (weight average molecular weight (Mw): 21,000, number average molecular weight (Mn): 9,700) having a solid portion concentration of 30 percent. The IR spectrum of the thus-obtained copolymer CP-11 was similar to that of the copolymer CP-1.

Example 12 Synthesis of Copolymer CP-12

64.1 g (150 mmol) of monomer M-1 was dissolved in 5.16 g (60.0 mmol) of methacrylic acid. 130 g of deionized water, 4.00 g of anionic radical reactive surfactant (Aqualon KH-10, manufactured by DKS Co. Ltd.), and 1.30 g of ammonium persulfate were added to the solution to form a pre-emulsion by a HOMOMIXER. Thereafter, 2.0 g of Aqualon KH-10 was added to 100 g of deionized water, which was thereafter heated to 80 degrees C. in argon atmosphere. Thereafter, 10 percent of the pre-emulsion was added to conduct initial polymerization for 30 minutes. Thereafter, the rest of the pre-emulsion was dripped in two hours to conduct polymerization followed by further polymerization at 80 degrees C. for two hours. Subsequent to cooling down, the resultant was filtered and neutralized by ammonium water to obtain 0/W emulsion for addition of copolymer CP-12 (weight average molecular weight (Mw): 18000, number average molecular weight (Mn): 9500) having a solid portion concentration of 30 percent. The IR spectrum of the thus-obtained copolymer CP12 was similar to that of the copolymer CP-5.

The structures of the copolymers of Examples 1 to 12 are shown in Table 1.

TABLE 1

| | Copolymer | Monomer I:II (Molar ratio) | R1 | R2 | X | L |
|---|---|---|---|---|---|---|
| Example 1 | CP-1 | 1:1 | H | $CH_3$ | TEA | $—(CH_2)_6—$ |
| Example 2 | CP-2 | 1:1 | H | $CH_3$ | TEA | $—(CH_2)_2—$ |
| Example 3 | CP-3 | 1:1 | H | $CH_3$ | TEA | $—(CH_2)_{12}—$ |
| Example 4 | CP-4 | 1:1 | H | $CH_3$ | TEA | $—(CH_2)_{16}—$ |
| Example 5 | CP-5 | 1:1 | $CH_3$ | $CH_3$ | TEA | $—(CH_2)_6—$ |
| Example 6 | CP-6 | 0.5:1 | H | $CH_3$ | TEA | $—(CH_2)_6—$ |
| Example 7 | CP-7 | 3:1 | H | $CH_3$ | TEA | $—(CH_2)_6—$ |
| Example 8 | CP-8 | 4:1 | H | $CH_3$ | TEA | $—(CH_2)_6—$ |
| Example 9 | CP-9 | 1:1 | H | $CH_3$ | $Na^+$ | $—(CH_2)_6—$ |
| Example 10 | CP-10 | 10:1 | $CH_3$ | $CH_3$ | $Na^+$ | $—(CH_2)_{16}—$ |
| Example 11 | CP-11 | 0.2:1 | H | $CH_3$ | TEA | $—(CH_2)_6—$ |
| Example 12 | CP-12 | 0.4:1 | $CH_3$ | $CH_3$ | TEA | $—(CH_2)_6—$ |

| | Polymerization method | Mn | Mw |
|---|---|---|---|
| Example 1 | Solution polymerization | 9,200 | 3,100 |
| Example 2 | Solution polymerization | 8,700 | 3,000 |
| Example 3 | Solution polymerization | 8,700 | 3,000 |
| Example 4 | Solution polymerization | 9,400 | 3,400 |
| Example 5 | Solution polymerization | 9,300 | 3,300 |
| Example 6 | Solution polymerization | 9,100 | 3,100 |
| Example 7 | Solution polymerization | 8,700 | 2,900 |
| Example 8 | Solution polymerization | 8,500 | 2,800 |
| Example 9 | Solution polymerization | 8,600 | 3,000 |
| Example 10 | Solution polymerization | 9,400 | 3,600 |
| Example 11 | Suspension polymerization | 21,000 | 9,700 |
| Example 12 | Suspension polymerization | 18,000 | 9,500 |

Example 13 Synthesis of Copolymer CP-13

Synthesis of Copolymer CP-13
Synthesis of Compound Having Chemical Structure 5

62.0 g (525 mmol) of 1,6-hexanediol (manufactured by Tokyo Chemical Industry Co. Ltd.) was dissolved in 700 mL of duchloromethane (manufactured by Tokyo Chemical Industry Co. Ltd.) and 20.7 g (262 mmol) of pyridine (manufactured by Tokyo Chemical Industry Co. Ltd.) was further added to start stirring. To this solution, a solution in which 50.0 g (262 mmol of 2-naphthalene carbonyl chloride (manufacture by Tokyo Chemical Industry Co. Ltd.) was dissolved in 100 ml of dichloromethane (manufactured by Tokyo Chemical Industry Co. Ltd.) was dripped in two ours followed by stirring at room temperature for six hours. The reaction solution was rinsed with water and thereafter the organic phase was isolated followed by drying with magnesium sulfate and the solvent was distilled away.

The remainder was refined by silica gel column chromatography with a solvent mixture of a dichloromethane and methanol with a volume rate of 98:2 serving as an eluent to obtain 52.5 g the compound represented by the following Chemical structure 5.

Synthesis of Monomer

Chemical structure 5

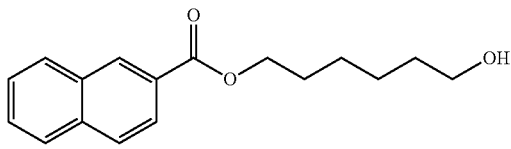

Next, 42.1 g (155 mmol) of the compound represented by Chemical structure 5 was dissolved in 80 mL of dried methylethylketone followed by heating to 60 degrees C. while being stirred. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour followed by stirring at 70 degrees C. for 12 hours. After cooled down to room temperature, the solvent was distilled away. The remainder was refined by silica gel column chromatography with a solvent mixture of a dichloromethane and methanol with a volume rate of 99:1 serving as an eluent to obtain 57.0 g of monomer M-1 represented by the following Chemical structure 1.

Chemical structure 1

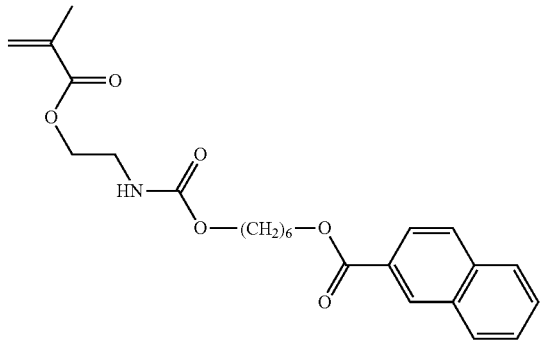

Figure 6:
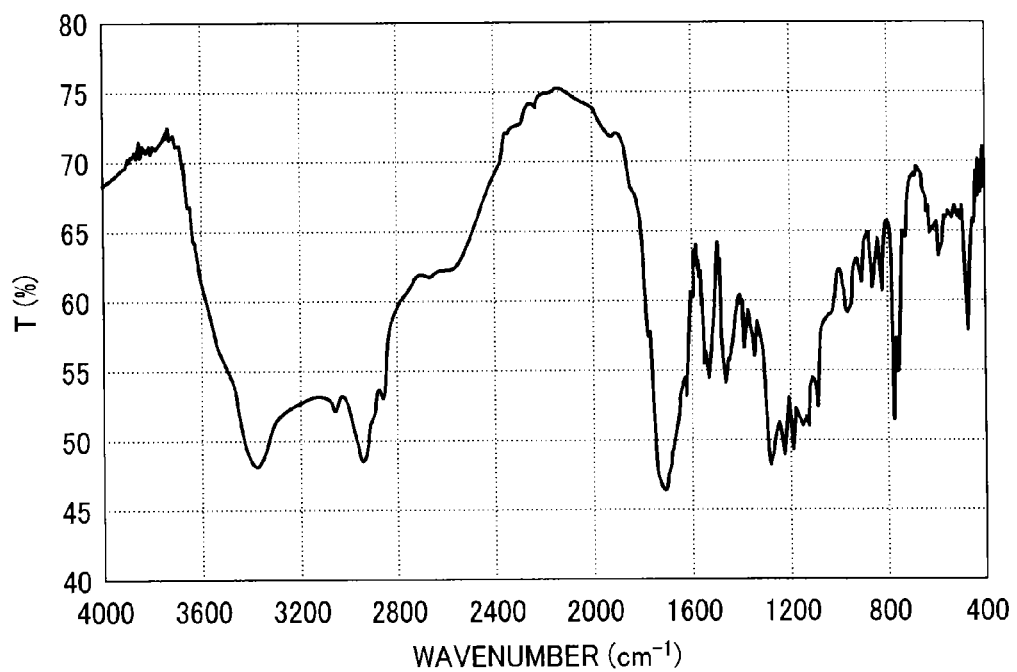
FIG. 6 is a graph illustrating IR spectrum of the copolymer CP-13 obtained in Example 13 described later.
Figure 7:
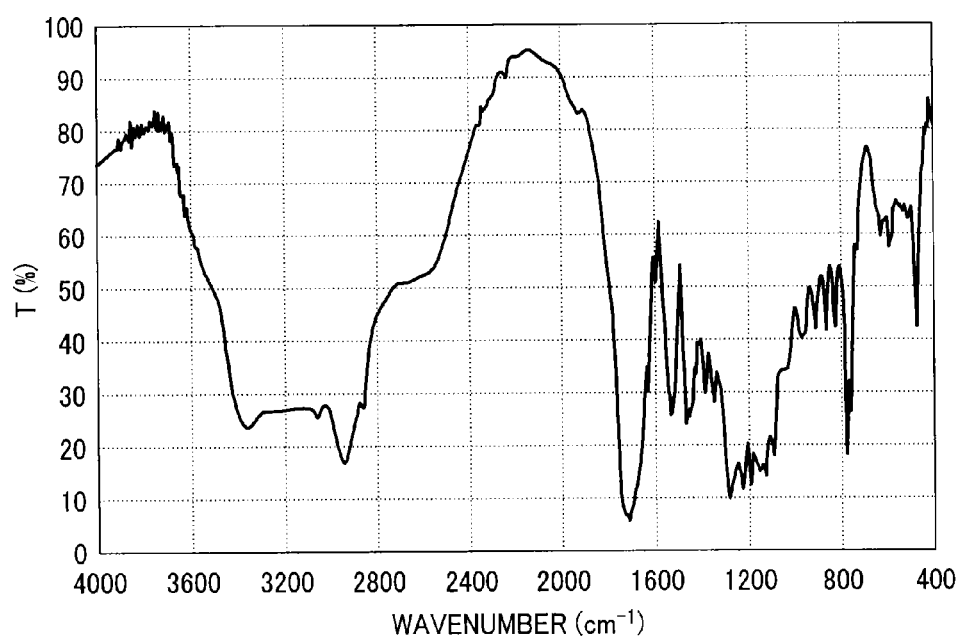
FIG. 7 is a graph illustrating IR spectrum of the copolymer 101 obtained in Example 101 described later.

0.58 g (8.0 mmol) of acrylic acid (manufactured by Sigma-Aldrich Corporation), 4.27 g (10.0 mmol) of the monomer M-1 prepared in the same manner as in Example 1, 0.93 g (8.0 mmol) of maleic acid (manufactured by Wako Pure Chemical Industries), and 0.21 g (1.30 mmol) of 2,2'-azobis(isobutylonitrile) (manufactured by Tokyo Chemical Industry Co., Ltd.) were dissolved in 104 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 5.35 g of copolymer (yield: 92.6 percent). The number average molecular weight (Mn) was 8,300 and the weight average molecular weight (Mw) was 15,700. FIG. 6 is a graph illustrating IR spectrum of the obtained Copolymer CP-13.

Example 14 Synthesis of Copolymer CP-14

4.40 g of copolymer CP-14 of Example 14 was obtained in the following method synthesizing a copolymer (yield: 92.7%). The number average molecular weight (Mn) was 8,500 and the weight average molecular weight (Mw) was 15,700. The IR spectrum of the thus-obtained copolymer CP-14 was similar to that of the copolymer CP-13 of Example 13.
Synthesis of Copolymer
0.18 g (2.5 mmol) of acrylic acid (manufactured by Sigma-Aldrich Corporation), 4.27 g (10.0 mmol) of the monomer M-1 having the structure represented by the Chemical formula 1, 0.29 g (2.5 mmol) of maleic acid (manufactured by Wako Pure Chemical Industries), and 0.12 g (0.75 mmol) of 2,2'-azobis(isobutylonitrile) (manufactured by Tokyo Chemical Industry Co., Ltd.) were dissolved in 60 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-14.

Example 15 Synthesis of Copolymer CP-15

6.60 g of copolymer CP-15 of Example 15 was obtained in the following method synthesizing a copolymer (yield: 93.0 percent). The number average molecular weight (Mn) was 8,600 and the weight average molecular weight (Mw) was 17,200. The IR spectrum of the thus-obtained copolymer was similar to that of the copolymer of Example 13.
Synthesis of Copolymer
1.08 g (15.0 mmol) of acrylic acid (manufactured by Sigma-Aldrich Corporation), 4.27 g (10.0 mmol) of the monomer M-1 having the structure represented by the Chemical formula 1, 1.74 g (15.0 mmol) of maleic acid (manufactured by Wako Pure Chemical Industries), and 0.33 g (2.00 mmol) of 2,2'-azobis(isobutylonitrile) (manufactured by Tokyo Chemical Industry Co., Ltd.) were dissolved in 160 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-15.

Example 16 Synthesis of Copolymer CP-16

4.34 g of copolymer CP-16 of Example 16 was obtained in the following method synthesizing a copolymer (yield: 93.4 percent). The number average molecular weight (Mn) was 8,600 and the weight average molecular weight (Mw) was 16,400. The IR spectrum of the thus-obtained copolymer was similar to that of the copolymer of Example 13.
Synthesis of Copolymer
0.14 g (2.0 mmol) of acrylic acid (manufactured by Sigma-Aldrich Corporation), 4.27 g (10.0 mmol) of the monomer M-1 having the structure represented by the Chemical formula 1, 0.23 g (2.0 mmol) of maleic acid (manufactured by Wako Pure Chemical Industries), and 0.11 g (0.70 mmol) of 2,2'-azobis(isobutylonitrile) (manufactured by Tokyo Chemical Industry Co., Ltd.) were dissolved in 160 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-16.

Example 17 Synthesis of Copolymer CP-17

6.92 g of copolymer CP-17 of Example 17 was obtained in the following method synthesizing a copolymer (yield: 92.6 percent). The number average molecular weight (Mn) was 8,500 and the weight average molecular weight (Mw) was 15,700. The IR spectrum of the thus-obtained copolymer was similar to that of the copolymer of Example 13.
Synthesis of Copolymer
1.23 g (17.0 mmol) of acrylic acid (manufactured by Sigma-Aldrich Corporation), 4.27 g (10.0 mmol) of the monomer M-1 having the structure represented by the Chemical formula 1, 1.97 g (17.0 mmol) of maleic acid (manufactured by Wako Pure Chemical Industries), and 0.36 g (2.20 mmol) of 2,2'-azobis(isobutylonitrile) (manufactured by Tokyo Chemical Industry Co., Ltd.) were dissolved in 176 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-17.

Example 18 Synthesis of Copolymer CP-18

6.92 g of copolymer CP-18 of Example 18 was obtained in the following method synthesizing a copolymer (yield: 92.7 percent). The number average molecular weight (Mn) was 8,400 and the weight average molecular weight (Mw) was 15,900. The IR spectrum of the thus-obtained copolymer was similar to that of the copolymer of Example 13.
Synthesis of Copolymer
0.11 g (1.5 mmol) of acrylic acid (manufactured by Sigma-Aldrich Corporation), 4.27 g (10.0 mmol) of the monomer M-1 having the structure represented by the Chemical formula 1, 0.17 g (1.5 mmol) of maleic acid (manufactured by Wako Pure Chemical Industries), and 0.11 g (0.65 mmol) of 2,2'-azobis(isobutylonitrile) (manufactured by Tokyo Chemical Industry Co., Ltd.) were dissolved in 52 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-18.

Example 19 Synthesis of Copolymer CP-19

8.30 g of copolymer CP-19 of Example 19 was obtained in the following method synthesizing a copolymer (yield: 92.4 percent). The number average molecular weight (Mn) was 8,400 and the weight average molecular weight (Mw) was 15,800. The IR spectrum of the thus-obtained copolymer was similar to that of the copolymer of Example 13.

Synthesis of Copolymer 1.80 g (25.0 mmol) of acrylic acid (manufactured by Sigma-Aldrich Corporation), 4.27 g (10.0 mmol) of the monomer M-1 having the structure represented by the Chemical formula 1, 2.90 g (25.0 mmol) of maleic acid (manufactured by Wako Pure Chemical Industries), and 0.49 g (3.00 mmol) of 2,2'-azobis(isobutylonitrile) (manufactured by Tokyo Chemical Industry Co., Ltd.) were dissolved in 160 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-19.

Example 20 Synthesis of Copolymer CP-20

4.06 g of copolymer CP-20 of Example 20 was obtained in the following method synthesizing a copolymer (yield: 92.4 percent). The number average molecular weight (Mn) was 8,600 and the weight average molecular weight (Mw) was 15,600. The IR spectrum of the thus-obtained copolymer CP-20 was similar to that of the copolymer CP-13 of Example 13.

Synthesis of Copolymer 0.04 g (0.5 mmol) of acrylic acid (manufactured by Sigma-Aldrich Corporation), 4.27 g (10.0 mmol) of the monomer M-1 having the structure represented by the Chemical formula 1, 0.06 g (0.5 mmol) of maleic acid (manufactured by Wako Pure Chemical Industries), and 0.09 g (0.55 mmol) of 2,2'-azobis(isobutylonitrile) (manufactured by Tokyo Chemical Industry Co., Ltd.) were dissolved in 44 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-20.

Example 21 Synthesis of Copolymer CP-21

12.73 g of copolymer CP-21 of Example 21 was obtained in the following method synthesizing a copolymer (yield: 93.0 percent). The number average molecular weight (Mn) was 8,500 and the weight average molecular weight (Mw) was 16,300. The IR spectrum of the thus-obtained copolymer CP-21 was similar to that of the copolymer CP-1 of Example 1.

Synthesis of Copolymer 3.60 g (50.0 mmol) of acrylic acid (manufactured by Sigma-Aldrich Corporation), 4.27 g (10.0 mmol) of the monomer M-1 having the structure represented by the Chemical formula 1, 0.90 g (50.0 mmol) of maleic acid (manufactured by Wako Pure Chemical Industries), and 0.90 g (5.50 mmol) of 2,2'-azobis(isobutylonitrile) (manufactured by Tokyo Chemical Industry Co., Ltd.) were dissolved in 440 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-21.

Example 22 Synthesis of Copolymer CP-22

Synthesis of Compound Having Chemical Structure 2

32.59 g (525 mmol) of ethylene glycol (manufactured by Tokyo Chemical Industry Co. Ltd.) was dissolved in 700 mL of duchloromethane (manufactured by Tokyo Chemical Industry Co. Ltd.) and 20.7 g (262 mmol) of pyridine (manufactured by Tokyo Chemical Industry Co. Ltd.) was further added to start stirring. To this solution, a solution in which 50.0 g (262 mmol of 2-naphthalene carbonyl chloride (manufacture by Tokyo Chemical Industry Co. Ltd.) was dissolved in 100 ml of dichloromethane (manufactured by Tokyo Chemical Industry Co. Ltd.) was dripped in two ours followed by stirring at room temperature for six hours. The reaction solution was rinsed with water and thereafter the organic phase was isolated followed by drying with magnesium sulfate and the solvent was distilled away.

The remainder was refined by silica gel column chromatography with a solvent mixture of a dichloromethane and methanol with a volume rate of 98:2 serving as an eluent to obtain 41.9 g the compound represented by the following Chemical structure 6.

Chemical structure 6

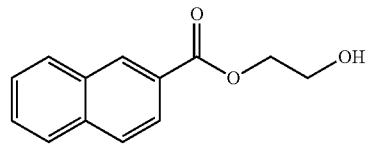

Next, 33.52 g (155 mmol) of the compound represented by Chemical structure 6 was dissolved in 80 mL of dried methylethylketone followed by heating to 60 degrees C. while being stirred. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour followed by stirring at 70 degrees C. for 12 hours. After cooled down to room temperature, the solvent was distilled away. The remainder was refined by silica gel column chromatography with a solvent mixture of a dichloromethane and methanol with a volume rate of 99:1 serving as an eluent to obtain 49.5 g of monomer M-2 represented by the following Chemical structure 2.

Chemical structure 2

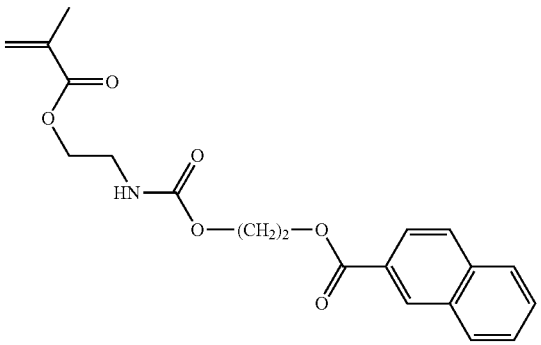

Synthesis of Copolymer 0.18 g (2.5 mmol) of acrylic acid (manufactured by Sigma-Aldrich Corporation), 3.71 g (10.0 mmol) of the monomer M-2 having the structure represented by the Chemical formula 2, 0.29 g (2.5 mmol) of maleic acid (manufactured by Wako Pure Chemical Industries), and 0.12 g (0.75 mmol) of 2,2'-azobis(isobutylonitrile) (manufactured by Tokyo Chemical Industry Co., Ltd.) were dissolved in 60 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 3.90 g of copolymer CP-22 (yield: 93.1 percent). The number average molecular weight (Mn) was 8,300 and the weight average molecular weight (Mw) was 16,600. The IR spectrum of the thus-obtained copolymer was similar to that of the copolymer of Example 13.

Example 23 Synthesis of Copolymer CP-23

Synthesis of Compound Having Chemical Structure 3

106.22 g (525 mmol) of 1,12-dodecanediol (manufactured by Tokyo Chemical Industry Co. Ltd.) was dissolved in 700 mL of duchloromethane (manufactured by Tokyo Chemical Industry Co. Ltd.) and 20.7 g (262 mmol) of pyridine (manufactured by Tokyo Chemical Industry Co. Ltd.) was further added to start stirring. To this solution, a solution in which 50.0 g (262 mmol of 2-naphthalene carbonyl chloride (manufacture by Tokyo Chemical Industry Co. Ltd.) was dissolved in 100 ml of dichloromethane (manufactured by Tokyo Chemical Industry Co. Ltd.) was dripped in two ours followed by stirring at room temperature for six hours. The reaction solution was rinsed with water and thereafter the organic phase was isolated followed by drying with magnesium sulfate and the solvent was distilled away. The remainder was refined by silica gel column chromatography with a solvent mixture of a dichloromethane and methanol with a volume rate of 98:2 serving as an eluent to obtain 69.1 g of the compound represented by the following Chemical structure 7.

Chemical structure 7

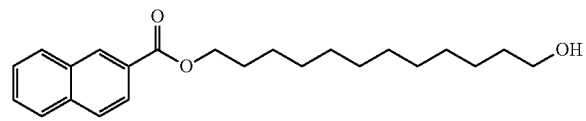

Next, 55.3 g (155 mmol) of the compound represented by Chemical structure 7 was dissolved in 80 mL of dried methylethylketone followed by heating to 60 degrees C. while being stirred. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour followed by stirring at 70 degrees C. for 12 hours. After cooled down to room temperature, the solvent was distilled away. The remainder was refined by silica gel column chromatography with a solvent mixture of a dichloromethane and methanol with a volume rate of 99:1 serving as an eluent to obtain 68.2 g of monomer M-3 represented by the following Chemical structure 3.

Chemical structure 3

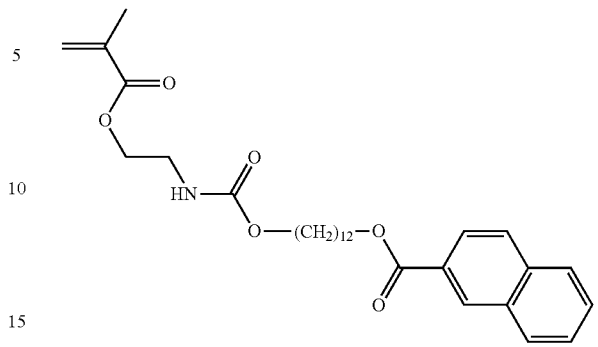

Synthesis of Copolymer 0.18 g (2.5 mmol) of acrylic acid (manufactured by Sigma-Aldrich Corporation), 5.12 g (10.0 mmol) of the monomer M-3 having the structure represented by the Chemical formula 3, 0.29 g (2.5 mmol) of maleic acid (manufactured by Wako Pure Chemical Industries), and 0.12 g (0.75 mmol) of 2,2'-azobis(isobutylonitrile) (manufactured by Tokyo Chemical Industry Co., Ltd.) were dissolved in 60 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 5.18 g of copolymer CP-23 (yield: 92.7 percent). The number average molecular weight (Mn) was 8,500 and the weight average molecular weight (Mw) was 15,400. The IR spectrum of the thus-obtained copolymer CP-23 was similar to that of the copolymer CP-13 of Example 13.

Example 24 Synthesis of Copolymer CP-24

Synthesis of Compound Having Chemical Structure 4

135.68 g (525 mmol) of 1,16-hexadecane diol (manufactured by Tokyo Chemical Industry Co. Ltd.) was dissolved in 700 mL of duchloromethane (manufactured by Tokyo Chemical Industry Co. Ltd.) and 20.7 g (262 mmol) of pyridine (manufactured by Tokyo Chemical Industry Co. Ltd.) was further added to start stirring. To this solution, a solution in which 50.0 g (262 mmol of 2-naphthalene carbonyl chloride (manufacture by Tokyo Chemical Industry Co. Ltd.) was dissolved in 100 ml of dichloromethane (manufactured by Tokyo Chemical Industry Co. Ltd.) was dripped in two ours followed by stirring at room temperature for six hours. The reaction solution was rinsed with water and thereafter the organic phase was isolated followed by drying with magnesium sulfate and the solvent was distilled away. The remainder was refined by silica gel column chromatography with a solvent mixture of a dichloromethane and methanol with a volume rate of 98:2 serving as an eluent to obtain 79.9 g of the compound represented by the following Chemical structure 8.

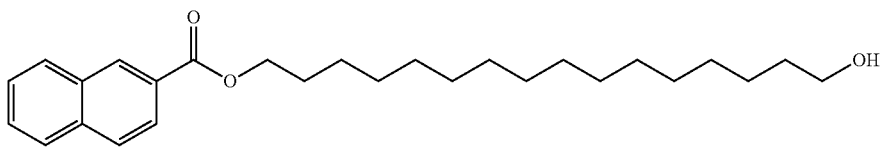

Chemical structure 8

Next, 64.0 g (155 mmol) of the compound represented by Chemical structure 8 was dissolved in 80 mL of dried methylethylketone followed by heating to 60 degrees C. while being stirred. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour followed by stirring at 70 degrees C. for 12 hours. After cooled down to room temperature, the solvent was distilled away. The remainder was refined by silica gel column chromatography with a solvent mixture of a dichloromethane and methanol with a volume rate of 99:1 serving as an eluent to obtain 76.0 g of monomer M-4 represented by the following Chemical structure 4.

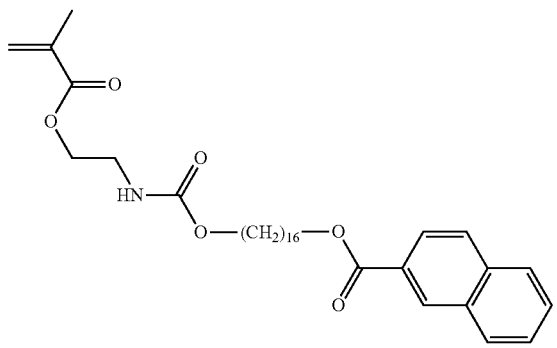

Chemical structure 4

Synthesis of Copolymer 0.18 g (2.5 mmol) of acrylic acid (manufactured by Sigma-Aldrich Corporation), 5.68 g (10.0 mmol) of the monomer M-4 having the structure represented by the Chemical formula 4, 0.29 g (2.5 mmol) of maleic acid (manufactured by Wako Pure Chemical Industries), and 0.12 g (0.75 mmol) of 2,2'-azobis(isobutylonitrile) (manufactured by Tokyo Chemical Industry Co., Ltd.) were dissolved in 60 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 5.73 g of copolymer CP-24 (yield: 93.2 percent). The number average molecular weight (Mn) was 8,200 and the weight average molecular weight (Mw) was 17,000. The IR spectrum of the thus-obtained copolymer CP-24 was similar to that of the copolymer CP-13 of Example 13.

Example 25 Synthesis of Copolymer CP-25

5.47 g of copolymer CP-25 of Example 25 was obtained in the following method synthesizing a copolymer (yield: 92.8%). The number average molecular weight (Mn) was 8,100 and the weight average molecular weight (Mw) was 16,100. The IR spectrum of the thus-obtained copolymer CP-25 was similar to that of the copolymer CP-13 of Example 13.

Synthesis of Copolymer 0.69 g (8.0 mmol) of methacrylic acid (manufactured by Sigma-Aldrich Corporation), 4.27 g (10.0 mmol) of the monomer M-2 having the structure represented by the Chemical formula 2, 0.93 g (8.0 mmol) of maleic acid (manufactured by Wako Pure Chemical Industries), and 0.21 g (1.30 mmol) of 2,2'-azobis(isobutylonitrile) (manufactured by Tokyo Chemical Industry Co., Ltd.) were dissolved in 104 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-25.

Example 26 Synthesis of Copolymer CP-26

5.47 g of copolymer CP-26 of Example 26 was obtained in the following method synthesizing a copolymer (yield: 92.8%) The number average molecular weight (Mn) was 8,500 and the weight average molecular weight (Mw) was 16,700. The IR spectrum, of the thus-obtained copolymer CP-26 was similar to that of the copolymer CP-13 of Example 13.

Synthesis of Copolymer 0.58 g (8.0 mmol) of methacrylic acid (manufactured by Sigma-Aldrich Corporation), 4.27 g (10.0 mmol) of the monomer M-2 having the structure represented by the Chemical formula 2, 0.93 g (8.0 mmol) of maleic acid (manufactured by Wako Pure Chemical Industries), and 0.23 g (1.40 mmol) of 2,2'-azobis(isobutylonitrile) (manufactured by Tokyo Chemical Industry Co., Ltd.) were dissolved in 122 ml of mmethylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer CP-26.

Example 27 Synthesis of Copolymer CP-27

4.40 g (yield: 92.8 percent) of a copolymer of Example 27 was obtained in the same manner as in Example 14 except that the amount of methylethylketone used for synthesis of the copolymer of Example 14 was changed to 150 mL. The number average molecular weight (Mn) was 5,100 and the weight average molecular weight (Mw) was 8,500. The IR spectrum of the thus-obtained copolymer CP-27 was similar to that of the copolymer CP-13 of Example 13.

Example 28 Synthesis of Copolymer CP-28

4.42 g (yield: 93.1 percent) of a copolymer of Example 28 was obtained in the same manner as in Example 14 except that the amount of methylethylketone used for synthesis of the copolymer of Example 14 was changed to 30 mL. The number average molecular weight (Mn) was 12,600 and the weight average molecular weight (Mw) was 25,900. The IR spectrum of the thus-obtained copolymer CP-28 was similar to that of the copolymer CP-13 of Example 13.

Example 29 Synthesis of Copolymer CP-29

4.41 g (yield: 93.0 percent) of a copolymer of Example 29 was obtained in the same manner as in Example 14 except that the amount of methylethylketone used for synthesis of the copolymer of Example 14 was changed to 20 mL. The number average molecular weight (Mn) was 17,500 and the weight average molecular weight (Mw) was 34,900. The IR spectrum of the thus-obtained copolymer CP-29 was similar to that of the copolymer CP-13 of Example 13.

Example 30 Synthesis of Copolymer CP-30

4.41 g (yield: 92.9 percent) of a copolymer of Example 30 was obtained in the same manner as in Example 14 except that the amount of methylethylketone used for synthesis of the copolymer of Example 14 was changed to 15 mL. The number average molecular weight (Mn) was 21,700 and the weight average molecular weight (Mw) was 43,600. The IR spectrum of the thus-obtained copolymer 53 was similar to that of the copolymer of Example 13.

The structures of the copolymers of Examples 13 to 30 are shown in Table 2.

TABLE 2

| | Copolymer | Monomer [I:III]:II | R1 | R2 | X | L |
|---|---|---|---|---|---|---|
| Example 13 | CP-13 | [(8):(8)]:(10) | H | $CH_3$ | TEA | $-(CH_2)_6-$ |
| Example 14 | CP-14 | [(2.5):(2.5)]:(10) | H | $CH_3$ | TEA | $-(CH_2)_6-$ |
| Example 15 | CP-15 | [(1.5):(1.5)]:(10) | H | $CH_3$ | TEA | $-(CH_2)_6-$ |
| Example 16 | CP-16 | [(2):(2))](10) | H | $CH_3$ | TEA | $-(CH_2)_6-$ |
| Example 17 | CP-17 | [(17):(17)]:(10) | H | $CH_3$ | TEA | $-(CH_2)_6-$ |
| Example 18 | CP-18 | [(15):(15)]:(10) | H | $CH_3$ | TEA | $-(CH_2)_6-$ |
| Example 19 | CP-19 | [(25):(25)]:(10) | H | $CH_3$ | TEA | $-(CH_2)_6-$ |
| Example 20 | CP-20 | [(0.5):(0.5)]:(10) | H | $CH_3$ | TEA | $-(CH_2)_6-$ |
| Example 21 | CP-21 | [(50):(50)]:(10) | H | $CH_3$ | TEA | $-(CH_2)_6-$ |
| Example 22 | CP-22 | [(2.5):(2.5)]:(10) | H | $CH_3$ | TEA | $-(CH_2)_2-$ |
| Example 23 | CP-23 | [(2.5):(2.5)]:(10) | H | $CH_3$ | TEA | $-(CH_2)_6-$ |
| Example 24 | CP-24 | [(2.5):(2.5)]:(10) | $CH_3$ | $CH_3$ | TEA | $-(CH_2)_{16}-$ |
| Example 25 | CP-25 | [(8):(8)]:(10) | H | $CH_3$ | TEA | $-(CH_2)_2-$ |
| Example 26 | CP-26 | [(8):(8)]:(10) | H, $CH_3$ | $CH_3$ | TEA | $-(CH_2)_6-$ |
| Example 27 | CP-27 | [(2.5):(2.5)]:(10) | H | $CH_3$ | TEA | $-(CH_2)_2-$ |
| Example 28 | CP-28 | [(2.5):(2.5)]:(10) | H | $CH_3$ | TEA | $-(CH_2)_2-$ |
| Example 29 | CP-29 | [(2.5):(2.5)]:(10) | H | $CH_3$ | TEA | $-(CH_2)_2-$ |
| Example 30 | CP-30 | [(2.5):(2.5)]: | H | $CH_3$ | TEA | $-(CH_2)_2-$ |

| | Polymerization method | Mv | Mw |
|---|---|---|---|
| Example 13 | Solution polymerization | 8,300 | 15,700 |
| Example 14 | Solution polymerization | 8,500 | 15,600 |
| Example 15 | Solution polymerization | 8,600 | 17,200 |
| Example 16 | Solution polymerization | 8,600 | 16,400 |
| Example 17 | Solution polymerization | 8,500 | 15,700 |
| Example 18 | Solution polymerization | 8,400 | 15,900 |
| Example 19 | Solution polymerization | 8,400 | 15,800 |
| Example 20 | Solution polymerization | 8,600 | 15,600 |
| Example 21 | Solution polymerization | 8,500 | 16,300 |
| Example 22 | Solution polymerization | 8,300 | 16,600 |
| Example 23 | Solution polymerization | 8,500 | 15,400 |
| Example 24 | Solution polymerization | 8,200 | 17,000 |
| Example 25 | Solution polymerization | 8,100 | 16,100 |
| Example 26 | Solution polymerization | 8,500 | 16,700 |
| Example 27 | Solution polymerization | 5,100 | 8,500 |
| Example 28 | Solution polymerization | 12,600 | 25,900 |
| Example 29 | Solution polymerization | 17,500 | 34,900 |
| Example 30 | Solution polymerization | 21,700 | 43,600 |

Preparation of Ink

The ink of the present disclosure is specifically described comparing with Comparative Examples.

Example 51 (Ink Example 1): Preparation of Aqueous Ink GJ-1

Preparation of Pigment Dispersion PD-1

16.0 parts of carbon black (NIPEX150, manufactured by Degussa AG) was added to 84.0 parts of the aqueous solution of copolymer CP-1 prepared in Example 1 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain 95.0 parts of a pigment dispersion PD-1 (pigment solid portion concentration: 16 percent).

Preparation of Ink 45.0 parts of the pigment dispersion PD-1, 10.0 parts of 1,3-butanediol, 10.0 parts of glycerin, 10.0 parts of 3-methoxy-N,N-dimethyl propionamide, 1.0 part of fluorine-containing surfactant (ZONYL™ FS-300, solid portion: 40 percent by weight, manufactured by E. I. du Pont de Nemours and Company), and 24.0 parts of deionized water were mixed followed by stirring for one hour and filtration by a membrane filter having an opening diameter of 1.2 micro meter to obtain an aqueous ink GJ-1 of the present disclosure.

Example 52 (Ink Example 2): Preparation of Aqueous Ink GJ-2

Pigment dispersion PD-2 was obtained in the same manner as in Example 51 (Ink Example 1) except that the aqueous solution of copolymer CP-2 was used instead of the aqueous solution of copolymer CP-1 in the preparation of the pigment dispersion of Example 51 (Ink Example 51).

Thereafter, aqueous ink GJ-2 of the present disclosure was obtained in the same manner as in Ink Example 1 (Example 51) except that the pigment dispersion PD-2 was used instead of the pigment dispersion PD-1 in the manufacturing of the ink of Ink Example 1 (Example 51).

Example 53 (Ink Example 3): Preparation of Aqueous Ink GJ-3

Pigment dispersion PD-3 was obtained in the same manner as in Example 51 (Ink Example 1) except that the aqueous solution of copolymer CP-3 was used instead of the aqueous solution of copolymer CP-1 in the preparation of the pigment dispersion of Example 51 (Ink Example 51).

Thereafter, aqueous ink GJ-3 of the present disclosure was obtained in the same manner as in Ink Example 2 (Example 51) except that the pigment dispersion PD-3 was used instead of the pigment dispersion PD-1 in the manufacturing of the ink of Ink Example 1 (Example 51).

Example 54 (Ink Example 4): Preparation of Aqueous Ink GJ-4

Pigment dispersion PD-4 was obtained in the same manner as in Example 51 (Ink Example 1) except that the aqueous solution of copolymer CP-4 was used instead of the aqueous solution of copolymer CP-1 in the preparation of the pigment dispersion of Example 51 (Ink Example 51).

Thereafter, aqueous ink GJ-4 of the present disclosure was obtained in the same manner as in Ink Example 51 (Example 1) except that the pigment dispersion PD-4 was used instead of the pigment dispersion PD-1 in the manufacturing of the ink of Ink Example 1 (Example 51).

Example 55 (Ink Example 5): Preparation of Aqueous Ink GJ-5

Pigment dispersion PD-5 was obtained in the same manner as in Example 51 (Ink Example 1) except that the aqueous solution of copolymer CP-5 was used instead of the aqueous solution of copolymer CP-1 in the preparation of the pigment dispersion of Example 51 (Ink Example 51).

Thereafter, aqueous ink GJ-5 of the present disclosure was obtained in the same manner as in Ink Example 51 (Example 1) except that the pigment dispersion PD-5 was used instead of the pigment dispersion PD-1 in the manufacturing of the ink of Ink Example 1 (Example 51).

Example 56 (Ink Example 6): Preparation of Aqueous Ink GJ-6

Pigment dispersion PD-6 was obtained in the same manner as in Example 51 (Ink Example 1) except that the aqueous solution of copolymer CP-6 was used instead of the aqueous solution of copolymer CP-1 in the preparation of the pigment dispersion of Example 51 (Ink Example 51).

Thereafter, aqueous ink GJ-6 of the present disclosure was obtained in the same manner as in Ink Example 51 (Example 1) except that the pigment dispersion PD-6 was used instead of the pigment dispersion PD-1 in the manufacturing of the ink of Ink Example 1 (Example 51).

Example 57 (Ink Example 7): Preparation of Aqueous Ink GJ-7

Pigment dispersion PD-7 was obtained in the same manner as in Example 51 (Ink Example 1) except that the aqueous solution of copolymer CP-7 was used instead of the aqueous solution of copolymer CP-1 in the preparation of the pigment dispersion of Example 51 (Ink Example 51).

Thereafter, aqueous ink GJ-7 of the present disclosure was obtained in the same manner as in Ink Example 51 (Example 1) except that the pigment dispersion PD-7 was used instead of the pigment dispersion PD-1 in the manufacturing of the ink of Ink Example 1 (Example 51).

Example 58 (Ink Example 8): Preparation of Aqueous Ink GJ-8

Pigment dispersion PD-8 was obtained in the same manner as in Example 51 (Ink Example 1) except that the aqueous solution of copolymer CP-8 was used instead of the aqueous solution of copolymer CP-1 in the preparation of the pigment dispersion of Example 51 (Ink Example 51).

Thereafter, aqueous ink GJ-8 of the present disclosure was obtained in the same manner as in Ink Example 51 (Example 1) except that the pigment dispersion PD-8 was used instead of the pigment dispersion PD-1 in the manufacturing of the ink of Ink Example 1 (Example 51).

Example 59 (Ink Example 9): Preparation of Aqueous Ink GJ-9

Pigment dispersion PD-9 was obtained in the same manner as in Example 51 (Ink Example 1) except that the aqueous solution of copolymer CP-9 was used instead of the aqueous solution of copolymer CP-1 in the preparation of the pigment dispersion of Example 51 (Ink Example 51).

Thereafter, aqueous ink GJ-9 of the present disclosure was obtained in the same manner as in Ink Example 51 (Example 1) except that the pigment dispersion PD-9 was used instead of the pigment dispersion PD-1 in the manufacturing of the ink of Ink Example 1 (Example 51).

Example 60 (Ink Example 10): Preparation of Aqueous Ink GJ-10

Pigment dispersion PD-10 was obtained in the same manner as in Example 51 (Ink Example 1) except that the aqueous solution of copolymer CP-10 was used instead of the aqueous solution of copolymer CP-1 in the preparation of the pigment dispersion of Example 51 (Ink Example 51).

Thereafter, aqueous ink GJ-10 of the present disclosure was obtained in the same manner as in Ink Example 51 (Example 1) except that the pigment dispersion PD-10 was used instead of the pigment dispersion PD-1 in the manufacturing of the ink of Ink Example 1 (Example 51).

Example 61 (Ink Example 11): Preparation of Aqueous Ink GJ-11

A pigment dispersion PD-11 was obtained in the same manner as in Example 51 (Ink Example 1) except that Pigment Blue 15:-11 (Chromofine Blue, manufactured by Dainichiseika Color & Chemicals Mfg. Co., Ltd.) was used instead of carbon black (NIPEX, manufactured by Degussa AG) in the preparation of the pigment dispersion of Example 51 (Ink Example 1) and the solid portion concentration was changed to 20.0 percent.

30.0 parts of the pigment dispersion PD-11, 15.0 parts of 1,3-butanediol, 10.0 parts of glycerin, 20.0 parts of 3-methoxy-N,N-dimethyl propionamide, 1.0 part of fluorine-containing surfactant (ZONYL™ FS-300, solid portion: 40 percent by weight, manufactured by E. I. du Pont de Nemours and Company), and 24.0 parts of deionized water were mixed followed by stirring for one hour and filtration by a membrane filter having an opening diameter of 1.2 micro meter to obtain an aqueous ink GJ-11 of the present disclosure.

Example 62 (Ink Example 12): Preparation of Aqueous Ink GJ-12

A pigment dispersion PD-12 was obtained in the same manner as in Example 51 (Ink Example 1) except that Pigment Red 122 (magenta pigment: Toner Magenta E002, manufactured by Clariant Japan K.K.) was used instead of carbon black (NIPEX150, manufactured by Degussa AG) in the preparation of the pigment dispersion of Example 51 (Ink Example 1) and the solid portion concentration was changed to 20.0 percent.

Thereafter, aqueous ink GJ-12 of the present disclosure was obtained in the same manner as in Example 51 except that the pigment dispersion PD-12 was used instead of the pigment dispersion PD-1 in the manufacturing of the ink of Example 51.

Example 63 (Ink Example 13): Preparation of Aqueous Ink GJ-13

A pigment dispersion PD-13 was obtained in the same manner as in Example 51 (Ink Example 51) except that yellow pigment (Fast Yellow 531, manufactured by Dainichiseika Color & Chemicals Mfg. Co., Ltd.) was used instead of carbon black (NIPEX150, manufactured by Degussa AG) in the preparation of the pigment dispersion of Example 51 (Ink Example 1) and the solid portion concentration was changed to 20.0 percent.

Thereafter, aqueous ink GJ-13 of the present disclosure was obtained in the same manner as in Ink Example 61 (Example 11) except that the pigment dispersion PD-13 was used instead of the pigment dispersion PD-11 in the manufacturing of the ink of Ink Example 11 (Example 61).

Example 64 (Ink Example 14): Preparation of Aqueous Ink GJ-14

Preparation of Pigment Dispersion CB-K

The following recipe was mixed and stirred for 30 minutes to prepare an aqueous solution 1.

| | |
|---|---|
| 2-ethyl-1,3-hexane diol: | 2.00 parts |
| Glycerol: | 10.00 parts |
| 3-methoxy-N,N-dimethyl propaneamide: | 15.00 parts |
| 3-buthoxy-N,N-dimethyl propaneamide: | 15.00 parts |
| 2-(cyclohexylamono) ethane sulfonic acid | 0.05 parts |
| 2,4,7,9-tetramethyl-4,7-decanediol: | 0.50 parts |
| Fluorine-containing surfactant: (ZONYL FS-300, manufactured by E. I. du Pont de Nemours and Company): | 0.25 parts |
| Diethanol amine: | 0.01 parts |
| Deionized water: | 12.93 parts |

Thereafter, 50 g of dried carbon black, 100 mL of deionized water, and 15.5 g (50 mmol) of the compound having the following Chemical structure 10 were mixed. The mixture was heated to 60 degrees C. while being stirred at 300 rpm. 50 mmol of 20 percent sodium nitrite aqueous solution was added in 15 minutes. Thereafter, the resultant was stirred at 60 degrees C. for three hours. The resultant was diluted with 75 mL of deionized water followed by filtration. Deionized water was added in such a manner that the solid portion concentration of the filtrate was 20.0 percent to obtain pigment dispersion CB-K of carbon black.

Chemical structure 10

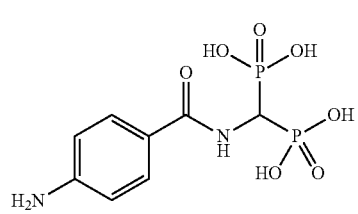

Thereafter, 37.50 parts of the pigment dispersion CB-K was added to the aqueous solution 1 followed by stirring for 30 minutes. Furthermore, 6.67 parts of the copolymer CP-11 (solid portion concentration: 30 percent) was added followed by stirring for 30 minutes. Thereafter, aqueous ink GJ-14 of the present disclosure was obtained by filtering the resultant with a membrane filter having an average hole diameter of 1.2 μm.

Example 65 (Ink Example 15): Preparation of Aqueous Ink GJ-15

Preparation of Pigment Dispersion CB-C

The following recipe was mixed and stirred for 30 minutes to prepare an aqueous solution 2.

| | |
|---|---|
| 2-ethyl-1,3-hexane diol: | 2.00 parts |
| Glycerol: | 10.00 parts |
| 3-methoxy-N,N-dimethyl propaneamide: | 20.00 parts |
| 3-buthoxy-N,N-dimethyl propaneamide: | 20.00 parts |
| 2-(cyclohexylamono) ethane sulfonic acid: | 0.05 parts |
| 2,4,7,9-tetramethyl-4,7-decanediol: | 0.50 parts |
| Fluorine-containing surfactant: (ZONYL FS-300, manufactured by E. I. du Pont de Nemours and Company): | 0.25 parts |
| Diethanol amine: | 0.01 parts |
| Deionized water: | 17.93 parts |

Thereafter, 4.50 g of p-amino benzoate was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of copper phthalocyanine pigment (PB15:4, manufactured by Sun Chemical Corporation) was added followed by mixing at 8,500 rpm for one hour. Furthermore, a solution in which 4.5 g of p-amino benzoic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained cyan pigment was dispersed in water. Coarse particles were removed by centrifugal and deionized water was added in such a manner that the solid portion concentration was 20.0% to obtain a cyan pigment dispersion CB-C having a surface treated with p-amino benzoic acid.

Thereafter, 22.50 parts of the pigment dispersion CB-C was added to the aqueous solution 2 followed by stirring for 30 minutes. Furthermore, 6.67 parts of the copolymer CP-12 (solid portion concentration: 30 percent) was added followed by stirring for 30 minutes. Thereafter, aqueous ink GJ-15 of the present disclosure was obtained by filtering the resultant with a membrane filter having an average hole diameter of 1.2 μm.

Example 66 (Ink Example 16): Preparation of Aqueous Ink GJ-16

Liquid Dispersion CB-M of Magenta Pigment

The aqueous solution 1 was prepared in the same manner as in Example 64 (Ink Example 14).

Thereafter, 4.50 g of sulphanilic acid was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of magenta pigment (PR122, manufactured by Sun Chemical Corporation) was added followed by mixing at 8,500 rpm for one hour. Furthermore, a solution in which 4.5 g of sulphanilic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained magenta pigment was dispersed in water. Coarse particles were removed by centrifugal and deionized water was added in such a manner that the solid portion concentration was 20.0% to obtain a magenta pigment dispersion CB-M having a surface treated with sulphanilic acid.

Thereafter, 37.50 parts of the pigment dispersion CB-M was added to the aqueous solution 1 followed by stirring for 30 minutes. Furthermore, 6.67 parts of the copolymer CP-12 (solid portion concentration: 30 percent) was added followed by stirring for 30 minutes. Thereafter, aqueous ink GJ-16 of the present disclosure was obtained by filtering the resultant with a membrane filter having an average hole diameter of 1.2 μm.

Example 67 (Ink Example 17): Preparation of Aqueous Ink GJ-17

The aqueous solution 2 was prepared in the same manner as in Example 65 (Ink Example 15). 22.50 parts of the cyan pigment dispersion PD-1 prepared in Example 61 (i.e., dispersion element formed of the copolymer CP-1) was added to the aqueous solution followed by stirring for 30 minutes. Furthermore, 6.67 parts of the copolymer CP-12 (solid portion concentration: 30 percent) was added followed by stirring for 30 minutes. Thereafter, aqueous ink GJ-17 of the present disclosure was obtained by filtering the resultant with a membrane filter having an average hole diameter of 1.2 μm.

Ink Comparative Example 1: Preparation of Comparative Aqueous Ink RGJ-1

4.82 g of copolymer RCP-1 (weight average molecular weight (Mw): 7,500, number average molecular weight (Mn): 2,800) was obtained in the same manner as in Example 1 except that the monomer M-1 in Example 1 was changed to the monomer having a structure represented by the following Chemical structure 11.

Chemical structure 11

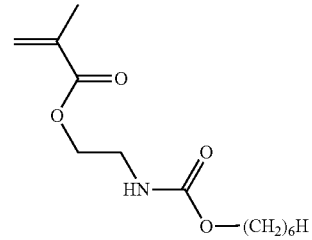

Using the copolymer RCP-1, the aqueous solution of comparative copolymer RCP-1 was prepared in the same manner as in Example 51 (Ink Example 1).

That is, comparative pigment dispersion RPD-1 was obtained in the same manner as in Example 51 (Ink Example 1) except that the comparative copolymer RCP-1 was used instead of the copolymer CP-1 in the preparation of the pigment dispersion of Example 51 (Ink Example 1).

Thereafter, comparative aqueous ink RGJ-1 was obtained in the same manner as in Ink Example 51 (Example 1) except that the comparative pigment dispersion RPD-1 was used instead of the pigment dispersion PD-1 in the manufacturing of the ink of Ink Example 51 (Example 1).

Ink Comparative Example 2: Preparation of Comparative Aqueous Ink RGJ-2

Comparative pigment dispersion RPD-2 was obtained in the same manner as in Example 61 (Ink Example 11) except that the comparative copolymer RCP-1 was used instead of the copolymer CP-1 in the preparation of the pigment dispersion of Example 61 (Ink Example 11).

Thereafter, comparative aqueous ink RGJ-2 was obtained in the same manner as in Ink Example 61 (Example 11) except that the comparative pigment dispersion RPD-2 was used instead of the pigment dispersion PD-11 in the manufacturing of the ink of Ink Example 61 (Example 11).

Ink Comparative Example 3: Preparation of Comparative Aqueous Ink RGJ-3

Comparative pigment dispersion RPD-3 was obtained in the same manner as in Example 62 (Ink Example 12) except that the comparative copolymer RCP-1 was used instead of the copolymer CP-1 in the preparation of the pigment dispersion of Example 62 (Ink Example 12).

Thereafter, comparative aqueous ink RGJ-3 was obtained in the same manner as in Ink Example 62 (Example 12) except that the comparative pigment dispersion RPD-3 was used instead of the pigment dispersion PD-12 in the manufacturing of the ink of Ink Example 621 (Example 12).

Ink Comparative Example 4: Preparation of Comparative Aqueous Ink RGJ-4

Comparative pigment dispersion RPD-4 was obtained in the same manner as in Example 63 (Ink Example 13) except that the comparative copolymer RCP-1 was used instead of the copolymer CP-1 in the preparation of the pigment dispersion of Example 63 (Ink Example 13).

Thereafter, comparative aqueous ink RGJ-4 was obtained in the same manner as in Ink Example 63 (Example 13) except that the comparative pigment dispersion RPD-4 was used instead of the pigment dispersion PD-13 in the manufacturing of the ink of Ink Example 63 (Example 13).

Ink Comparative Example 5: Preparation of Comparative Aqueous Ink RGJ-5

Synthesis of Comparative Copolymer RCP-2

80 g of 2-phenoxyethyl methacrylate as monomer, 3.7 g of 3-mercapto-1-propanol as chain transfer agent, and 0.3 g of 2,2-azobis(2,4-dimethyl valero nitrile) as initiator were dissolved in 160 mL of tetrahydrofuran (THF) followed by heating to 65 degrees C. to conduct reaction in nitrogen atmosphere for seven hours. The thus-obtained solution was naturally cooled down and 80 mg of dibutyl tin (IV) dilaurate and a catalyst amount of hydroquinone were added thereto. 10.0 g of 2-methacryloyloxy ethylisocyanate was dripped to the resultant. The resultant was heated to 50 degrees C. to conduct reaction for 2.5 hours. Thereafter, the resultant was re-precipitated by a liquid mixture of water and methanol for refinement to obtain 71 g of macromonomer MM-1 (weight average molecular weight (Mw): 4,000, number average molecular weight (Mn): 1,900).

Thereafter, 20 g of methylethylketone was heated to 75 degrees C. in nitrogen atmosphere. A solution in which 1.16 g of dimethyl-2,2'-azobis isobutylate, 9 g of macromonomer MM-21 obtained as described above, 1.8 g of p-styrene sulfonic acid, and 49.2 g of methylmethacrylate were dissolved in 40 g of methylethylketone was dripped to the heated methylethylketone in three hours. After the dripping, the reaction was caused to continue another hour. Thereafter, a solution in which 0.6 g of methylethylketone was dissolved in 0.2 g of dimethyl-2,2'-azobis isobutylate was added followed by heating to 80 degrees C. and stirring for four hours while being heated. Furthermore, a solution in which 0.2 g of dimethyl-2,2'-azobis isobutylate was dissolved in 0.6 g of methylethylketone was added followed by stirring for six hours while being heated. Subsequent to being cooled down, the thus-obtained reaction solution was dripped to hexane to precipitate a graft polymer followed by filtration and drying to obtain comparative copolymer RCP-2.

Comparative Example RPD-5: Preparation of Comparative Aqueous Ink RGJ-5

Thereafter, comparative pigment dispersion RPD-5 was obtained in the same manner as in Example 51 (Ink Example 1) except that the comparative copolymer RCP-2 was used instead of the copolymer CP-1 in the preparation of the pigment dispersion of Example 51 (Ink Example 1).

Thereafter, comparative aqueous ink RGJ-5 was obtained in the same manner as in Ink Example 51 (Example 1) except that the comparative pigment dispersion RPD-5 was used instead of the pigment dispersion PD-1 in the manufacturing of the ink of Ink Example 51 (Example 1).

Ink Comparative Example 6: Preparation of Comparative Aqueous Ink RGJ-6

The aqueous solution 2 was prepared in the same manner as in Example 65 (Ink Example 15). 22.50 parts of the cyan pigment dispersion 35 (solid portion: 20.0 percent) prepared in Example 35 was added to the aqueous solution 2 followed by stirring for 30 minutes. Furthermore, 6.67 parts of the comparative copolymer RCP-3 (solid portion concentration: 30 percent) was added followed by stirring for 30 minutes.

Thereafter, comparative aqueous ink RGJ-6 was obtained by filtering the resultant with a membrane filter having an average hole diameter of 1.2 μm.

Ink Comparative Example 7: Preparation of Comparative Aqueous Ink RGJ-7

The aqueous solution 1 was prepared in the same manner as in Example 66 (Ink Example 16). 37.50 parts of the magenta pigment dispersion CB-M (solid portion: 20.0 percent) prepared in Example 36 was added to the aqueous solution 1 followed by stirring for 30 minutes. Furthermore, 6.67 parts of the comparative copolymer RCP-3 (solid portion concentration: 30 percent) was added followed by stirring for 30 minutes. Thereafter, comparative aqueous ink RGJ-7 was obtained by filtering the resultant with a membrane filter having an average hole diameter of 1.2 μm.

Ink Comparative Example 8: Preparation of Comparative Aqueous Ink RGJ-8

Thereafter, comparative aqueous ink RGJ-8 was obtained in the same manner as in Example 67 (Ink Example 17) except that the comparative pigment dispersion RPD-2 was used instead of the cyan pigment dispersion PD-11 in the manufacturing of the ink of Example 37 and the comparative copolymer RCP-3 was used instead of the copolymer CP-12.

Characteristics of the pigment dispersion and aqueous inks prepared in Examples and Comparative Examples were evaluated in the following manner.

The results of the pigment dispersions are shown in Table 3 and the results of the inks are shown in Table 4.

TABLE 3

| | Dispersion element of pigment | Copolymer | Coloring material | Storage stability of pigment dispersion |
|---|---|---|---|---|
| Example 51 (Ink Example 1) | PD-1 | CP-1 | Carbon black | A |
| Example 52 (Ink Example 2) | PD-2 | CP-2 | Carbon black | A |
| Example 53 (Ink Example 3) | PD-3 | CP-3 | Carbon black | A |
| Example 54 (Ink Example 4) | PD-4 | CP-4 | Carbon black | A |
| Example 55 (Ink Example 5) | PD-5 | CP-5 | Carbon black | A |
| Example 56 (Ink Example 6) | PD-6 | CP-6 | Carbon black | A |
| Example 57 (Ink Example 7) | PD-7 | CP-7 | Carbon black | A |
| Example 58 (Ink Example 8) | PD-8 | CP-8 | Carbon black | B |
| Example 59 (Ink Example 9) | PD-9 | CP-9 | Carbon black | B |
| Example 60 (Ink Example 10) | PD-10 | CP-10 | Carbon black | B |
| Example 61 (Ink Example 11) | PD-11 | CP-11 | Cyan pigment | A |
| Example 62 (Ink Example 12) | PD-12 | CP-12 | Magenta pigment | A |
| Example 63 (Ink Example 13) | PD-13 | CP-13 | Yellow pigment | A |
| Comparative Ink Example 1 | RPD-1 | RCP-1 | Carbon black | C |
| Comparative Ink Example 2 | RPD-2 | RCP-1 | Cyan pigment | C |
| Comparative Ink Example 3 | RPD-3 | RCP-1 | Magenta pigment | C |
| Comparative Ink Example 4 | RPD-4 | RCP-1 | Yellow pigment | C |
| Comparative Ink Example 5 | RPD-5 | RCP-2 | Carbon Black | C |

The pigment dispersions prepared by using the copolymers having a naphtyl group at their end of the side chain of Examples 51 to 63 have excellent storage stability in comparison with the pigment dispersions prepared by using the copolymers having no naphtyl group at their end of the side chain of Comparative Examples 1 to 5. This is inferred to be the result of improved adsorption property to the pigment due to the π-π interaction between the naphtyl group in the copolymer and the pigment The inks manufactured by using the dispersion elements formed of the copolymers having a naphtyl group at the end of the side chain thereof in Examples 51 to 63 and 67 have high levels of storage stability and are excellent with regard to image density and beading in comparison with the inks manufactured by using the dispersion elements formed of the copolymers having no naphtyl group at the end of the side chain thereof in Comparative Examples 1 to 5 and 8.

Moreover, the inks manufactured by adding emulsions formed of the copolymers having a naphtyl group at their end of the side chain of Examples 64 to 67 are particularly excellent with regard to beading in comparison with the inks manufactured by adding emulsions formed of the copolymers having no naphtyl group at their end of the side chain thereof of Comparative Examples 6 to 8. This is inferred that, due to π-π stacking between the naphtyl group present in the emulsion and the pigment in the ink, the pigment rapidly agglomerates on the surface of a recording medium during printing, thereby to prevent occurrence of beading.

Storage Stability of Pigment Dispersion

A glass container was filled with each pigment dispersion and stored at 70 degrees C. for two weeks. The change rate of the viscosity after storage to the viscosity before storage was obtained from the following relation and evaluated according to the following criteria.

Change rate of viscosity (%)=(Viscosity of pigment dispersion after storage)/viscosity of pigment dispersion before storage)×100

The viscosity was measured by a viscometer (RE80L, manufactured by TOKI SANGYO CO., LTD.) to measure the viscosity of the ink at 25 degrees C. at 50 rotations.

Evaluation Criteria
A: Change rate of viscosity within + or −5%
B: change rate of viscosity within the range of from −8% to less than −5% and more than 5% to 8%
C: change rate of viscosity within −10% to less than −8% and greater than 8% to 10%.
D: change rate of viscosity within the range of from less than −10% to −30% and more than 10% to 30%
E: change rate of viscosity less than 30% or greater than 30% (gelated to the degree that evaluation was not possible)

Storage Stability of Ink

An ink cartridge was filled with each ink and stored at 70 degrees C. for one week. The change rate of the viscosity after the storage to the viscosity before the storage was obtained from the following relation and evaluated according to the following criteria.

The change rate of viscosity (%)=(Viscosity of ink after storage)/viscosity of ink before storage)×100

The viscosity was measured by a viscometer (RE80L, manufactured by TOKI SANGYO CO., LTD.) to measure the viscosity of the ink at 25 degrees C. at 50 rotations.

Evaluation Criteria
A: Change rate of viscosity within + or −5%
B: change rate of viscosity within the range of from −8% to less than −5% and more than 5% to 8%
C: change rate of viscosity within −10% to less than −8% and greater than 8% to 10%.
D: change rate of viscosity within the range of from less than −10% to −30% and more than 10% to 30%
E: change rate of viscosity less than 30% or greater than 30% (gelated to the degree that evaluation was not possible)

Image Density

An inkjet printer (IPSiO GX5000, manufactured by Ricoh Company Lt.) was filled with each ink at 23 degrees C. and 50 percent RH. A list including general symbols of 64 point JIS X 0208 (1997) and 2223 made by Microsoft Word 2000 (manufactured by Microsoft Corporation) was printed on plain paper 1 (Xerox 4200, manufactured by Xerox Corporation) and paper 2 (MyPaper, manufactured by Ricoh Company Ltd.). The symbol portion on image surface was measured by X-Rite 938 (manufactured by X-Rite Inc.) and evaluated according to the following criteria.

The printing mode used was: A modified mode in which "Plain Paper—Standard Fast" was modified to "No Color Calibration" from the user setting for plain paper by the driver installed onto the printer.

Incidentally, the symbols of JIS X 0208 (1997) and 2223 have squares for the exterior and the inside thereof was entirely painted with ink.

Evaluation Criteria
A: 1.25 or higher
B: 1.20 to less than 1.25
C: 1.10 to less than 1.20

D: Less than 1.10
E: pigment was gelated and not dispersed, impossible to print symbols.

Beading

The general symbols of JIS X 0208 (1997) and 2223 of 5 were printed in the same manner as for Image Density except that the print mode was changed to the mode "gloss paper—fast" using LumiArt Gloss 90 GSM™ (manufactured by Stora Enso Japan K.K.) as the recording medium and the printed symbols were evaluated according to the following criteria.

Evaluation Criteria

A: No beading or beading occurred to less than 10% of the entire image
B: Beading occurred to 10% to less than 20% of the entire image
C: Beading occurred to 20% to less than 40% of the entire image
D: Beading occurred to 40% to less than 90% of the entire image
E: Beading occurred to 90% or more of the entire image
F: Gelated pigment not dispersed in ink, impossible to print symbols

TABLE 4

| | Ink | Dispersion element of pigment | Copolymer | Usage | Coloring material |
|---|---|---|---|---|---|
| Example 51 (Ink Example 1) | GJ-1 | PD-1 | CP-1 | Pigment dispersion | Carbon black |
| Example 52 (Ink Example 2) | GJ-2 | PD-2 | CP-2 | Pigment dispersion | Carbon black |
| Example 53 (Ink Example 3) | GJ-3 | PD-3 | CP-3 | Pigment dispersion | Carbon black |
| Example 54 (Ink Example 4) | GJ-4 | PD-4 | CP-4 | Pigment dispersion | Carbon black |
| Example 55 (Ink Example 5) | GJ-5 | PD-5 | CP-5 | Pigment dispersion | Carbon black |
| Example 56 (Ink Example 6) | GJ-6 | PD-6 | CP-6 | Pigment dispersion | Carbon black |
| Example 57 (Ink Example 7) | GJ-7 | PD-7 | CP-7 | Pigment dispersion | Carbon black |
| Example 58 (Ink Example 8) | GJ-8 | PD-8 | CP-8 | Pigment dispersion | Carbon black |
| Example 59 (Ink Example 9) | GJ-9 | PD-9 | CP-9 | Pigment dispersion | Carbon black |
| Example 60 (Ink Example 10) | GJ-10 | PD-10 | CP-10 | Pigment dispersion | Carbon black |
| Example 61 (Ink Example 11) | GJ-11 | PD-11 | CP-1 | Pigment dispersion | Cyan pigment |
| Example 62 (Ink Example 12) | GJ-12 | PD-12 | CP-1 | Pigment dispersion | Magenta pigment |
| Example 63 (Ink Example 13) | GJ-13 | PD-13 | CP-1 | Pigment dispersion | Cyan pigment |
| Example 64 (Ink Example 14) | GJ-14 | CB-K | CP-11 | Addition | Carbon black |
| Example 65 (Ink Example 15) | GJ-15 | CB-C | CP-12 | Addition | Cyan pigment |
| Example 66 (Ink Example 16) | GJ-16 | CB-M | CP-13 | Addition | Magenta pigment |
| Example 67 (Ink Example 17) | GJ-17 | PD-11 | CP-1 + 3 | Pigment dispersion, addition | Cyan pigment |
| Comparative Ink Example 1 | RGJ-1 | RPD-1 | RCP-1 | Pigment dispersion | Carbon black |
| Comparative Ink Example 2 | RGJ-2 | RPD-2 | RCP-1 | Pigment dispersion | Cyan pigment |
| Comparative Ink Example 3 | RGJ-3 | RPD-3 | RCP-1 | Pigment dispersion | Magenta pigment |
| Comparative Ink Example 4 | RGJ-4 | RPD-4 | RCP-1 | Pigment dispersion | Yellow pigment |
| Comparative Ink Example 5 | RGJ-5 | RPD-5 | RCP-2 | Pigment dispersion | Carbon black |
| Comparative Ink Example 6 | RGJ-6 | CB-C | RCP-3 | Addition | Cyan pigment |
| Comparative Ink Example 7 | RGJ-7 | CB-M | RCP-3 | Addition | Magenta pigment |
| Comparative Ink Example 8 | RGJ-8 | RPD-2 | CP-1 + 3 | Pigment dispersion, addition | Cyan pigment |

TABLE 4-continued

|  | Ink Storage Stability | Image Density Plain paper 1 | Image Density Plain paper 2 | Beading |
|---|---|---|---|---|
| Example 51 (Ink Example 1) | A | A | A | B |
| Example 52 (Ink Example 2) | A | A | A | B |
| Example 53 (Ink Example 3) | B | A | A | B |
| Example 54 (Ink Example 4) | C | A | A | A |
| Example 55 (Ink Example 5) | C | A | A | B |
| Example 56 (Ink Example 6) | A | A | A | B |
| Example 57 (Ink Example 7) | B | A | A | B |
| Example 58 (Ink Example 8) | A | A | A | B |
| Example 59 (Ink Example 9) | A | A | A | B |
| Example 60 (Ink Example 10) | A | A | A | B |
| Example 61 (Ink Example 11) | A | A | A | C |
| Example 62 (Ink Example 12) | B | A | A | C |
| Example 63 (Ink Example 13) | A | A | A | B |
| Example 64 (Ink Example 14) | A | A | A | A |
| Example 65 (Ink Example 15) | A | A | A | A |
| Example 66 (Ink Example 16) | C | A | A | A |
| Example 67 (Ink Example 17) | A | A | A | A |
| Comparative Ink Example 1 | D | D | D | B |
| Comparative Ink Example 2 | D | D | D | D |
| Comparative Ink Example 3 | D | D | D | D |
| Comparative Ink Example 4 | D | D | D | D |
| Comparative Ink Example 5 | E | D | F | F |
| Comparative Ink Example 6 | D | C | C | C |
| Comparative Ink Example 7 | E | C | C | C |
| Comparative Ink Example 8 | E | E | E | F |

Example 68 (Ink Example 18): Preparation of Ink GJ-18

Preparation of Aqueous Solution of Copolymer

Using 2.00 g of the obtained copolymer CP-13 obtained in Example 13 and 10 percent aqueous solution of tetraethyl ammonium hydroxide (manufactured by TOKYO CHEMICAL INDUSTRY CO., LTD.), an aqueous solution was adjusted to have a copolymer concentration of 2.38 percent by weight and a pH of 8.0.

Preparation of Pigment Dispersion PD-18

16.0 g of carbon black (NIPEX150, manufactured by Degussa AG) was added to 84.0 g of the aqueous solution of the copolymer followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain 95.0 g of a pigment dispersion (pigment solid portion concentration: 16 percent by weight).

Preparation of Aqueous Ink GJ-18

45 g of the pigment dispersion, 10 g of 1,3-butanediol (manufactured by Tokyo Chemical Industry Co. Ltd.), 10 g of glycerin, 10 g of 3-methoxy-N,N-dimethyl propionamide, 10 g of fluorine-containing surfactant (ZONYL™ FS-300, solid portion: 40 percent by weight, manufactured by E. I. du Pont de Nemours and Company), and 24 g of deionized water were mixed followed by stirring for one hour and filtration by a membrane filter having an opening diameter of 1.2 micro meter to obtain an aqueous ink GJ-18 of Example 68 (Ink Example 18).

Example 69 (Ink Example 19): Preparation of Ink GJ-19

Pigment dispersion PD-19 was obtained in the same manner as in Example 68 (Ink Example 18) except that the aqueous solution of copolymer CP-14 was used instead of the aqueous solution of copolymer CP-13 in the preparation of the pigment dispersion of Example 68 (Ink Example 18).

Thereafter, aqueous ink GJ-19 of the present disclosure was obtained in the same manner as in Example 68 (Ink Example 18) except that the pigment dispersion PD-19 was used instead of the pigment dispersion PD-18 in the manufacturing of the ink of Ink Example 68 (Example 18).

Example 70 (Ink Example 20): Preparation of Ink GJ-20

Pigment dispersion PD-20 was obtained in the same manner as in Example 68 (Ink Example 18) except that the aqueous solution of copolymer CP-15 was used instead of the aqueous solution of copolymer CP-13 in the preparation of the pigment dispersion of Example 68 (Ink Example 18).

Thereafter, aqueous ink GJ-20 of the present disclosure was obtained in the same manner as in Ink Example 68 (Example 18) except that the pigment dispersion PD-20 was used instead of the pigment dispersion PD-18 in the manufacturing of the ink of Example 68 (Ink Example 18).

Example 71 (Ink Example 21): Preparation of Ink GJ-21

Pigment dispersion PD-21 was obtained in the same manner as in Example 68 (Ink Example 18) except that the aqueous solution of copolymer CP-16 was used instead of the aqueous solution of copolymer CP-13 in the preparation of the pigment dispersion of Example 68 (Ink Example 18).

Thereafter, aqueous ink GJ-21 of the present disclosure was obtained in the same manner as in Ink Example 68 (Example 18) except that the pigment dispersion PD-17 was used instead of the pigment dispersion PD-18 in the manufacturing of the ink of Example 68 (Ink Example 18).

Example 72 (Ink Example 22): Preparation of Ink GJ-22

Pigment dispersion PD-22 was obtained in the same manner as in Example 68 (Ink Example 18) except that the aqueous solution of copolymer CP-17 was used instead of the aqueous solution of copolymer CP-13 in the preparation of the pigment dispersion of Example 68 (Ink Example 18).

Thereafter, aqueous ink GJ-22 of the present disclosure was obtained in the same manner as in Ink Example 68 (Example 18) except that the pigment dispersion PD-22 was used instead of the pigment dispersion PD-18 in the manufacturing of the ink of Example 68 (Ink Example 18).

Example 73 (Ink Example 23): Preparation of Ink GJ-23

Pigment dispersion PD-23 was obtained in the same manner as in Example 68 (Ink Example 18) except that the aqueous solution of copolymer CP-18 was used instead of the aqueous solution of copolymer CP-13 in the preparation of the pigment dispersion of Example 68 (Ink Example 18).

Thereafter, aqueous ink GJ-23 of the present disclosure was obtained in the same manner as in Ink Example 68 (Example 18) except that the pigment dispersion PD-23 was used instead of the pigment dispersion PD-18 in the manufacturing of the ink of Example 68 (Ink Example 18).

Example 74 (Ink Example 24): Preparation of Ink GJ-24

Pigment dispersion PD-24 was obtained in the same manner as in Example 68 (Ink Example 18) except that the aqueous solution of copolymer CP-19 was used instead of the aqueous solution of copolymer CP-13 in the preparation of the pigment dispersion of Example 68 (Ink Example 18).

Thereafter, aqueous ink GJ-24 of the present disclosure was obtained in the same manner as in Ink Example 68 (Example 18) except that the pigment dispersion PD-24 was used instead of the pigment dispersion PD-18 in the manufacturing of the ink of Example 68 (Ink Example 18).

Example 75 (Ink Example 25): Preparation of Ink GJ-25

Pigment dispersion PD-25 was obtained in the same manner as in Example 68 (Ink Example 18) except that the aqueous solution of copolymer CP-20 was used instead of the aqueous solution of copolymer CP-13 in the preparation of the pigment dispersion of Example 68 (Ink Example 18).

Thereafter, aqueous ink GJ-25 of the present disclosure was obtained in the same manner as in Ink Example 68 (Example 18) except that the pigment dispersion PD-25 was used instead of the pigment dispersion PD-18 in the manufacturing of the ink of Example 68 (Ink Example 18).

Example 76 (Ink Example 26): Preparation of Ink GJ-26

Pigment dispersion PD-26 was obtained in the same manner as in Example 68 (Ink Example 18) except that the aqueous solution of copolymer CP-21 was used instead of the aqueous solution of copolymer CP-13 in the preparation of the pigment dispersion of Example 68 (Ink Example 18).

Thereafter, aqueous ink GJ-26 of the present disclosure was obtained in the same manner as in Ink Example 68 (Example 18) except that the pigment dispersion PD-22 was used instead of the pigment dispersion PD-18 in the manufacturing of the ink of Example 68 (Ink Example 18).

Example 77 (Ink Example 27): Preparation of Ink GJ-27

Pigment dispersion PD-27 was obtained in the same manner as in Example 68 (Ink Example 18) except that the aqueous solution of copolymer CP-22 was used instead of the aqueous solution of copolymer CP-13 in the preparation of the pigment dispersion of Example 68 (Ink Example 18).

Thereafter, aqueous ink GJ-27 of the present disclosure was obtained in the same manner as in Ink Example 68 (Example 18) except that the pigment dispersion PD-27 was used instead of the pigment dispersion PD-18 in the manufacturing of the ink of Example 68 (Ink Example 18).

Example 78 (Ink Example 28): Preparation of Ink GJ-28

Pigment dispersion PD-28 was obtained in the same manner as in Example 68 (Ink Example 18) except that the aqueous solution of copolymer CP-23 was used instead of the aqueous solution of copolymer CP-13 in the preparation of the pigment dispersion of Example 68 (Ink Example 18).

Thereafter, aqueous ink GJ-28 of the present disclosure was obtained in the same manner as in Ink Example 68 (Example 18) except that the pigment dispersion PD-28 was used instead of the pigment dispersion PD-18 in the manufacturing of the ink of Example 68 (Ink Example 18).

Example 79 (Ink Example 29): Preparation of Ink GJ-29

Pigment dispersion PD-29 was obtained in the same manner as in Example 68 (Ink Example 18) except that the aqueous solution of copolymer CP-24 was used instead of the aqueous solution of copolymer CP-13 in the preparation of the pigment dispersion of Example 68 (Ink Example 18).

Thereafter, aqueous ink GJ-29 of the present disclosure was obtained in the same manner as in Ink Example 68 (Example 18) except that the pigment dispersion PD-29 was used instead of the pigment dispersion PD-18 in the manufacturing of the ink of Example 68 (Ink Example 18).

Example 80 (Ink Example 30): Preparation of Ink GJ-30

Pigment dispersion PD-30 was obtained in the same manner as in Example 68 (Ink Example 18) except that the aqueous solution of copolymer CP-25 was used instead of the aqueous solution of copolymer CP-13 in the preparation of the pigment dispersion of Example 68 (Ink Example 18).

Thereafter, aqueous ink GJ-30 of the present disclosure was obtained in the same manner as in Ink Example 68 (Example 18) except that the pigment dispersion PD-30 was used instead of the pigment dispersion PD-18 in the manufacturing of the ink of Example 68 (Ink Example 18).

Example 81 (Ink Example 31): Preparation of Ink GJ-31

Pigment dispersion PD-30 was obtained in the same manner as in Example 68 (Ink Example 18) except that the aqueous solution of copolymer CP-26 was used instead of the aqueous solution of copolymer CP-13 in the preparation of the pigment dispersion of Example 68 (Ink Example 18).

Thereafter, aqueous ink GJ-31 of the present disclosure was obtained in the same manner as in Ink Example 68 (Example 18) except that the pigment dispersion PD-31 was used instead of the pigment dispersion PD-18 in the manufacturing of the ink of Example 68 (Ink Example 18).

Example 82 (Ink Example 32): Preparation of Ink GJ-32

A pigment dispersion PD-32 was obtained in the same manner as in Example 68 (Ink Example 18) except that Pigment Blue 15:3 (Chromofine Blue, manufactured by Dainichiseika Color & Chemicals Mfg. Co., Ltd.) was used instead of carbon black for use in the preparation of the pigment dispersion of Example 68) Ink Example 18) and the solid portion concentration was changed to 20.0 percent. 30 g of the pigment dispersion PD-32, 15 g of 1,3-butanediol, 10 g of glycerin, 20 g of 3-methoxy-N,N-dimethyl propionamide, 1 g of fluorine-containing surfactant (ZONYL™ FS-300, solid portion: 40 percent by weight, manufactured by E. I. du Pont de Nemours and Company), and 24 g of deionized water were mixed followed by stirring for one hour and filtration by a membrane filter having an opening diameter of 1.2 micro meter to obtain an aqueous ink GJ-32 of Example 82 (Ink Example 32).

Example 83 (Ink Example 33): Preparation of Ink GJ-33

A pigment dispersion PD-33 of Example 83 (Ink Example 33) was obtained in the same manner as in Example 68 (Ink Example 18) except that Pigment Red 122 (magenta pigment: Toner Magenta EO02, manufactured by Clariant Japan K.K.) was used instead of carbon black in the preparation of the pigment dispersion of Example 68 (Ink Example 18) and thereafter, using this pigment dispersion, an aqueous ink GJ-33 was obtained.

Example 84 (Ink Example 34): Preparation of Ink GJ-34

A pigment dispersion PD-34 of Example 84 (Ink Example 34) was obtained in the same manner as in Example 68 (Ink Example 18) except that Pigment Yellow (yellow pigment, Fast Yellow 531, manufactured by Dainichiseika Color & Chemicals Mfg. Co., Ltd.) was used instead of carbon black in the preparation of the pigment dispersion of Example 68 (Ink Example 18). Thereafter, using this pigment dispersion, an aqueous ink GJ-34 was obtained.

Example 85 (Ink Example 35): Preparation of Ink GJ-35

Pigment dispersion PD-35 of the copolymer CP-27 was obtained in the same manner as in Example 68 (Ink Example 18) except that the aqueous solution of copolymer CP-27 was used instead of the aqueous solution of copolymer CP-13 in the preparation of the pigment dispersion of Example 68 (Ink Example 18).

Thereafter, using this pigment dispersion, an aqueous ink GJ-35 was obtained.

Example 86 (Ink Example 36): Preparation of Ink GJ-36

Pigment dispersion PD-36 of the copolymer CP-28 was obtained in the same manner as in Example 68 (Ink Example 18) except that the aqueous solution of copolymer CP-28 was used instead of the aqueous solution of copolymer CP-13 in the preparation of the pigment dispersion of Example 68 (Ink Example 18).

Thereafter, using this pigment dispersion, an aqueous ink GJ-36 was obtained.

Example 87 (Ink Example 37): Preparation of Ink GJ-37

Pigment dispersion PD-37 of the copolymer CP-29 was obtained in the same manner as in Example 68 (Ink Example 18) except that the aqueous solution of copolymer CP-29 was used instead of the aqueous solution of copolymer CP-13 in the preparation of the pigment dispersion of Example 68 (Ink Example 18).

Thereafter, using this pigment dispersion, an aqueous ink GJ-37 was obtained.

Example 88 (Ink Example 38): Preparation of Ink GJ-38

Pigment dispersion PD-38 of the copolymer CP-30 was obtained in the same manner as in Example 68 (Ink Example 18) except that the aqueous solution of copolymer CP-30 was used instead of the aqueous solution of copolymer CP-13 in the preparation of the pigment dispersion of Example 68 (Ink Example 18).

Thereafter, using this pigment dispersion, an aqueous ink GJ-38 was obtained.

Ink Comparative Example 9: Preparation of Comparative Aqueous Ink RGJ-9

Synthesis of Copolymer RCP-4

A copolymer RCP-4 for Comparative in Example 9 was obtained in the same manner as in Example 13 except that the monomer M-2 of Chemical structure 2 belonging to Chemical formula II for use in the synthesis of the copolymer CP-13 of Example 13 was removed (that is, acrylic acid and maleic acid were copolymerized with a molar ratio of 1:1).

Manufacturing of Pigment Dispersion for Comparison Ink and Comparative Aqueous Ink Next, using this copolymer, like Example 68 (Ink Example 18), comparative aqueous ink RGJ-9 was manufactured by preparing an aqueous solution of the comparative copolymer RCP-4 followed by preparation of pigment dispersion RPD-9 for comparison from the aqueous solution of comparative copolymer RCP-4.

Ink Comparative Example 10: Preparation of Comparative Aqueous Ink RGJ-10

Synthesis of Copolymer RCP-5

Copolymer RCP-5 for Comparative Ink Example 10 was Obtained in the Same manner as in Example 13 except that acrylic acid and maleic acid for use in the synthesis of the copolymer of Example 13 were removed (i.e., the monomer of Chemical structure 1 was homo-polymerized). The copolymer RCP-5 had an Mn of 8,500 and an Mw of 15,300.

Manufacturing of Pigment Dispersion for Comparison Ink and Comparative Aqueous Ink Next, using this copolymer, pigment dispersion RPD-10 and comparative aqueous ink RGJ-10 for Comparative Example 10 were manufactured in the same manner as in Example 68 (Ink Example 18).

Ink Comparative Example 11: Preparation of Comparative Aqueous Ink RGJ-11

Synthesis of Copolymer RCP-6

4.66 g of a copolymer RPC-6 of Comparative Ink Example 11 was obtained in the same manner as in Example 13 except that the monomer M-2 of Chemical structure 2 for use in the synthesis of the copolymer CP-13 of Example 13 was changed to the following Chemical structure 11. The copolymer RCP-6 had an Mn of 8,500 and an Mw of 14,300.

Manufacturing of Pigment Dispersion for Comparison Ink and Comparative Aqueous Ink Thereafter, pigment dispersion RPD-11 and aqueous ink RGJ-11 for Comparative Ink Example 11 were manufactured in the same manner as in Example 68 (Ink Example 18).

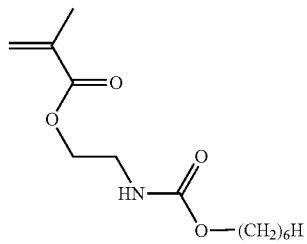

Chemical structure 11

Ink Comparative Example 12: Preparation of Comparative Aqueous Ink RGJ-12

Synthesis of Copolymer RCP-3

Craft polymer P-1 disclosed in the specification of JP-5512240-B1 (JP-2011-105866-A1) was synthesized as the copolymer RCP-7 of Comparative Ink Example 12.

Manufacturing of Pigment Dispersion for Comparison Ink and Comparative Aqueous Ink Next, using this copolymer, pigment dispersion RPD-12 and comparative aqueous ink RGJ-12 for Comparative Ink Example 12 were manufactured in the same manner as in Example 68 (Ink Example 18).

Characteristics of the pigment dispersions and aqueous inks prepared in Examples 68 (Ink Example 18) to 88 (Ink Example 38) and Comparative Examples 9 to 12 were evaluated in the following manner. The copolymer RCP-5 of Comparative Example 10 was water-insoluble and not evaluated The results are shown in Table 5.

Evaluation of Storage Stability of Pigment Dispersion

A glass container was filled with each pigment dispersion and stored at 70 degrees C. for two weeks. The change rate of the viscosity after storage to the viscosity before storage was obtained from the following relation and evaluated according to the following criteria.

Change rate of viscosity (%)=(Viscosity of pigment dispersion after storage-Viscosity of pigment dispersion before storage)/viscosity of pigment dispersion before storage)×100

The viscosity was measured by a viscometer (RE80L, manufactured by TOKI SANGYO CO., LTD.) to measure the viscosity of the ink at 25 degrees C. at 50 rotations. The results are shown in Table 5.

Evaluation Criteria

A: Change rate of viscosity within + or −5%

B: Change rate of viscosity within the range of from −8% to less than −5% and more than 5% to 8%

C: Change rate of viscosity within −10% to less than −8% and greater than 8% to 10%.

D: Change rate of viscosity within the range of from less than −10% to −30% and more than 10% to 30%

E: Change rate of viscosity less than 30% or greater than 30% (gelated to the degree that evaluation was not possible)

Storage Stability of Aqueous Ink

An ink cartridge was filled with each ink and stored at 70 degrees C. for one week. The fluctuation rate of the viscosity after the storage to the viscosity before the storage was obtained from the following relation and evaluated according to the following criteria.

The change rate of viscosity (%)=(Viscosity of ink after storage−viscosity of ink before storage)/ (viscosity of ink before storage)×100

The viscosity was measured by a viscometer (RE80L, manufactured by TOKI SANGYO CO., LTD.) to measure the viscosity of the ink at 25 degrees C. at 50 rotations. The results are shown in Table 5.

Evaluation Criteria

A: Change rate of viscosity within + or −5%

B: change rate of viscosity within the range of from −8% to less than −0.5% and more than 5% to 8%

C: change rate of viscosity within −10% to less than −8% and greater than 8% to 10%.

D: change rate of viscosity within the range of from less than −10% to −30% and more than 10% to 30%

E: change rate of viscosity less than 30% or greater than 30% (gelated to the degree that evaluation was not possible)

Image Density

An inkjet printer (IPSiO GX5000) was filled with each ink at 23 degrees C. and 50 percent RH. A table including general symbols of 64 point JIS X 0208 (1997) and 2223 made by Microsoft Word 2000 (manufactured by Microsoft Corporation) was printed on plain paper 1 (Xerox 4200, manufactured by Xerox Corporation) and paper 2 (MyPaper, manufactured by Ricoh Company Ltd.). The symbol portion on image surface was measured by X-Rite 938 (manufactured by X-Rite Inc.) and evaluated according to the following criteria. The printing mode used was: A modified mode in which "Plain Paper-Standard Fast" was modified to "No Color Calibration" from the user setting for plain paper by the driver installed onto the printer. Incidentally, the symbols of JIS X 0208 (1997) and 2223 have squares for the exterior and the inside thereof was entirely painted with ink. The results are shown in Table 5.

Evaluation Criteria

A: 1.25 or higher

B: 1.20 to less than 1.25

C: 1.10 to less than 1.20

D: Less than 1.10

E: pigment was gelated and not dispersed, impossible to print symbols.

Beading

The general symbols of JIS X 0208 (1997) and 2223 of were printed in the same manner as for Image Density except that the print mode was changed to the mode "gloss paper—fast" using LumiArt Gloss 90 GSM™ (manufactured by Stora Enso Japan K.K.) as the recording medium and the printed symbols were evaluated according to the following criteria.

Evaluation Criteria

A: No beading or beading occurred to less than 10% of the entire image

B: Beading occurred to 10% to less than 20% of the entire image

C: Beading occurred to 20% to less than 40% of the entire image

D: Beading occurred to 40% to less than 90% of the entire image

E: Beading occurred to 90% or more of the entire image

F: Gelated pigment not dispersed, impossible to print symbols

TABLE 5

| | Copolymer | Monomer [Ia:IIIa]:[IIa] | R1 | R2 | X | L |
|---|---|---|---|---|---|---|
| Example 13 | CP-13 | [(8):(8)]:(10) | H | $CH_3$ | TEA | $-(CH_2)_6-$ |
| Example 14 | CP-14 | [(2.5):(2.5)]:(10) | H | $CH_3$ | TEA | $-(CH_2)_6-$ |
| Example 15 | CP-15 | [(1.5):(1.5)]:(10) | H | $CH_3$ | TEA | $-(CH_2)_6-$ |
| Example 16 | CP-16 | [(2):(2)]:(10) | H | $CH_3$ | TEA | $-(CH_2)_6-$ |
| Example 17 | CP-17 | [(17):(17)]:(10) | H | $CH_3$ | TEA | $-(CH_2)_6-$ |
| Example 18 | CP-18 | [(15):(15)]:(10) | H | $CH_3$ | TEA | $-(CH_2)_6-$ |
| Example 19 | CP-19 | [(25):(25)]:(10) | H | $CH_3$ | TEA | $-(CH_2)_6-$ |
| Example 20 | CP-20 | [(0.5):(0.5)]:(10) | H | $CH_3$ | TEA | $-(CH_2)_6-$ |
| Example 21 | CP-21 | [(50):(50)]:(10) | H | $CH_3$ | TEA | $-(CH_2)_6-$ |
| Example 22 | CP-22 | [(2.5):(2.5)]:(10) | H | $CH_3$ | TEA | $-(CH_2)_2-$ |
| Example 23 | CP-23 | [(2.5):(2.5)]:(10) | H | $CH_3$ | TEA | $-(CH_2)_6-$ |
| Example 24 | CP-24 | [(2.5):(2.5)]:(10) | $CH_3$ | $CH_3$ | TEA | $-(CH_2)_{16}-$ |
| Example 25 | CP-25 | [(8):(8)]:(10) | H | $CH_3$ | TEA | $-(CH_2)_6-$ |
| Example 26 | CP-26 | [(8):(8)]:(10) | H, $CH_3$ | $CH_3$ | TEA | $-(CH_2)_6-$ |
| Example 27 | CP-27 | [(2.5):(2.5)]:(10) | H | $CH_3$ | TEA | $-(CH_2)_2-$ |
| Example 28 | CP-28 | [(2.5):(2.5)]:(10) | H | $CH_3$ | TEA | $-(CH_2)_2-$ |
| Example 29 | CP-29 | [(2.5):(2.5)]:(10) | H | $CH_3$ | TEA | $-(CH_2)_2-$ |
| Example 30 | CP-30 | [(2.5):(2.5)]:(10) | H | $CH_3$ | TEA | $-(CH_2)_2-$ |

| | Polymerization method | Mw | Mn |
|---|---|---|---|
| Example 13 | Solution polymerization | 8,300 | 15,700 |
| Example 14 | Solution polymerization | 8,500 | 15,600 |
| Example 15 | Solution polymerization | 8,600 | 17,200 |
| Example 16 | Solution polymerization | 8,600 | 16,400 |
| Example 17 | Solution polymerization | 8,500 | 15,700 |
| Example 18 | Solution polymerization | 8,400 | 15,900 |
| Example 19 | Solution polymerization | 8,400 | 15,800 |
| Example 20 | Solution polymerization | 8,600 | 15,600 |
| Example 21 | Solution polymerization | 8,500 | 16,300 |
| Example 22 | Solution polymerization | 8,300 | 16,600 |
| Example 23 | Solution polymerization | 8,500 | 15,400 |
| Example 24 | Solution polymerization | 8,200 | 17,000 |
| Example 25 | Solution polymerization | 8,100 | 16,100 |
| Example 26 | Solution polymerization | 8,500 | 16,700 |
| Example 27 | Solution polymerization | 5,100 | 8,500 |
| Example 28 | Solution polymerization | 12,600 | 25,900 |
| Example 29 | Solution polymerization | 17,500 | 34,900 |
| Example 30 | Solution polymerization | 21,700 | 43,600 |

Example 101: Synthesis of Copolymer 101 and Preparation of Aqueous Ink 101

Copolymers having the structure units represented by the Chemical formula I, Chemical formula II, and Chemical formula IV are described below in a specific manner.

Synthesis of Copolymer 101

1.08 g (15.0 mmol) of acrylic acid (manufactured by Sigma-Aldrich Corporation), 4.27 g (10.0 mmol) of the monomer M-1 having the structure represented by the Chemical formula 1, 0.35 g (1 mmol) of multi-functional acrylate (A-TMMT, manufactured by Shin Nakamura Chemical Co., Ltd.), and 0.21 g (1.3 mmol) of 2,2'-azobis (isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 5.13 g of copolymer (yield: 89.9 percent). The number average molecular weight (Mn) was 14,200 and the weight average molecular weight (Mw) was 52,800. The IR spectrum of the thus-obtained copolymer is illustrated in Example 7.

Preparation of Aqueous Solution of Copolymer 101

Using 2.00 g of the obtained copolymer 101 and 10 percent aqueous solution of tetraethyl ammonium hydroxide (manufactured by TOKYO CHEMICAL INDUSTRY CO., LTD.), an aqueous solution was adjusted to have a copolymer concentration of 10 percent by weight and a pH of 8.0.

Preparation of Pigment Dispersion 101

16.0 g of carbon black (NIPEX150, manufactured by Degussa AG) was added to 84.0 g of the aqueous solution of the copolymer 101 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain 95.0 g of a pigment dispersion 101 (pigment solid portion concentration: 16 percent by weight).

Preparation of Aqueous Ink 101

45 g of the pigment dispersion, 10 g of 1,3-butanediol (manufactured by Tokyo Chemical Industry Co. Ltd.), 10 g of glycerin, 10 g of 3-methoxy-N,N-dimethyl propionamide, 10 g of fluorine-containing surfactant (ZONYL™ FS-300, solid portion: 40 percent by weight, manufactured by E. I. du Pont de Nemours and Company), and 24 g of deionized water were mixed followed by stirring for one hour and filtration by a membrane filter having an opening diameter of 1.2 micro meter to obtain an aqueous ink 101 of Example 101.

Example 102: Synthesis of Copolymer 102 and Preparation of Aqueous Ink 102

4.52 g of copolymer 102 of Example 102 was obtained in the following method synthesizing a copolymer (yield: 91.3 percent). The number average molecular weight (Mn) was 13,900 and the weight average molecular weight (Mw) was 55,600. The IR spectrum of the thus-obtained copolymer 102 was similar to that of the copolymer of Example 101. Thereafter, pigment dispersion 102 and aqueous ink 102 of Example 102 were manufactured in the same manner as in Example 101.

Synthesis of Copolymer 102

0.37 g (5.2 mmol) of acrylic acid (manufactured by Sigma-Aldrich Corporation), 4.27 g (10.0 mmol) of the monomer M-1 having the structure represented by the Chemical formula 1, 0.30 g (1 mmol) of multi-functional acrylate (A-TMPT, manufactured by Shin Nakamura Chemical Co., Ltd.), and 0.13 g (0.81 mmol) of 2,2'-azobis (isobutylonitrile) (manufactured by Tokyo Chemical Industry Co., Ltd.) were dissolved in 41 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 102.

Example 103: Synthesis of Copolymer 103 and Preparation of Aqueous Ink 103

5.77 g of copolymer 103 of Example 103 was obtained in the following method synthesizing a copolymer (yield: 86.9 percent). The number average molecular weight (Mn) was 14,360 and the weight average molecular weight (Mw) was 51,600. The IR spectrum of the thus-obtained copolymer 103 was similar to that of the copolymer 101 of Example 101. Thereafter, pigment dispersion 103 and aqueous ink 103 of Example 103 were manufactured in the same manner as in Example 101.

Synthesis of Copolymer 103

2.02 g (28 mmol) of acrylic acid (manufactured by Sigma-Aldrich Corporation), 4.27 g (10.0 mmol) of the monomer M-1 having the structure represented by the Chemical formula 1, 0.35 g (1 mmol) of multi-functional acrylate (A-TMMT, manufactured by Shin Nakamura Chemical Co., Ltd.), and 0.32 g (1.95 mmol) of 2,2'-azobis (isobutylonitrile) (manufactured by Tokyo Chemical Industry Co., Ltd.) were dissolved in 98 ml of methylethylketone followed by stirring at 75 degrees C. in argon atmosphere for five hours. Thereafter, the reaction solution was cooled down to room temperature and precipitated five times using hexane to refine a copolymer 103. Thereafter, the refined copolymer was filtered followed by drying with a reduced pressure to obtain copolymer 103.

Example 104: Synthesis of Copolymer 104 and Preparation of Aqueous Ink 104

4.06 g of copolymer 104 of Example 104 was obtained in the following method synthesizing a copolymer (yield: 84.6 percent). The number average molecular weight (Mn) was 13,300 and the weight average molecular weight (Mw) was 52,300. The IR spectrum of the thus-obtained copolymer 104 was similar to that of the copolymer of Example 101. Thereafter, pigment dispersion 104 and aqueous ink 104 of Example 104 were manufactured in the same manner as in Example 101.

Synthesis of Copolymer 104

0.23 g (3.2 mmol) of acrylic acid (manufactured by Sigma-Aldrich Corporation), 4.27 g (10.0 mmol) of the monomer M-1 having the structure represented by the Chemical formula 1, 0.3 g (1 mmol) of multi-functional acrylate (A-TMPT, manufactured by Shin Nakamura Chemical Co., Ltd.), and 0.12 g (0.71 mmol) of 2,2'-azobis (isobutylonitrile) (manufactured by Tokyo Chemical Industry Co., Ltd.) were dissolved in 36 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 104.

Example 105: Synthesis of Copolymer 105 and Preparation of Aqueous Ink 105

4.47 g of copolymer 105 of Example 105 was obtained in the following method synthesizing a copolymer (yield: 90.8 percent). The number average molecular weight (Mn) was 14,500 and the weight average molecular weight (Mw) was 5,200. The IR spectrum of the thus-obtained copolymer 105 was similar to that of the copolymer 101 of Example 101. Thereafter, pigment dispersion 105 and aqueous ink 105 of Example 105 were manufactured in the same manner as in Example 101.

Synthesis of Copolymer 105

0.35 g (0.4.8 mmol) of acrylic acid (manufactured by Sigma-Aldrich Corporation), 4.27 g (10.0 mmol) of the monomer M-1 having the structure represented by the Chemical formula 1, 0.3 g (1 mmol) of multi-functional acrylate (A-TMPT, manufactured by Shin Nakamura Chemical Co., Ltd.), and 0.13 g (0.79 mmol) of 2,2'-azobis (isobutylonitrile) (manufactured by Tokyo Chemical Industry Co., Ltd.) were dissolved in 40 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 105.

Example 106: Synthesis of Copolymer 106 and Preparation of Aqueous Ink 106

5.89 g of copolymer 106 of Example 106 was obtained in the following method synthesizing a copolymer (yield: 84.9 percent). The number average molecular weight (Mn) was 13,600 and the weight average molecular weight (Mw) was 54,900. The IR spectrum of the thus-obtained copolymer 106 was similar to that of the copolymer of Example 101. Thereafter, pigment dispersion 106 and aqueous ink 106 of Example 106 were manufactured in the same manner as in Example 101.

Synthesis of Copolymer 106

2.31 g (32 mmol) of acrylic acid (manufactured by Sigma-Aldrich Corporation), 4.27 g (10.0 mmol) of the monomer M-1 having the structure represented by the Chemical formula 1, 0.35 g (1 mmol) of multi-functional acrylate (A-TMMT, manufactured by Shin Nakamura Chemical Co., Ltd.), and 0.35 g (2.15 mmol) of 2,2'-azobis (isobutylonitrile) (manufactured by Tokyo Chemical Industry Co., Ltd.) were dissolved in 108 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 106.

Example 107: Synthesis of Copolymer 107 and Preparation of Aqueous Ink 107

7.2 g of copolymer 107 of Example 107 was obtained in the following method synthesizing a copolymer (yield: 89.1 percent). The number average molecular weight (Mn) was 13,200 and the weight average molecular weight (Mw) was 51,800. The IR spectrum of the thus-obtained copolymer 107 was similar to that of the copolymer of Example 101. Thereafter, pigment dispersion 107 and aqueous ink 107 of Example 107 were manufactured in the same manner as in Example 101.

Synthesis of Copolymer 107

3.46 g (48 mmol) of acrylic acid (manufactured by Sigma-Aldrich Corporation), 4.27 g (10.0 mmol) of the monomer M-1 having the structure represented by the Chemical formula 1, 0.35 g (1 mmol) of multi-functional acrylate (A-TMMT, manufactured by Shin Nakamura Chemical Co., Ltd.), and 0.48 g (2.95 mmol) of 2,2'-azobis (isobutylonitrile) (manufactured by Tokyo Chemical Industry Co., Ltd.) were dissolved in 148 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 107.

Example 108: Synthesis of Copolymer 108 and Preparation of Aqueous Ink 108

4.12 g of copolymer 108 of Example 108 was obtained in the following method synthesizing a copolymer (yield: 87.6 percent). The number average molecular weight (Mn) was 15,000 and the weight average molecular weight (Mw) was 53,000. The IR spectrum of the thus-obtained copolymer 108 was similar to that of the copolymer of Example 101. Thereafter, pigment dispersion 108 and aqueous ink 108 of Example 108 were manufactured in the same manner as in Example 101.

Synthesis of Copolymer 108

0.09 g (1.2 mmol) of acrylic acid (manufactured by Sigma-Aldrich Corporation), 4.27 g (10.0 mmol) of the monomer M-1 having the structure represented by the Chemical formula 1, 0.3 g (1 mmol) of multi-functional acrylate (A-TMPT, manufactured by Shin Nakamura Chemical Co., Ltd.), and 0.1 g (0.61 mmol) of 2,2'-azobis (isobutylonitrile) (manufactured by Tokyo Chemical Industry Co., Ltd.) were dissolved in 31 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 108.

Example 109: Synthesis of Copolymer 109 and Preparation of Aqueous Ink 109

4.25 g of copolymer 109 of Example 109 was obtained in the following method synthesizing a copolymer (yield: 89 percent). The number average molecular weight (Mn) was 12,300 and the weight average molecular weight (Mw) was 54,500. The IR spectrum of the thus-obtained copolymer 109 was similar to that of the copolymer of Example 101. Thereafter, pigment dispersion 109 and aqueous ink 109 of Example 109 were manufactured in the same manner as in Example 101.

Synthesis of Copolymer 109

0.37 g (5.2 mmol) of acrylic acid (manufactured by Sigma-Aldrich Corporation), 4.27 g (10.0 mmol) of the monomer M-1 having the structure represented by the Chemical formula 1, 0.30 g (1 mmol) of multi-functional acrylate (A-TMPT, manufactured by Shin Nakamura Chemical Co., Ltd.), and 0.13 g (0.81 mmol) of 2,2'-azobis (isobutylonitrile) (manufactured by Tokyo Chemical Industry Co., Ltd.) were dissolved in 41 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 109.

Example 110: Synthesis of Copolymer 110 and Preparation of Aqueous Ink 110

7.42 g of copolymer 110 of Example 110 was obtained in the following method synthesizing a copolymer (yield: 88.6 percent). The number average molecular weight (Mn) was 14,000 and the weight average molecular weight (Mw) was 51,700. The IR spectrum of the thus-obtained copolymer 110 was similar to that of the copolymer 101 of Example 101. Thereafter, pigment dispersion 110 and aqueous ink 110 of Example 110 were manufactured in the same manner as in Example 101.

Synthesis of Copolymer 110

3.75 g (52 mmol) of acrylic acid (manufactured by Sigma-Aldrich Corporation), 4.27 g (10.0 mmol) of the monomer M-1 having the structure represented by the Chemical formula 2, 0.35 g (1 mmol) of multi-functional acrylate (A-TMMT, manufactured by Shin Nakamura Chemical Co., Ltd.), and 0.52 g (3.15 mmol) of 2,2'-azobis (isobutylonitrile) (manufactured by Tokyo Chemical Industry Co., Ltd.) were dissolved in 158 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 110.

Example 111: Synthesis of Copolymer 111 and Preparation of Aqueous Ink 111

10.27 g of copolymer 111 of Example 111 was obtained in the following method synthesizing a copolymer (yield: 86.5 percent). The number average molecular weight (Mn) was 12,600 and the weight average molecular weight (Mw) was 52,000. The IR spectrum of the thus-obtained copolymer 111 was similar to that of the copolymer of Example 101. Thereafter, pigment dispersion 111 and aqueous ink 111 of Example 111 were manufactured in the same manner as in Example 101.

Synthesis of Copolymer 111

7.06 g (98 mmol) of acrylic acid (manufactured by Sigma-Aldrich Corporation), 4.27 g (10.0 mmol) of the monomer M-3 having the structure represented by the Chemical formula 3, 0.54 g (1 mmol) of multi-functional acrylate (SR399, manufactured by Sartomer), and 0.89 g (5.45 mmol) of 2,2'-azobis(isobutylonitrile) (manufactured by Tokyo Chemical Industry Co., Ltd.) were dissolved in 73 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 111.

Example 112: Synthesis of Copolymer 112 and Preparation of Aqueous Ink 112

3.96 g of copolymer 12 of Example 12 was obtained in the following method synthesizing a copolymer (yield: 84.8%). The number average molecular weight (Mn) was 13,600 and the weight average molecular weight (Mw) was 55,200. The IR spectrum of the thus-obtained copolymer 112 was similar to that of the copolymer of Example 101. Thereafter, pigment dispersion 112 and aqueous ink 112 of Example 112 were manufactured in the same manner as in Example 101.

Synthesis of Copolymer 112

0.06 g (0.8 mmol) of acrylic acid (manufactured by Sigma-Aldrich Corporation), 4.27 g (10.0 mmol) of the monomer M-4 having the structure represented by the Chemical formula 4, 0.3 g (1 mmol) of multi-functional acrylate (A-TMPT, manufactured by Shin Nakamura Chemical Co., Ltd.), and 0.1 g (0.59 mmol) of 2,2'-azobis (isobutylonitrile) (manufactured by Tokyo Chemical Industry Co., Ltd.) were dissolved in 30 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 112.

Example 113: Synthesis of Copolymer 113 and Preparation of Aqueous Ink 113

10.73 g of copolymer 113 of Example 113 was obtained in the following method synthesizing a copolymer (yield: 88.2 percent). The number average molecular weight (Mn) was 14,100 and the weight average molecular weight (Mw) was 52,300. The IR spectrum of the thus-obtained copolymer 113 was similar to that of the copolymer of Example 101. Thereafter, pigment dispersion 113 and aqueous ink 113 of Example 113 were manufactured in the same manner as in Example 101.

Synthesis of Copolymer 113

7.35 g (102 mmol) of acrylic acid (manufactured by Sigma-Aldrich Corporation), 4.27 g (10.0 mmol) of the monomer M-1 having the structure represented by the Chemical formula 1, 0.54 g (1 mmol) of multi-functional acrylate (SR399, manufactured by Sartomer), and 0.93 g (5.65 mmol) of 2,2'-azobis(isobutylonitrile) (manufactured by Tokyo Chemical Industry Co., Ltd.) were dissolved in 283 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 113.

Example 114: Synthesis of Copolymer 114 and Preparation of Aqueous Ink 114

4.65 g of copolymer 114 of Example 114 was obtained in the following method synthesizing a copolymer (yield: 85.2 percent). The number average molecular weight (Mn) was 13,200 and the weight average molecular weight (Mw) was 54,100. The IR spectrum of the thus-obtained copolymer 114 was similar to that of the copolymer of Example 101. Thereafter, pigment dispersion 114 and aqueous ink 114 of Example 114 were manufactured in the same manner as in Example 101.

Synthesis of Copolymer 114

1.08 g (15 mmol) of acrylic acid (manufactured by Sigma-Aldrich Corporation), 4.27 g (10.0 mmol) of the monomer M-1 having the structure represented by the Chemical formula 1, 0.11 g (0.2 mmol) of multi-functional acrylate (SR399, manufactured by Sartomer), and 0.21 g (1.26 mmol) of 2,2'-azobis(isobutylonitrile) (manufactured by Tokyo Chemical Industry Co., Ltd.) were dissolved in 63 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 114.

Example 115: Synthesis of Copolymer 115 and Preparation of Aqueous Ink 115

5.13 g of copolymer 115 of Example 115 was obtained in the following method synthesizing a copolymer (yield: 89.4 percent). The number average molecular weight (Mn) was 13,700 and the weight average molecular weight (Mw) was 53,600. The IR spectrum of the thus-obtained copolymer 115 was similar to that of the copolymer of Example 101. Thereafter, pigment dispersion 115 and aqueous ink 115 of Example 115 were manufactured in the same manner as in Example 101.

Synthesis of Copolymer 115

1.08 g (15 mmol) of acrylic acid (manufactured by Sigma-Aldrich Corporation), 4.27 g (10.0 mmol) of the monomer M-2 having the structure represented by the Chemical formula 2, 0.39 g (1.3 mmol) of multi-functional acrylate (A-TMPT, manufactured by Shin Nakamura Chemical Co., Ltd.), and 0.22 g (1.32 mmol) of 2,2'-azobis(isobutylonitrile) (manufactured by Tokyo Chemical Industry Co., Ltd.) were dissolved in 66 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 115.

Example 116: Synthesis of Copolymer 116 and Preparation of Aqueous Ink 116

4.79 g of copolymer 116 of Example 116 was obtained in the following method synthesizing a copolymer (yield: 88.3 percent). The number average molecular weight (Mn) was 12,600 and the weight average molecular weight (Mw) was 55,500. The IR spectrum of the thus-obtained copolymer 116 was similar to that of the copolymer of Example 101. Thereafter, pigment dispersion 116 and aqueous ink 116 of Example 116 were manufactured in the same manner as in Example 101.

Synthesis of Copolymer 116

1.08 g (15 mmol) of acrylic acid (manufactured by Sigma-Aldrich Corporation), 4.27 g (10.0 mmol) of the monomer M-2 having the structure represented by the Chemical formula 2, 0.07 g (0.12 mmol) of multi-functional acrylate (A-DPH, manufactured by Shin Nakamura Chemical Co., Ltd.), and 0.21 g (1.26 mmol) of 2,2'-azobis(isobutylonitrile) (manufactured by Tokyo Chemical Industry Co., Ltd.) were dissolved in 63 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 116.

Example 117: Synthesis of Copolymer 117 and Preparation of Aqueous Ink 117

4.96 g of copolymer 117 of Example 117 was obtained in the following method synthesizing a copolymer (yield: 88 percent). The number average molecular weight (Mn) was 13,400 and the weight average molecular weight (Mw) was 52,000. The IR spectrum of the thus-obtained copolymer 117 was similar to that of the copolymer of Example 101. Thereafter, pigment dispersion 117 and aqueous ink 117 of Example 117 were manufactured in the same manner as in Example 101.

Synthesis of Copolymer 117

1.08 g (15 mmol) of acrylic acid (manufactured by Sigma-Aldrich Corporation), 4.27 g (10.0 mmol) of the monomer M-2 having the structure represented by the Chemical formula 2, 0.28 g (0.8 mmol) of multi-functional acrylate (A-TMMT, manufactured by Shin Nakamura Chemical Co., Ltd.), and 0.21 g (1.29 mmol) of 2,2'-azobis(isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 117.

Example 118: Synthesis of Copolymer 118 and Preparation of Aqueous Ink 118

5.03 g of copolymer 118 of Example 118 was obtained in the following method synthesizing a copolymer (yield: 85.8 percent). The number average molecular weight (Mn) was 14,500 and the weight average molecular weight (Mw) was 55,900. The IR spectrum of the thus-obtained copolymer 118 was similar to that of the copolymer of Example 101. Thereafter, pigment dispersion 118 and aqueous ink 118 of Example 118 were manufactured in the same manner as in Example 101.

Synthesis of Copolymer 118

1.08 g (15 mmol) of acrylic acid (manufactured by Sigma-Aldrich Corporation), 4.27 g (10.0 mmol) of the monomer M-2 having the structure represented by the Chemical formula 2, 0.5 g (1.7 mmol) of multi-functional acrylate (A-TMPT, manufactured by Shin Nakamura Chemical Co., Ltd.), and 0.22 g (1.34 mmol) of 2,2'-azobis(isobutylonitrile) (manufactured by Tokyo Chemical Industry Co., Ltd.) were dissolved in 67 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 118.

Example 119: Synthesis of Copolymer 119 and Preparation of Aqueous Ink 119

5.34 g of copolymer 119 of Example 119 was obtained in the following method synthesizing a copolymer (yield: 89.1 percent). The number average molecular weight (Mn) was 12,900 and the weight average molecular weight (Mw) was 52,800. The IR spectrum of the thus-obtained copolymer 119 was similar to that of the copolymer of Example 101. Thereafter, pigment dispersion 119 and aqueous ink 119 of Example 119 were manufactured in the same manner as in Example 101.

Synthesis of Copolymer 119

1.08 g (15 mmol) of acrylic acid (manufactured by Sigma-Aldrich Corporation), 4.27 g (10.0 mmol) of the monomer M-2 having the structure represented by the Chemical formula 2, 0.63 g (2.8 mmol) of multi-functional acrylate (A-HD-N, manufactured by Shin Nakamura Chemical Co., Ltd.), and 0.23 g (1.39 mmol) of 2,2'-azobis (isobutylonitrile) (manufactured by Tokyo Chemical Industry Co., Ltd.) were dissolved in 70 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 119.

Example 120: Synthesis of Copolymer 120 and Preparation of Aqueous Ink 120

4.92 g of copolymer 120 of Example 120 was obtained in the following method synthesizing a copolymer (yield: 91.6 percent). The number average molecular weight (Mn) was 12,600 and the weight average molecular weight (Mw) was 54,000. The IR spectrum of the thus-obtained copolymer 120 was similar to that of the copolymer of Example 101. Thereafter, pigment dispersion 120 and aqueous ink 120 of Example 120 were manufactured in the same manner as in Example 101.

Synthesis of Copolymer 120

1.08 g (15 mmol) of acrylic acid (manufactured by Sigma-Aldrich Corporation), 4.27 g (10.0 mmol) of the monomer M-2 having the structure represented by the Chemical formula 2, 0.02 g (0.012 mmol) of urethane acrylate (U-10PA, manufactured by Shin Nakamura Chemical Co., Ltd.), and 0.21 g (1.25 mmol) of 2,2'-azobis (isobutylonitrile) (manufactured by Tokyo Chemical Industry Co., Ltd.) were dissolved in 63 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 120.

Example 121: Synthesis of Copolymer 121 and Preparation of Aqueous Ink 121

4.75 g of copolymer 121 of Example 121 was obtained in the following method synthesizing a copolymer (yield: 87.9 percent). The number average molecular weight (Mn) was 13,200 and the weight average molecular weight (Mw) was 53,800. The IR spectrum of the thus-obtained copolymer 121 was similar to that of the copolymer of Example 101. Thereafter, pigment dispersion 121 and aqueous ink 121 of Example 121 were manufactured in the same manner as in Example 101.

Synthesis of Copolymer 121

1.08 g (15 mmol) of acrylic acid (manufactured by Sigma-Aldrich Corporation), 4.27 g (10.0 mmol) of the monomer M-2 having the structure represented by the Chemical formula 2, 0.05 g (0.08 mmol) of multi-functional acrylate (A-DPH, manufactured by Shin Nakamura Chemical Co., Ltd.), and 0.21 g (1.25 mmol) of 2,2'-azobis (isobutylonitrile) (manufactured by Tokyo Chemical Industry Co., Ltd.) were dissolved in 63 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 121.

Example 122: Synthesis of Copolymer 122 and Preparation of Aqueous Ink 122

5.17 g of copolymer 122 of Example 122 was obtained in the following method synthesizing a copolymer (yield: 84.4 percent) The number average molecular weight (Mn) was 14,700 and the weight average molecular weight (Mw) was 52,700. The IR spectrum of the thus-obtained copolymer 122 was similar to that of the copolymer of Example 101. Thereafter, pigment dispersion 122 and aqueous ink 122 of Example 122 were manufactured in the same manner as in Example 101.

Synthesis of Copolymer 122

1.08 g (15 mmol) of acrylic acid (manufactured by Sigma-Aldrich Corporation), 4.27 g (10.0 mmol) of the monomer M-1 having the structure represented by the Chemical formula 1, 0.77 g (3.2 mmol) of bi-functional acrylate (APG-100, manufactured by Shin Nakamura Chemical Co., Ltd.), and 0.23 g (1.41 mmol) of 2,2'-azobis (isobutylonitrile) (manufactured by Tokyo Chemical Industry Co., Ltd.) were dissolved in 71 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 122.

Example 123: Synthesis of Copolymer 123 and Preparation of Aqueous Ink 123

6.1 g of copolymer 123 of Example 123 was obtained in the following method synthesizing a copolymer (yield: 90.2 percent). The number average molecular weight (Mn) was 14,000 and the weight average molecular weight (Mw) was 55,300. The IR spectrum of the thus-obtained copolymer 123 was similar to that of the copolymer of Example 101. Thereafter, pigment dispersion 123 and aqueous ink 123 of Example 123 were manufactured in the same manner as in Example 101.

Synthesis of Copolymer 123

1.08 g (15 mmol) of acrylic acid (manufactured by Sigma-Aldrich Corporation), 4.27 g (10.0 mmol) of the monomer M-1 having the structure represented by the Chemical formula 1, 1.4 g (5.8 mmol) of bi-functional methacrylate (2G, manufactured by Shin Nakamura Chemical Co., Ltd.), and 0.25 g (1.54 mmol) of 2,2'-azobis (isobutylonitrile) (manufactured by Tokyo Chemical Industry Co., Ltd.) were dissolved in 77 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 123.

Example 124: Synthesis of Copolymer 124 and Preparation of Aqueous Ink 124

46.72 g of copolymer 124 of Example 124 was obtained in the following method synthesizing a copolymer (yield: 87.2 percent). The number average molecular weight (Mn) was 13,000 and the weight average molecular weight (Mw) was 55,300. The IR spectrum of the thus-obtained copolymer 124 was similar to that of the copolymer of Example 101. Thereafter, pigment dispersion 124 and aqueous ink 124 of Example 124 were manufactured in the same manner as in Example 101.

Synthesis of Copolymer 124

10.81 g (150 mmol) of acrylic acid (manufactured by Sigma-Aldrich Corporation), 42.75 g (100 mmol) of the monomer 1 represented by Chemical structure 1, 0.0184 g (0.008 mmol) of urethane acrylate (U-15HA, manufactured by Shin Nakamura Chemical Co., Ltd.), and 2.05 g (12.5 mmol) of 2,2'-azobis(isobutylonitrile) (manufactured by Tokyo Chemical Industry Co., Ltd.) were dissolved in 625 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 124.

Example 125: Synthesis of Copolymer 125 and Preparation of Aqueous Ink 125

5.92 g of copolymer 125 of Example 125 was obtained in the following method synthesizing a copolymer (yield: 90.0 percent). The number average molecular weight (Mn) was 14,500 and the weight average molecular weight (Mw) was 53,400. The IR spectrum of the thus-obtained copolymer 125 was similar to that of the copolymer of Example 101. Thereafter, pigment dispersion 125 and aqueous ink 125 of Example 125 were manufactured in the same manner as in Example 101.

Synthesis of Copolymer 125

1.08 g (15 mmol) of acrylic acid (manufactured by Sigma-Aldrich Corporation), 4.27 g (10.0 mmol) of the monomer 1 represented by Chemical structure 1, 1.23 g (6.2 mmol) of bi-functional acrylate (1G, manufactured by Shin Nakamura Chemical Co., Ltd.), and 0.26 g (1.56 mmol) of 2,2'-azobis(isobutylonitrile) (manufactured by Tokyo Chemical Industry Co., Ltd.) were dissolved in 78 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 125.

Example 126: Synthesis of Copolymer 126 and Preparation of Aqueous Ink 126

Synthesis of Copolymer 126

1.08 g (15 mmol) of acrylic acid (manufactured by Sigma-Aldrich Corporation), 3.71 g (10.0 mmol) of the monomer M-2 represented by Chemical structure 2, 0.35 g (1 mmol) multi-functional acrylate (A-TMMT, manufactured by Shin Nakamura Chemical Co., Ltd.), and 0.21 g (1.3 mmol) of 2,2'-azobis(isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 4.38 g of copolymer 126 (yield: 85.1 percent). The number average molecular weight (Mn) was 15,000 and the weight average molecular weight (Mw) was 54,400. The IR spectrum of the thus-obtained copolymer 126 was similar to that of the copolymer of Example 101.

Preparation of Aqueous Ink GJ126

Thereafter, pigment dispersion 126 and aqueous ink 126 of Example 126 were manufactured in the same manner as in Example 101.

Example 127: Synthesis of Copolymer 127 and Preparation of Aqueous Ink 127

Synthesis of Copolymer 127

1.08 g (15 mmol) of acrylic acid (manufactured by Sigma-Aldrich Corporation), 5.12 g (10.0 mmol) of the monomer M-3 represented by Chemical structure 3, 0.35 g (1 mmol) of multi-functional acrylate (A-TMMT, manufactured by Shin Nakamura Chemical Co., Ltd.), and 0.21 g (1.3 mmol) of 2,2'-azobis(isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 5.5 g of copolymer 127 (yield: 84 percent). The number average molecular weight (Mn) was 14,900 and the weight average molecular weight (Mw) was 51,800. The IR spectrum of the thus-obtained copolymer 127 was similar to that of the copolymer of Example 101.

Preparation of Aqueous Ink 127

Thereafter, pigment dispersion 127 and aqueous ink 127 of Example 127 were manufactured in the same manner as in Example 101.

Example 128: Synthesis of Copolymer 128 and Preparation of Aqueous Ink 128

Synthesis of Copolymer 128

1.08 g (15 mmol) of acrylic acid (manufactured by Sigma-Aldrich Corporation), 5.68 g (10.0 mmol) of the monomer M-4 represented by Chemical structure 4, 0.35 g (1 mmol) of multi-functional acrylate (A-TMMT, manufactured by Shin Nakamura Chemical Co., Ltd.), and 0.21 g (1.3 mmol) of 2,2'-azobis(isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain 6.31 g of copolymer 128 (yield: 88.7 percent). The number average molecular weight (Mn) was 14,800 and the weight average molecular weight (Mw) was 54,200. The IR spectrum of the thus-obtained copolymer 128 was similar to that of the copolymer of Example 101.

Preparation of Aqueous Ink 128

Thereafter, pigment dispersion 128 and aqueous ink 128 of Example 128 were manufactured in the same manner as in Example 101.

Example 129: Synthesis of Copolymer 129 and Preparation of Aqueous Ink 129

5.41 g of copolymer 129 of Example 129 was obtained in the following method synthesizing a copolymer (yield: 91.5 percent). The number average molecular weight (Mn) was 13,200 and the weight average molecular weight (Mw) was 55,600. The IR spectrum of the thus-obtained copolymer 129 was similar to that of the copolymer of Example 101. Thereafter, pigment dispersion 129 and aqueous ink 129 of Example 129 were manufactured in the same manner as in Example 101.

Synthesis of Copolymer 129

1.29 g (15 mmol) of methacrylic acid (manufactured by Tokyo Chemical Industry Co., Ltd.), 4.27 g (10.0 mmol) of the monomer M-1 represented by Chemical structure 1, 0.35 g (1 mmol) of multi-functional acrylate (A-TMMT, manufactured by Shin Nakamura Chemical Co., Ltd.), and 0.21 g (1.3 mmol) of 2,2'-azobis(isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 129.

Example 130: Synthesis of Copolymer 130 and Preparation of Aqueous Ink 130

5.32 g of copolymer 130 of Example 130 was obtained in the following method synthesizing a copolymer (yield: 91.4 percent). The number average molecular weight (Mn) was 14,400 and the weight average molecular weight (Mw) was 53,300. The IR spectrum of the thus-obtained copolymer 130 was similar to that of the copolymer of Example 101. Thereafter, pigment dispersion 130 and aqueous ink 130 of Example 130 were manufactured in the same manner as in Example 101.

Synthesis of Copolymer 130

0.54 g (7.5 mmol) of acrylic acid (manufactured by Tokyo Chemical Industry Co., Ltd.), 4.27 g (10.0 mmol) of the monomer M-1 represented by Chemical structure 1, 0.35 g (1 mmol) of multi-functional acrylate (manufactured by Shin Nakamura Chemical Co., Ltd.), and 0.65 g (7.5 mmol) of methacrylic acid (manufactured by Tokyo Chemical Industry Co., Ltd.), and 0.21 g (1.3 mmol) of 2,2'-azobis (isobutylonitrile) (manufactured by Tokyo Chemical Industry Co., Ltd.) were dissolved in 65 ml of methylethylketone followed by stirring at 75 degrees C. in argon atmosphere for five hours. Thereafter, the reaction solution cooled down to room temperature was precipitated five times using hexane to refine a copolymer. Thereafter, the refined copolymer was filtered followed by drying with a reduced pressure to obtain copolymer 130.

Example 131: Preparation of Aqueous Ink 131

A pigment dispersion 131 of Example 131 was obtained in the same manner as in Example 101 except that Pigment Blue 15:3 (Chromofine Blue, manufactured by Dainichiseika Color & Chemicals Mfg. Co., Ltd.) was used instead of carbon black for use in the preparation of the pigment dispersion of Example 101 and the solid portion concentration was changed to 20.0 percent. 30 g of the pigment dispersion 131, 15 g of 1,3-butanediol, 10 g of glycerin, 20 g of 3-methoxy-N,N-dimethyl propionamide, 1 g of fluorine-containing surfactant (ZONYL™ FS-300, solid portion: 40 percent by weight, manufactured by E. I. du Pont de Nemours and Company), and 24 g of deionized water were mixed followed by stirring for one hour and filtration by a membrane filter having an opening diameter of 1.2 micro meter to obtain an aqueous ink 131 of Example 131.

Example 132: Preparation of Aqueous Ink 132

A pigment dispersion 132 and an aqueous ink 132 of Example 132 were obtained in the same manner as in Example 101 except that Pigment Red 122 (magenta pigment: Toner Magenta E002, manufactured by Clariant Japan K.K.) was used instead of carbon black in the preparation of the pigment dispersion of Example 101.

Example 133: Preparation of Aqueous Ink 133

A pigment dispersion 133 and aqueous ink 133 of Example 133 were obtained in the same manner as in Example 101 except that Pigment Yellow (yellow pigment, Fast Yellow 531, manufactured by Dainichiseika Color & Chemicals Mfg. Co., Ltd.) was used instead of carbon black in the preparation of the pigment dispersion of Example 101.

Comparative Example 13: Synthesis of Copolymer RCP-13 and Preparation of Aqueous Ink RGJ-13

A copolymer RCP-13 of Comparative Example 13 was obtained in the same manner as in Example 101 except that the monomer M-1 of Chemical structure 1 for use in the synthesis of the copolymer of Example 101 was removed. Thereafter, pigment dispersion RPD-13 and aqueous ink RGJ-13 of Comparative Example 13 were manufactured in the same manner as in Example 101.

Comparative Example 14: Synthesis of Copolymer RCP-14 and Preparation of Aqueous Ink RGJ-14

A copolymer RCP-14 of Comparative Example 14 was obtained in the same manner as in Example 101 except that the acrylic acid for use in the synthesis of the copolymer 101 of Example 101 was removed. Thereafter, pigment dispersion RPD-14 and aqueous ink RGJ-14 of Comparative Example 14 were manufactured in the same manner as in Example 101.

Comparative Example 15: Synthesis of Copolymer RCP-15 and Preparation of Aqueous Ink RGJ-15

4.66 g of a copolymer RCP-15 of Comparative Example 15 was obtained in the same manner as in Example 101 except that the monomer M-1 of Chemical structure 1 for use in the synthesis of the copolymer 101 of Example 101 was changed to the following Chemical structure 12. Thereafter, pigment dispersion RPD-15 and aqueous ink RGJ-15 for Comparative Example 15 were manufactured in the same manner as in Example 101.

Chemical structure 12

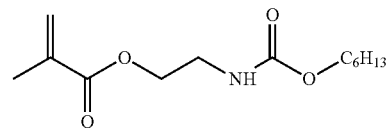

Comparative Example 16: Synthesis of Copolymer RCP-16 and Preparation of Aqueous Ink RGJ-16

Craft polymer P-1 disclosed in the specification of JP-5512240-B1 (JP-2011-105866-A1) was synthesized as the copolymer RCP-16 of Comparative Example 16. Also, pigment dispersion RPD-16 and aqueous ink RGJ-16 of Comparative Example 16 were manufactured in the same manner as in Example 101.

The structures of the copolymers of Examples 101 to 133 and Comparative Examples 13 to 16 are shown in Table 6 per chemical formula.

TABLE 6

| | (I):(II):(III) (Molar ratio) | Structure of Chemical formula I | | Structure of Chemical formula II | | First of structure of Chemical formula III | |
|---|---|---|---|---|---|---|---|
| | | $R_1$ | X | $R_2$ | L | $R_3$ | Y |
| Example 101 | 1.5:1:0.1 | H | TEA | $CH_3$ | —$(CH_2)_6$— | H | —$CH_2$— |
| Example 102 | 0.52:1:0.1 | H | TEA | $CH_3$ | —$(CH_2)_6$— | H | —$CH_2$— |
| Example 103 | 2.8:1:0.1 | H | TEA | $CH_3$ | —$(CH_2)_6$— | H | —$CH_2$— |
| Example 104 | 0.32:1:0.1 | H | TEA | $CH_3$ | —$(CH_2)_6$— | H | —$CH_2$— |
| Example 105 | 0.48:1:0.1 | H | TEA | $CH_3$ | —$(CH_2)_6$— | H | —$CH_2$— |
| Example 106 | 3.2:1:0.1 | H | TEA | $CH_3$ | —$(CH_2)_6$— | H | —$CH_2$— |
| Example 107 | 4.8:1:0.1 | H | TEA | $CH_3$ | —$(CH_2)_6$— | H | —$CH_2$— |
| Example 108 | 0.12:1:0.1 | H | TEA | $CH_3$ | —$(CH_2)_6$— | H | —$CH_2$— |
| Example 109 | 0.28:1:0.1 | H | TEA | $CH_3$ | —$(CH_2)_6$— | H | —$CH_2$— |
| Example 110 | 5.2:1:0.1 | H | TEA | $CH_3$ | —$(CH_2)_2$— | H | —$CH_2$— |
| Example 111 | 9.8:1:0.1 | H | TEA | $CH_3$ | —$(CH_2)_{12}$— | H | —$CH_2$— |
| Example 112 | 0.08:1:0.1 | H | TEA | $CH_3$ | —$(CH_2)_{16}$— | H | —$CH_2$— |
| Example 113 | 10.2:1:0.1 | H | TEA | $CH_3$ | —$(CH_2)_6$— | H | —$CH_2$— |
| Example 114 | 1.5:1:0.02 | H | TEA | $CH_3$ | —$(CH_2)_6$— | H | —$CH_2$— |
| Example 115 | 1.5:1:0.13 | H | TEA | $CH_3$ | —$(CH_2)_2$— | H | —$CH_2$— |
| Example 116 | 1.5:1:0.012 | H | TEA | $CH_3$ | —$(CH_2)_2$— | H | —$CH_2$— |
| Example 117 | 1.5:1:0.08 | H | TEA | $CH_3$ | —$(CH_2)_2$— | H | —$CH_2$— |
| Example 118 | 1.5:1:0.17 | H | TEA | $CH_3$ | —$(CH_2)_2$— | H | —$CH_2$— |
| Example 119 | 1.5:1:0.28 | H | TEA | $CH_3$ | —$(CH_2)_2$— | H | — |
| Example 120 | 1.5:1:0.0012 | H | TEA | $CH_3$ | —$(CH_2)_2$— | H | Divalent organic group that may have a urethane group |
| Example 121 | 1.5:1:0.008 | H | TEA | $CH_3$ | —$(CH_2)_2$— | H | —$CH_2$— |
| Example 122 | 1.5:1:0.32 | H | TEA | $CH_3$ | —$(CH_2)_6$— | H | — |
| Example 123 | 1.5:1:0.58 | H | TEA | $CH_3$ | —$(CH_2)_6$— | $CH_3$ | — |
| Example 124 | 1.5:1:0.00008 | H | TEA | $CH_3$ | —$(CH_2)_6$— | H | Divalent organic group that may have a urethane group |
| Example 125 | 1.5:1:0.62 | H | TEA | $CH_3$ | —$(CH_2)_6$— | $CH_3$ | — |
| Example 126 | 1.5:1:0.1 | H | TEA | $CH_3$ | —$(CH_2)_2$— | H | —$CH_2$— |
| Example 127 | 1.5:1:0.1 | H | TEA | $CH_3$ | —$(CH_2)_{12}$— | H | —$CH_2$— |
| Example 128 | 1.5:1:0.1 | H | TEA | $CH_3$ | —$(CH_2)_{16}$— | H | —$CH_2$— |
| Example 129 | 1.5:1:0.1 | $CH_3$ | TEA | $CH_3$ | —$(CH_2)_6$— | H | —$CH_2$— |
| Example 130 | 1.5:1:0.1 | H, $CH_3$ | TEA | $CH_3$ | —$(CH_2)_6$— | H | —$CH_2$— |
| Example 131 | 1.5:1:0.1 | H | TEA | $CH_3$ | —$(CH_2)_6$— | H | —$CH_2$— |
| Example 132 | 1.5:1:0.1 | H | TEA | $CH_3$ | —$(CH_2)_6$— | H | —$CH_2$— |
| Example 133 | 1.5:1:0.1 | H | TEA | $CH_3$ | —$(CH_2)_6$— | H | —$CH_2$— |
| Comparative Example 13 | 1:0:1 | H | TEA | — | — | H | —$CH_2$— |
| Comparative Example 14 | 0:1:1 | — | — | $CH_3$ | —$(CH_2)_6$— | H | —$CH_2$— |
| Comparative Example 15 | 1:0:1 | H | TEA | — | — | H | —$CH_2$— |
| Comparative Example 16 | 0:0:0 | — | — | — | — | — | — |

| | Second of structure of Chemical formula III | | | | | |
|---|---|---|---|---|---|---|
| | m1 | n | Z | m2 | A | m3 |
| Example 101 | 1 | 4 | —C— | 1 | — | 0 |
| Example 102 | 1 | 3 | —C— | 1 | —$C_2H_5$ | 1 |

TABLE 6-continued

| Example 103 | 1 | 4 | —C— | 1 | — | 0 |
|---|---|---|---|---|---|---|
| Example 104 | 1 | 3 | —C— | 1 | —$C_2H_5$ | 1 |
| Example 105 | 1 | 3 | —C— | 1 | —$C_2H_5$ | 1 |
| Example 106 | 1 | 4 | —C— | 1 | — | 0 |
| Example 107 | 1 | 4 | —C— | 1 | — | 0 |
| Example 108 | 1 | 3 | —C— | 1 | —$C_2H_5$ | 1 |
| Example 109 | 1 | 3 | —C— | 1 | —$C_2H_5$ | 1 |
| Example 110 | 1 | 4 | —C— | 1 | — | 0 |
| Example 111 | 1 | 5 | —CCH$_2$OCH$_2$C— | 1 | —CH$_2$OH | 1 |
| Example 112 | 1 | 3 | —C— | 1 | —$C_2H_5$ | 1 |
| Example 113 | 1 | 5 | —CCH$_2$OCH$_2$C— | 1 | —CH$_2$OH | 1 |
| Example 114 | 1 | 5 | —CCH$_2$OCH$_2$C— | 1 | —CH$_2$OH | 1 |
| Example 115 | 1 | 3 | —C— | 1 | —$C_2H_5$ | 1 |
| Example 116 | 1 | 6 | —CCH$_2$OCH$_2$C— | 1 | — | 0 |
| Example 117 | 1 | 4 | —C— | 1 | — | 0 |

TABLE 6-continued

| | | | | | | |
|---|---|---|---|---|---|---|
| Example 118 | 1 | 3 | —C— (with two vertical bonds) | 1 | —C$_2$H$_5$ | 1 |
| Example 119 | 0 | 2 | —(CH$_2$)$_6$— | 1 | — | 0 |
| Example 120 | 1 or 0 | 10 | Divalent organic group that may have a urethane group | 1 or 0 | Divalent organic group that may have a urethane group | 1 or 0 |
| Example 121 | 1 | 6 | —CCH$_2$OCH$_2$C— (with vertical bonds) | 1 | — | 0 |
| Example 122 | 0 | 2 | —CHCH$_2$OCH$_2$CHO— with CH$_3$ substituents | 1 | — | 0 |
| Example 123 | 0 | 2 | — | 1 | — | 0 |
| Example 124 | 1 or 0 | 15 | (CH$_2$CH$_2$O)$_2$— (n+m3) valent organic group that may have a urethane group | 1 or 0 | Divalent organic group that may have a urethane group | 1 or 0 |
| Example 125 | 0 | 2 | —(CH$_2$)$_2$— | 1 | — | 0 |
| Example 126 | 1 | 4 | —C— | 1 | — | 0 |
| Example 127 | 1 | 4 | —C— | 1 | — | 0 |
| Example 128 | 1 | 4 | —C— | 1 | — | 0 |
| Example 129 | 1 | 4 | —C— | 1 | — | 0 |
| Example 130 | 1 | 4 | —C— | 1 | — | 0 |
| Example 131 | 1 | 4 | —C— | 1 | — | 0 |
| Example 132 | 1 | 4 | —C— | 1 | — | 0 |
| Example 133 | 1 | 4 | —C— | 1 | — | 0 |
| Comparative Example 1 | 1 | 4 | —C— | 1 | — | 0 |

TABLE 6-continued

| | | | | | | |
|---|---|---|---|---|---|---|
| Comparative Example 14 | 1 | 4 |  | 1 | — | 0 |
| Comparative Example 15 | 1 | 4 |  | 1 | — | 0 |
| Comparative Example 16 | — | — | — | — | — | — |

| | Structure of Chemical formula VI | | R4 of Chemical formula VII | Mw |
|---|---|---|---|---|
| | P | Q | | |
| Example 101 | — | — | — | 52800 |
| Example 102 | — | — | — | 55,600 |
| Example 103 | — | — | — | 52,600 |
| Example 104 | — | — | — | 52,300 |
| Example 105 | — | — | — | 52,000 |
| Example 106 | — | — | — | 54,900 |
| Example 107 | — | — | — | 51,800 |
| Example 108 | — | — | — | 53,000 |
| Example 109 | — | — | — | 55,900 |
| Example 110 | — | — | — | 51,700 |
| Example 111 | — | — | — | 52,000 |
| Example 112 | — | — | — | 55,200 |
| Example 113 | — | — | — | 52,300 |
| Example 114 | — | — | — | 54,100 |
| Example 115 | — | — | — | 53,600 |
| Example 116 | — | — | — | 55,000 |
| Example 117 | — | — | — | 52,000 |
| Example 118 | — | — | — | 55,900 |
| Example 119 | — | — | — | 52,800 |
| Example 120 | 2 | 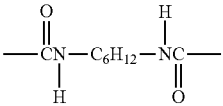 | H | 54,000 |
| Example 121 | — | — | — | 53,800 |
| Example 122 | — | — | — | 52,700 |
| Example 123 | — | — | — | 55,300 |
| Example 124 | 3 | 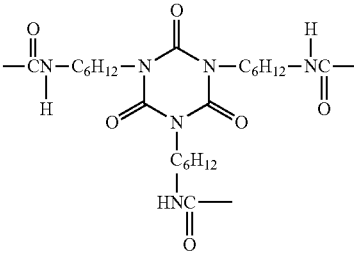 | H | 55,300 |
| Example 125 | — | — | — | 53,300 |
| Example 126 | — | — | — | 54,400 |
| Example 127 | — | — | — | 51,800 |
| Example 128 | — | — | — | 54,200 |
| Example 129 | — | — | — | 55,600 |
| Example 130 | — | — | — | 53,300 |
| Example 131 | — | — | — | 52,800 |
| Example 132 | — | — | — | 52,800 |
| Example 133 | — | — | — | 52,800 |
| Comparative Example 13 | — | — | — | — |

TABLE 6-continued

| Comparative Example 14 | — | — | — | — |
| Comparative Example 15 | — | — | — | — |
| Comparative Example 16 | — | — | — | — |

"that may have a urethane group" means "at least one of Y and Z includes a urethane bond portion".
TEA: Tetraethyl ammonium ion Characteristics of the pigment dispersions and aqueous inks prepared in Examples 101 to 133 and Comparative Examples 13 to 16 were evaluated in the following manner. The copolymer of Comparative Example 14 was water-insoluble and not evaluated Evaluation of Storage Stability of Pigment Dispersion A glass container was filled with each pigment dispersion and stored at 70 degrees C. for 3 weeks. The change rate of the viscosity after storage to the viscosity before storage was obtained from the following relation and evaluated according to the following criteria.

Change rate of viscosity (%)=(Viscosity of pigment dispersion after storage−Viscosity of pigment dispersion before storage)/viscosity of pigment dispersion before storage)×100

The viscosity was measured by a viscometer (RE80L, manufactured by TOKI SANGYO CO., LTD.) to measure the viscosity of the ink at 25 degrees C. at 20 rotations. The results are shown in Table 7.

Evaluation Criteria

A: Change rate of viscosity within + or −3%

A: Change rate of viscosity within + or −5%

B: change rate of viscosity within the range of from −8% to less than −5% and more than 5% to 8%

C: change rate of viscosity within −10% to less than −8% and greater than 8% to 10%.

D: change rate of viscosity within the range of from less than −10% to −30% and more than 10% to 30%

E: change rate of viscosity less than 30% or greater than 30% (gelated to the degree that evaluation was not possible)

Storage Stability of Aqueous Ink

An ink cartridge was filled with each ink and stored at 70 degrees C. for 3 weeks. The change rate of the viscosity after storage to the viscosity before storage was obtained from the following relation and evaluated according to the following criteria.

The change rate of viscosity (%)=(Viscosity of ink after storage−viscosity of ink before storage)/(viscosity of ink before storage)×100

The viscosity was measured by a viscometer (RE80L, manufactured by TOKI SANGYO CO., LTD.) to measure the viscosity of the ink at 25 degrees C. at 20 rotations. The results are shown in Table 7.

Evaluation Criteria

A: Change rate of viscosity within + or −3%

A: Change rate of viscosity within + or −5%

B: change rate of viscosity within the range of from −8% to less than −5% and more than 5% to 8%

C: change rate of viscosity within −10% to less than −8% and greater than 8% to 10%.

D: change rate of viscosity within the range of from less than −10% to −30% and more than 10% to 30%

E: change rate of viscosity less than 30% or greater than 30% (gelated to the degree that evaluation was not possible)

Image Density

An inkjet printer (IPSiO GX5000) was filled with each ink at 23 degrees C. and 50 percent RH. A chart including general symbols of 64 point JIS X 0208 (1997) and 2223 made by Microsoft Word 2000 (manufactured by Microsoft Corporation) was printed on plain paper 1 (Xerox 4200, manufactured by Xerox Corporation) and paper 2 (MyPaper, manufactured by Ricoh Company Ltd.). The symbol portion on image surface was measured by X-Rite 938 (manufactured by X-Rite Inc.) and evaluated according to the following criteria. The printing mode used was: A modified mode in which "Plain Paper-Standard Fast" was modified to "No Color Calibration" from the user setting for plain paper by the driver installed onto the printer. Incidentally, the symbols of JIS X 0208 (1997) and 2223 have squares for the exterior and the inside thereof was entirely painted with ink. The results are shown in Table 4.

Evaluation Criteria

A: 1.25 or higher

B: 1.20 to less than 1.25

C: 1.10 to less than 1.20

D: Less than 1.10

E: pigment was gelated and not dispersed, impossible to print symbols.

Beading

The general symbols of JIS X 0208 (1997) and 2223 of were printed in the same manner as for Image Density except that the print mode was changed to the mode "gloss paper—fast" using LumiArt Gloss 90 GSM™ (manufactured by Stora Enso Japan K.K.) as the recording medium and the printed symbols were evaluated according to the following criteria. The results are shown in Table 7.

Evaluation Criteria

A: No beading or beading occurred to less than 10% of the entire image

B: Beading occurred to 10% to less than 20% of the entire image

C: Beading occurred to 20% to less than 40% of the entire image

D: Beading occurred to 40% to less than 90% of the entire image

E: Beading occurred to 90% or more of the entire image

F: Gelated pigment not dispersed, impossible to print symbols

TABLE 7

| | Dispersion element of pigment | | Viscosity change rate | Image Density Plain paper 1 | Beading evaluation | | | |
|---|---|---|---|---|---|---|---|---|
| | Initial viscosity | Viscosity after storage | | | Plain paper 2 | Plain paper 1 | Plain paper 1 | Plain paper 2 |
| Example 101 | 3.49 | 3.51 | A+ | A | A | A | A | |
| Example 102 | 3.71 | 3.74 | A+ | A | A | A | A | |
| Example 103 | 3.81 | 3.84 | A+ | A | A | A | A | |
| Example 104 | 3.52 | 3.61 | A+ | A | A | A | A | |
| Example 105 | 4.55 | 4.65 | A+ | A | A | A | A | |
| Example 106 | 4.76 | 4.87 | A+ | A | A | A | A | |
| Example 107 | 4.88 | 5.01 | A+ | A | A | A | A | |
| Example 108 | 5.46 | 5.7 | A | A | A | A | A | |
| Example 109 | 5.08 | 5.29 | A | A | A | A | A | |
| Example 110 | 4.13 | 4.3 | A | A | A | A | A | |
| Example 111 | 4.47 | 4.67 | A | A | A | A | A | |
| Example 112 | 6.32 | 6.72 | B | A | A | A | A | |
| Example 113 | 6.84 | 7.3 | B | A | A | A | A | |
| Example 114 | 3.41 | 3.49 | A+ | A | A | A | A | |
| Example 115 | 4.21 | 4.23 | A+ | A | A | A | A | |
| Example 116 | 3.43 | 3.62 | B | A | A | A | A | |
| Example 117 | 3.42 | 3.58 | A | A | A | A | A | |
| Example 118 | 5.37 | 5.39 | A+ | A | A | A | A | |
| Example 119 | 5.91 | 5.93 | A+ | A | A | A | A | |
| Example 120 | 3.41 | 3.64 | B | A | A | A | A | |
| Example 121 | 3.42 | 3.64 | B | A | A | A | A | |
| Example 122 | 7.32 | 7.34 | A+ | A | A | A | A | |
| Example 123 | 8.22 | 8.24 | A+ | A | A | A | A | |
| Example 124 | 3.4 | 3.67 | B | A | A | A | A | |
| Example 125 | 9.01 | 9.02 | A+ | A | A | A | A | |
| Example 126 | 3.49 | 3.53 | A+ | A | A | A | A | |
| Example 127 | 3.51 | 3.56 | A+ | A | A | A | A | |
| Example 128 | 4.78 | 5.01 | A | A | A | A | A | |
| Example 129 | 3.48 | 3.5 | A+ | A | A | A | A | |
| Example 130 | 3.48 | 3.5 | A+ | A | A | A | A | |
| Example 131 | 7.61 | 7.79 | A+ | A | A | A | A | |
| Example 132 | 7.92 | 8.31 | A | A | A | A | A | |
| Example 133 | 5.65 | 5.83 | A | A | A | A | A | |
| Comparative Example 13 | | E | E | E | E | E | E | |
| Comparative Example 14 | | — | E | — | | | | |
| Comparative Example 15 | | E | E | E | E | E | E | |
| Comparative Example 16 | 4.71 | 5.16 | C | C | D | C | D | |

As seen in the results, the pigment dispersion and the inks of Examples 101 to 133 have excellent storage stability and high image density and are excellent in terms of beading.

Copolymers having the structure units represented by the Chemical formula I, Chemical formula II, and Chemical formula VII are described below in a specific manner.

Example 201: Synthesis of Copolymer 201 and Preparation of Aqueous Ink 201

Figure 8:
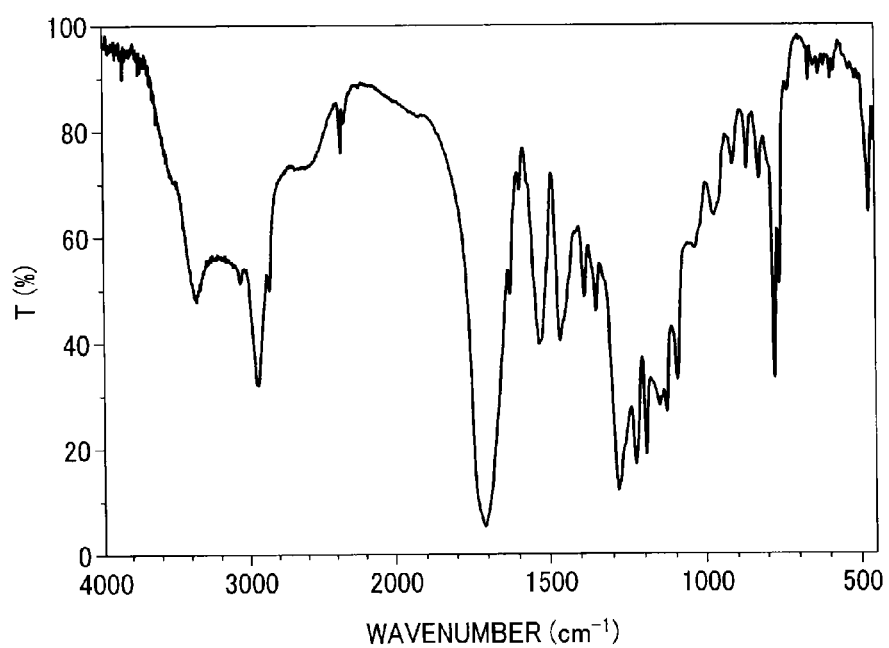
FIG. 8 is a graph illustrating IR spectrum of the copolymer 201 obtained in Example 201 described later.

2.00 g (27.8 mmol) of acrylic acid (manufactured by Sigma-Aldrich Corporation), 7.91 g (18.5 mmol) of the monomer M-1 of the Chemical structure 1, and 0.167 g (0.18 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.381 g (2.32 mmol) of 2,2'-azoiso(butylonitrile) (manufactured by Tokyo Chemical Industry Co., Ltd.) and 0.123 g (1.16 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.55 g of a copolymer 201 (weight average molecular weight (Mw): 13,200, number average molecular weight (Mn): 6,500). FIG. 8 is a graph illustrating IR spectrum of the obtained copolymer.

Thereafter, 2.00 g of the obtained copolymer 1 was dissolved in an aqueous solution of tetraethyl ammonium hydroxide in such a manner that the concentration of the copolymer 201 was 2.38 percent and the pH thereof was 8.0 to prepare an aqueous solution 201 for pigment dispersion of the copolymer 201.

Preparation of Aqueous Ink 201

16.0 parts of carbon black (NIPEX150, manufactured by Degussa AG) was added to 84.0 parts of the aqueous solution of the prepared copolymer 201 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain 95.0 parts of a pigment dispersion 201 (pigment solid portion concentration: 16 percent).

47.0 parts of the pigment dispersion 201, 2.0 parts of 3-methyl-1,3-butanediol, 8.0 parts of glycerin, 15.0 parts of 3-methoxy-N,N-dimethyl propionamide, 15.0 parts of 3-buthoxy-N,N-dimethyl propionamide, 1.0 part of fluorine-containing surfactant (ZONYL™ FS-300, solid portion: 40 percent by weight, manufactured by E. I. du Pont de Nemours and Company), and 12.0 parts of deionized water were mixed followed by stirring for one hour and filtration by a membrane filter having an opening diameter of 0.8 micro meter to obtain an aqueous ink 201.

Example 202: Synthesis of Copolymer 202 and Preparation of Aqueous Ink 202

Synthesis of Copolymer 202

2.00 g (27.8 mmol) of acrylic acid (manufactured by Sigma-Aldrich Corporation), 7.91 g (18.5 mmol) of the monomer M-1 of the Chemical structure 1, and 0.833 g (0.92 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.387 g (2.36 mmol) of 2,2'-azoiso(butylonitrile) (manufactured by Tokyo Chemical Industry Co., Ltd.) and 0.125 g (1.18 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.87 g of a copolymer 202 (weight average molecular weight (Mw): 13,400, number average molecular weight (Mn): 6,600).

Thereafter, 2.00 g of the obtained copolymer 202 was dissolved in an aqueous solution of tetraethyl ammonium hydroxide in such a manner that the concentration of the copolymer 202 was 2.38 percent and the pH thereof was 8.0 to prepare an aqueous solution 202 for pigment dispersion of the copolymer 202.

Preparation of Aqueous Ink 202

Pigment dispersion 202 was obtained in the same manner as in Example 201 except that the aqueous solution of copolymer 202 was used instead of the aqueous solution of copolymer 201 in the preparation of the pigment dispersion of Example 201 of Example 201.

Thereafter, aqueous ink 202 was obtained in the same manner as in Example 201 except that the pigment dispersion 202 was used instead of the pigment dispersion 201 of Example 201.

Example 203: Synthesis of Copolymer 203 and Preparation of Aqueous Ink 203

Synthesis of Copolymer 203

2.00 g (27.8 mmol) of acrylic acid (manufactured by Sigma-Aldrich Corporation), 7.91 g (18.5 mmol) of the monomer M-1 of the Chemical structure 1, and 0.426 g (0.185 mmol) of acrylic silicone monomer (X-22-174BX, molecular weight: 2,300, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.381 g (2.32 mmol) of 2,2'-azoiso(butylonitrile) (manufactured by Tokyo Chemical Industry Co., Ltd.) and 0.123 g (1.16 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 10.01 g of a copolymer 203 (weight average molecular weight (Mw): 12,200, number average molecular weight (Mn): 6,100).

Thereafter, 2.00 g of the obtained copolymer was dissolved in an aqueous solution of tetraethyl ammonium hydroxide in such a manner that the concentration of the copolymer 203 was 2.38 percent and the pH thereof was 8.0 to prepare an aqueous solution 203 for pigment dispersion of the copolymer 203.

Preparation of Aqueous Ink 203

Pigment dispersion 203 was obtained in the same manner as in Example 201 except that the aqueous solution of copolymer 203 was used instead of the aqueous solution of copolymer 201 of Example 201.

Thereafter, aqueous ink 203 was obtained in the same manner as in Example 201 except that the pigment dispersion 203 was used instead of the pigment dispersion 201 of Example 201.

Example 204: Synthesis of Copolymer 204 and Preparation of Aqueous Ink 204

Synthesis of Copolymer 204

2.00 g (27.8 mmol) of acrylic acid (manufactured by Sigma-Aldrich Corporation), 7.91 g (18.5 mmol) of the monomer M-1 of the Chemical structure 1, and 1.70 g (0.740 mmol) of acrylic silicone monomer (X-22-174BX, molecular weight: 2,300, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.386 g (2.35 mmol) of 2,2'-azoiso(butylonitrile) (manufactured by Tokyo Chemical Industry Co., Ltd.) and 0.125 g (1.17 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 11.28 g of a copolymer 204 (weight average molecular weight (Mw): 13,000, number average molecular weight (Mn): 6,400).

Thereafter, 2.00 g of the obtained copolymer was dissolved in an aqueous solution of tetraethyl ammonium hydroxide in such a manner that the concentration of the copolymer 204 was 2.38 percent and the pH thereof was 8.0 to prepare an aqueous solution 204 for pigment dispersion of the copolymer 204.

Preparation of Aqueous Ink 204

Pigment dispersion 204 was obtained in the same manner as in Example 201 except that the aqueous solution of copolymer 204 was used instead of the aqueous solution of copolymer 201 of Example 201.

Thereafter, aqueous ink 204 was obtained in the same manner as in Example 201 except that the pigment dispersion 204 was used instead of the pigment dispersion 201 of Example 201.

Example 205: Synthesis of Copolymer 205 and Preparation of Aqueous Ink 205

Synthesis of Copolymer 205

2.00 g (27.8 mmol) of acrylic acid (manufactured by Sigma-Aldrich Corporation), 7.91 g (18.5 mmol) of the monomer M-1 of the Chemical structure 1, and 0.078 g (0.18 mmol) of acrylic silicone monomer (X-22-2475, molecular weight: 420, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.381 g (2.32 mmol) of 2,2'-azoiso(butylonitrile) (manufactured by Tokyo Chemical Industry Co., Ltd.) and 0.123 g (1.16 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.72 g of a copolymer 205 (weight average molecular weight (Mw): 9,500, number average molecular weight (Mn): 5,000).

Thereafter, 2.00 g of the obtained copolymer 205 was dissolved in an aqueous solution of tetraethyl ammonium hydroxide in such a manner that the concentration of the copolymer 205 was 2.38 percent and the pH thereof was 8.0 to prepare an aqueous solution 205 for pigment dispersion of the copolymer 205.

Preparation of Aqueous Ink 205

Pigment dispersion 205 was obtained in the same manner as in Example 201 except that the aqueous solution of copolymer 205 was used instead of the aqueous solution of copolymer 201 of Example 201.

Thereafter, aqueous ink 205 was obtained in the same manner as in Example 201 except that the pigment dispersion 205 was used instead of the pigment dispersion 201 of Example 201.

Example 206: Synthesis of Copolymer 206 and Preparation of Aqueous Ink 206

Synthesis of Copolymer 206

2.00 g (27.8 mmol) of acrylic acid (manufactured by Sigma-Aldrich Corporation), 7.91 g (18.5 mmol) of the monomer M-1 of the Chemical structure 1, and 0.777 g (1.85 mmol) of acrylic silicone monomer (X-22-2475, molecular weight: 420, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.395 g (2.41 mmol) of 2,2'-azoiso(butylonitrile) (manufactured by Tokyo Chemical Industry Co., Ltd.) and 0.128 g (1.20 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 10.24 g of a copolymer 206 (weight average molecular weight (Mw): 12,000, number average molecular weight (Mn): 5,600).

Thereafter, 2.00 g of the obtained copolymer 206 was dissolved in an aqueous solution of tetraethyl ammonium hydroxide in such a manner that the concentration of the copolymer 206 was 2.38 percent and the pH thereof was 8.0 to prepare an aqueous solution 206 for pigment dispersion of the copolymer 206.

Preparation of Aqueous Ink 206

Pigment dispersion 206 was obtained in the same manner as in Example 201 except that the aqueous solution of copolymer 206 was used instead of the aqueous solution of copolymer 201 of Example 201.

Thereafter, aqueous ink 206 was obtained in the same manner as in Example 201 except that the pigment dispersion 206 was used instead of the pigment dispersion 201 of Example 201.

Example 207: Synthesis of Copolymer 207 and Preparation of Aqueous Ink 207

Synthesis of Copolymer 207

2.60 g (3.2 mmol) of methacrylic acid (manufactured by TOKYO CHEMICAL INDUSTRY CO., LTD.), 7.48 g (2.01 mmol) of the monomer M-2 of the Chemical structure 2, and 0.181 g (0.201 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.415 g (2.52 mmol) of 2,2'-azoiso(butylonitrile) (manufactured by Tokyo Chemical Industry Co., Ltd.) and 0.134 g (1.26 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.81 g of a copolymer 207 (weight average molecular weight (Mw): 10,200, number average molecular weight (Mn): 5,300).

Thereafter, 2.00 g of the obtained copolymer was dissolved in an aqueous solution of tetraethyl ammonium hydroxide in such a manner that the concentration of the copolymer 207 was 2.38 percent and the pH thereof was 8.0 to prepare an aqueous solution 207 for pigment dispersion of the copolymer 207.

Preparation of Aqueous Ink 207

Pigment dispersion 207 was obtained in the same manner as in Example 201 except that the aqueous solution of copolymer 207 was used instead of the aqueous solution of copolymer 201 of Example 201.

Thereafter, aqueous ink 207 was obtained in the same manner as in Example 201 except that the pigment dispersion 207 was used instead of the pigment dispersion 201 of Example 201.

Example 208: Synthesis of Copolymer 208 and Preparation of Aqueous Ink 208

Synthesis of Copolymer 208

Using 2-naphthoic acid-6-hydroxyhexyl ester and 2-acryloyloxyethyl isocyanate (Karenz AOI, manufactured by SHOWA DENKO K.K.), a monomer having the structure represented by Chemical structure 13 was obtained in the same manner as in Example 1.

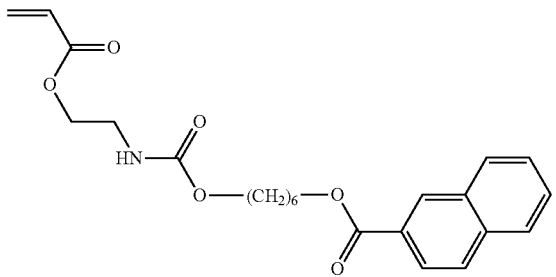

1 Chemical structure 13

1.00 g (3.2 mmol) of methacrylic acid (manufactured by Tokyo Chemical Industry Co., Ltd.), 9.61 g (23.2 mmol) of the monomer, and 0.209 g (0.232 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent of the monomer solution was heated to 75 degrees C. in an argon atmosphere, a solution in which 0.288 g (1.75 mmol) of 2,2'-azoiso(butylonitrile) (manufactured by Tokyo Chemical Industry Co., Ltd.) was dissolved in the rest of the monomer solution was dripped to the heated monomer in 2 hours followed by stirring at 75 degrees C. for six hours. The resultant was cooled down to room temperature and the thus-obtained reaction solution was dripped to hexane to precipitate a copolymer. The precipitated copolymer was filtrated followed by drying with a reduced pressure to obtain 10.63 g of a copolymer 208 (weight average molecular weight (Mw): 28,400, number average molecular weight (Mn): 9,000).

Thereafter, 2.00 g of the obtained copolymer 208 was dissolved in an aqueous solution of tetraethyl ammonium hydroxide in such a manner that the concentration of the copolymer 208 was 2.38 percent and the pH thereof was 8.0 to prepare an aqueous solution 208 for pigment dispersion of the copolymer 208.

Preparation of Aqueous Ink 208

Pigment dispersion 208 was obtained in the same manner as in Example 201 except that the aqueous solution of copolymer 208 was used instead of the aqueous solution of copolymer 201 of Example 201.

Thereafter, aqueous ink 208 was obtained in the same manner as in Example 201 except that the pigment dispersion 208 was used instead of the pigment dispersion 201 of Example 201.

Example 209: Synthesis of Copolymer 209 and Preparation of Aqueous Ink 209

Synthesis of Copolymer 209

1.60 g (22.2 mmol) of acrylic acid (manufactured by Sigma-Aldrich Corporation), 8.40 g (14.8 mmol) of the monomer M-4 of the Chemical structure 4, and 0.533 g (0.592 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.309 g (1.88 mmol) of 2,2'-azoiso(butylonitrile) (manufactured by Tokyo Chemical Industry Co., Ltd.) and 0.100 g (0.939 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.87 g of a copolymer 209 (weight average molecular weight (Mw): 12,200, number average molecular weight (Mn): 5,700).

Thereafter, 2.00 g of the obtained copolymer 209 was dissolved in an aqueous solution of sodium hydroxide in such a manner that the concentration of the copolymer 209 was 2.38 percent and the pH thereof was 8.0 to prepare an aqueous solution 209 for pigment dispersion of the copolymer 210.

Preparation of Aqueous Ink 209

Pigment dispersion 209 was obtained in the same manner as in Example 201 except that the aqueous solution of copolymer 209 was used instead of the aqueous solution of copolymer 201 of Example 201.

Thereafter, aqueous ink 209 was obtained in the same manner as in Example 201 except that the pigment dispersion 209 was used instead of the pigment dispersion 201 of Example 201.

Example 210: Synthesis of Copolymer 210 and Preparation of Aqueous Ink 210

Synthesis of Copolymer 210

3.80 g (52.7 mmol) of acrylic acid (manufactured by Sigma-Aldrich Corporation), 5.99 g (10.6 mmol) of the monomer M-4 of the Chemical structure 4, and 0.380 g (0.42 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.523 g (3.19 mmol) of 2,2'-azoiso(butylonitrile) (manufactured by Tokyo Chemical Industry Co., Ltd.) and 0.169 g (1.59 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.87 g of a copolymer 210 (weight average molecular weight (Mw): 11,800, number average molecular weight (Mn): 5,100).

Thereafter, 2.00 g of the obtained copolymer 210 was dissolved in an aqueous solution of sodium hydroxide in such a manner that the concentration of the copolymer 210 was 2.38 percent and the pH thereof was 8.0 to prepare an aqueous solution 210 for pigment dispersion of the copolymer 210.

Preparation of Aqueous Ink 210

Pigment dispersion 210 was obtained in the same manner as in Example 201 except that the aqueous solution 210 of copolymer 210 was used instead of the aqueous solution of copolymer 201 of Example 201.

Thereafter, aqueous ink 210 was obtained in the same manner as in Example 201 except that the pigment dispersion 210 was used instead of the pigment dispersion 201 in the manufacturing of the ink 201 of Example 210.

Example 211: Preparation of Aqueous Ink 211

A pigment dispersion 211 was obtained in the same manner as in Example 201 except that Pigment Blue 15:3 (Chromofine Blue, manufactured by Dainichiseika Color & Chemicals Mfg. Co., Ltd.) was used instead of carbon black (NIPEX150, manufactured by Degussa AG) in the preparation of the pigment dispersion 201 of Example 201 and the solid portion concentration was changed to 20.0 percent.

22.5 parts of the pigment dispersion 211, 2.0 parts of 3-methyl-1,3-butanediol, 8.0 parts of glycerin, 20.0 parts of 3-methoxy-N,N-dimethyl propionamide, 20.0 parts of 3-buthoxy-N,N-dimethyl propionamide, 1.0 part of fluorine-containing surfactant (ZONYL™ FS-300, solid portion: 40 percent by weight, manufactured by E. I. du Pont de Nemours and Company), and 26.5 parts of deionized water were mixed followed by stirring for one hour and filtration by a membrane filter having an opening diameter of 0.8 micro meter to obtain an aqueous ink 211.

Example 212: Preparation of Aqueous Ink 212

A pigment dispersion 212 was obtained in the same manner as in Example 201 except that Pigment Red 122 (magenta pigment: Toner Magenta E002, manufactured by Clariant Japan K.K.) was used instead of carbon black (NIPEX150, manufactured by Degussa AG) in the preparation of the pigment dispersion 201 of Example 201 and the solid portion concentration was changed to 15.0 percent.

50.0 parts of the pigment dispersion 212, 2.0 parts of 3-methyl-1,3-butanediol, 7.0 parts of glycerin, 15.0 parts of 3-methoxy-N,N-dimethyl propionamide, 15.0 parts of 3-buthoxy-N,N-dimethyl propionamide, 1.0 part of fluorine-containing surfactant (ZONYL™ FS-300, solid portion: 40 percent by weight, manufactured by E. I. du Pont de Nemours and Company), and 10.0 parts of deionized water were mixed followed by stirring for one hour and filtration by a membrane filter having an opening diameter of 0.8 micro meter to obtain an aqueous ink 212.

Example 213: Preparation of Aqueous Ink 213

A pigment dispersion 213 was obtained in the same manner as in Example 201 except that yellow pigment (Fast Yellow 531, manufactured by Dainichiseika Color & Chemicals Mfg. Co., Ltd.) was used instead of carbon black (NIPEX, manufactured by Degussa AG) in the preparation of the pigment dispersion of Example 201 of Example 201 and the solid portion concentration was changed to 15.0 percent.

530.0 parts of the pigment dispersion 213, 2.0 parts of 3-methyl-1,3-butanediol, 8.0 parts of glycerin, 22.0 parts of 3-methoxy-N,N-dimethyl propionamide, 22.0 parts of 3-buthoxy-N,N-dimethyl propionamide, 1.0 part of fluorine-containing surfactant (ZONYL™ FS-300, solid portion: 40 percent by weight, manufactured by E. I. du Pont de Nemours and Company), and 15.0 parts of deionized water were mixed followed by stirring for one hour and filtration by a membrane filter having an opening diameter of 0.8 micro meter to obtain an aqueous ink 213.

Example 214: Synthesis of Copolymer 214 and Preparation of Aqueous Ink 214

Synthesis of Copolymer 214

59.9 g (140 mmol) of the monomer M-1 of Chemical structure 1 was dissolved in a mixture of 2.02 g (28.0 mmol) of acrylic acid and 2.52 g (0.422 mmol) of acrylic silicone monomer (X-22-174ASX, molecular weight: 900, manufactured by Shin-Etsu Chemical Co., Ltd.). 100 g of deionized water, 3.00 g of anionic radical reactive surfactant (Aqualon KH-10, manufactured by DKS Co. Ltd.), and 1.00 g of ammonium persulfate were added to form a pre-emulsion by a HOMOMIXER. Thereafter, 2.00 g of Aqualon KH-10 was added to 100 g of deionized water, which was thereafter heated to 80 degrees C. in argon atmosphere. Thereafter, 10 percent of the pre-emulsion was added to conduct initial polymerization for 30 minutes.

Thereafter, the rest of the pre-emulsion was dripped in two hours to conduct polymerization followed by further polymerization at 80 degrees C. for two hours. Subsequent to cooling down, the resultant was filtered and neutralized by ammonium water to obtain O/W emulsion for addition of copolymer 214 (weight average molecular weight (Mw): 38,000, number average molecular weight (Mn): 12,800) having a solid portion concentration of 30 percent.

Preparation of Pigment Dispersion 214

The following recipe was mixed and stirred for 30 minutes to prepare an aqueous solution 98.

2-ethyl-1,3-hexane diol: 2.00 parts
Glycerol: 10.00 parts
3-methoxy-N,N-dimethyl propaneamide: 15.00 parts
3-buthoxy-N,N-dimethyl propaneamide: 15.00 parts
2-(cyclohexylamono) ethane sulfonic acid 0.05 parts
2,4,7,9-tetramethyl-4,7-decanediol: 0.50 parts
Fluorine-containing surfactant: (ZONYL FS-300, manufactured by E. I. du Pont de Nemours and Company): 0.25 parts
Diethanol amine: 0.01 parts
Deionized water: 12.93 parts Thereafter, 50 g of dried carbon black, 100 mL of deionized water, and 15.5 g (50 mmol) of the compound having the following Chemical formula 9 were mixed. The mixture was heated to 60 degrees C. while being stirred at 300 rpm. 50 mmol of 20 percent sodium nitrite aqueous solution was added in 15 minutes. Thereafter, the resultant was stirred at 60 degrees C. for three hours. The resultant was diluted with 75 mL of deionized water followed by filtration. Thereafter, deionized water was added in such a manner that the solid portion concentration of the filtrate was 20.0 percent to obtain pigment dispersion 214 of carbon black.

Chemical formula 9

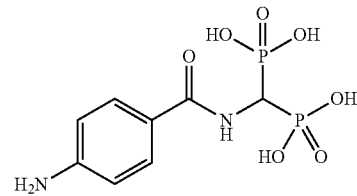

Preparation of Aqueous Ink 214

Thereafter, 37.50 parts of the pigment dispersion 214 was added to the aqueous solution 214 followed by stirring for 30 minutes. Furthermore, 6.67 parts of the copolymer 214 (solid portion concentration: 30 percent) was added followed by stirring for 30 minutes. Thereafter, aqueous ink 214 was obtained by filtering the resultant with a membrane filter having an average hole diameter of 0.8 μm.

Example 215: Synthesis of Copolymer 215 and Preparation of Aqueous Ink 215

Synthesis of Copolymer 215

59.9 g (140 mmol) of the monomer M-1 of Chemical structure 1 was dissolved in a mixture of 2.02 g (28.0 mmol) of acrylic acid and 2.52 g (0.422 mmol) of acrylic silicone monomer (X-22-174ASX, molecular weight: 900, manufactured by Shin-Etsu Chemical Co., Ltd.). 100 g of deionized water, 3.00 g of anionic radical reactive surfactant (Aqualon KH-10, manufactured by DKS Co. Ltd.), and 1.00 g of ammonium persulfate were added to form a pre-emulsion by a HOMOMIXER. Thereafter, 2.0 g of Aqualon KH-10 was added to 100 g of deionized water, which was thereafter heated to 80 degrees C. in argon atmosphere. Thereafter, 10 percent of the pre-emulsion was added to conduct initial polymerization for 30 minutes.

Thereafter, the rest of the pre-emulsion was dripped in two hours to conduct polymerization followed by further polymerization at 80 degrees C. for two hours. Subsequent to cooling down, the resultant was filtered and neutralized by ammonium water to obtain 0/W emulsion for addition of copolymer 215 (weight average molecular weight (Mw): 39,000, number average molecular weight (Mn): 12,900) having a solid portion concentration of 30 percent.

The structures of the copolymers 201 to 210 and 214 and 215 of Examples 201 to 215 are shown in Table 8.

TABLE 8

| Example | | (I):(II) (Molar ratio) | R1 | X | R2 | L | (VII) (% by weight) | R3 |
|---|---|---|---|---|---|---|---|---|
| Example 201 | Copolymer 201 | 1.5:1 | H | TEA | $CH_3$ | $-(CH_2)_6-$ | 1.7 | $CH_3$ |
| Example 202 | Copolymer 202 | 1.5:1 | H | TEA | $CH_3$ | $-(CH_2)_6-$ | 7.8 | $CH_3$ |
| Example 203 | Copolymer 203 | 1.5:1 | H | TEA | $CH_3$ | $-(CH_2)_6-$ | 4.1 | $CH_3$ |
| Example 204 | Copolymer 204 | 1.5:1 | H | TEA | $CH_3$ | $-(CH_2)_6-$ | 14.7 | $CH_3$ |
| Example 205 | Copolymer 205 | 1.5:1 | H | TEA | $CH_3$ | $-(CH_2)_6-$ | 0.8 | $CH_3$ |
| Example 206 | Copolymer 206 | 1.5:1 | H | TEA | $CH_3$ | $-(CH_2)_6-$ | 7.3 | $CH_3$ |
| Example 207 | Copolymer 207 | 1.5:1 | $CH_3$ | TEA | $CH_3$ | $-(CH_2)_2-$ | 1.8 | $CH_3$ |
| Example 208 | Copolymer 208 | 0.5:1 | $CH_3$ | TEA | H | $-(CH_2)_6-$ | 1.9 | $CH_3$ |
| Example 209 | Copolymer 209 | 1.5:1 | H | $Na^+$ | $CH_3$ | $-(CH_2)_{16}-$ | 5.1 | $CH_3$ |
| Example 210 | Copolymer 210 | 5:1 | H | $Na^+$ | $CH_3$ | $-(CH_2)_{16}-$ | 3.7 | $CH_3$ |
| Example 214 | Copolymer 214 | 0.2:1 | H | TEA | $CH_3$ | $-(CH_2)_6-$ | 3.9 | $CH_3$ |
| Example 215 | Copolymer 215 | 0.4:1 | $CH_3$ | TEA | $CH_3$ | $-(CH_2)_6-$ | 1.8 | $CH_3$ |

| | (VII) (Molecular Weight) | Polymerization Method | Mw | Mn |
|---|---|---|---|---|
| Example 201 | 900 | Solution polymerization | 13,200 | 6,500 |
| Example 202 | 900 | Solution polymerization | 13,400 | 6,600 |
| Example 203 | 2,300 | Solution polymerization | 12,200 | 6,100 |
| Example 204 | 2,300 | Solution polymerization | 13,000 | 6,400 |
| Example 205 | 420 | Solution polymerization | 9,500 | 5,000 |
| Example 206 | 420 | Solution polymerization | 12,000 | 5,600 |
| Example 207 | 900 | Solution polymerization | 10,200 | 5,300 |
| Example 208 | 900 | Solution polymerization | 28,400 | 9,000 |
| Example 209 | 900 | Solution polymerization | 12,200 | 5,700 |
| Example 210 | 900 | Solution polymerization | 11,800 | 5,100 |

TABLE 8-continued

| Example 214 | 900 | Emulsification polymerization | 38,000 | 12,800 |
| Example 215 | 900 | Emulsification polymerization | 39,000 | 12,900 |

TEA: Tetraethyl ammonium ion

Preparation of Pigment Dispersion 215

The following recipe was mixed and stirred for 30 minutes to prepare an aqueous solution 215.
2-ethyl-1,3-hexane diol: 2.00 parts
Glycerol: 10.00 parts
3-methoxy-N,N-dimethyl propaneamide: 20.00 parts
3-buthoxy-N,N-dimethyl propaneamide: 20.00 parts
2-(cyclohexylamono) ethane sulfonic acid: 0.05 parts
2,4,7,9-tetramethyl-4,7-decanediol: 0.50 parts
Fluorine-containing surfactant: (ZONYL FS-300, manufactured by E. I. du Pont de Nemours and Company): 0.25 parts
Diethanol amine: 0.01 parts
Deionized water: 17.93 parts Thereafter, 4.50 g of p-amino benzoate was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of copper phthalocyanine pigment (PB15:4, manufactured by Sun Chemical Corporation) was added followed by mixing at 8,500 rpm for one hour. Furthermore, a solution in which 4.5 g of p-amino benzoic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained cyan pigment was dispersed in water. Coarse particles were removed by centrifugal and deionized water was added in such a manner that the solid portion concentration was 20.0% to obtain a cyan pigment dispersion 215 having a surface treated with p-amino benzoic acid.

Thereafter, 22.50 parts of the pigment dispersion 215 was added to the aqueous solution 215 followed by stirring for 30 minutes. Furthermore, 6.67 parts of the copolymer 215 (solid portion concentration: 30 percent) was added followed by stirring for 30 minutes. Thereafter, aqueous ink 215 was obtained by filtering the resultant with a membrane filter having an average hole diameter of 0.8 μm.

Example 216: Preparation of Aqueous Ink 216

Preparation of Pigment Dispersion 216

The aqueous solution 214 was prepared in the same manner as in Example 214. Thereafter, 4.50 g of sulphanilic acid was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of magenta pigment (PR122, manufactured by Sun Chemical Corporation) was added followed by mixing at 8,500 rpm for one hour. Furthermore, a solution in which 4.5 g of sulphanilic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained magenta pigment was dispersed in water. Coarse particles were removed by centrifugal and deionized water was added in such a manner that the solid portion concentration was 20.0% to obtain a magenta pigment dispersion 216 having a surface treated with sulphanilic acid.

Thereafter, 37.50 parts of the pigment dispersion 216 was added to the aqueous solution 214 followed by stirring for 30 minutes. Furthermore, 6.67 parts of the copolymer 215 (solid portion concentration: 30 percent) was added followed by stirring for 30 minutes. Thereafter, aqueous ink 216 was obtained by filtering the resultant with a membrane filter having an average hole diameter of 0.8 μm.

Example 217: Preparation of Aqueous Ink 217

The aqueous solution 215 was prepared in the same manner as in Example 215. 22.50 parts of the cyan pigment dispersion 211 prepared in Example 211 was added to the aqueous solution 215 followed by stirring for 30 minutes. Furthermore, 6.67 parts of the copolymer 215 (solid portion concentration: 30 percent) was added followed by stirring for 30 minutes. Thereafter, aqueous ink 217 was obtained by filtering the resultant with a membrane filter having an average hole diameter of 0.8 μm.

Comparative Example 17: Synthesis of Comparative Copolymer RCP-17 and Preparation of Comparative Aqueous Ink RGJ-17

Synthesis of Comparative Copolymer RCP-17

10.7 g (105 Mmol) of 1-Hexaneol was Dissolved in Dried Methylethylketone Followed by heating to 60 degrees C. To this solution, 15.5 g (100 mmol) of 2-methacryloyloxyethyl isocyanate (Karenz MOI, manufactured by SHOWA DENKO K.K.) was dripped in one hour followed by stirring at 70 degrees C. for 12 hours. After cooled down to room temperature, the solvent was distilled away. The remainder was refined by silica gel column chromatography with a solvent mixture of a methylene chloride and hexane with a volume rate of 9:1 serving as an eluent to obtain 22.5 g of monomer RM-17 represented by the following Chemical structure 14.

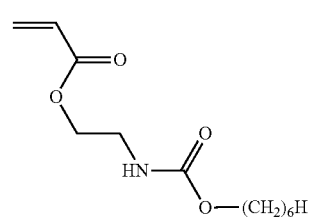

Chemical strrructure 14

3.00 g (41.6 mmol) of acrylic acid (manufactured by Sigma-Aldrich Corporation), 7.14 g (27.8 mmol) of the monomer RM-17, and 0.250 g (0.278 mmol) of acrylic silicone monomer (X-22-174ASX, molecular weight: 900, manufactured by Shin-Etsu Chemical Co., Ltd.) were dissolved in 50 mL of methylethylketone to prepare a monomer solution. After 10 percent by weight of the monomer solution was heated to 75 degrees C. in an argon atmosphere, a solution in which 0.572 g (3.48 mmol) of 2,2'-azoiso(butylonitrile) (manufactured by Tokyo Chemical Industry Co., Ltd.) and 0.185 g (1.74 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 10.2 g of a copolymer RCP-17 (weight average molecular weight (Mw): 10,200, number average molecular weight (Mn): 3,900).

Preparation of Comparative Aqueous Ink RGJ-17

Thereafter, comparative pigment dispersion RPD-17 was obtained in the same manner as in Example 201 except that the comparative copolymer RCP-17 was used instead of the copolymer 201 in the preparation of the pigment dispersion 201 of Example 201.

Thereafter, comparative aqueous ink RGJ-17 was obtained in the same manner as in Example 201 except that the comparative pigment dispersion RPD-17 was used instead of the pigment dispersion 201 in the manufacturing of the ink 201 of Example 201.

Comparative Example 18: Preparation of Comparative Aqueous Ink RGJ-18

Comparative pigment dispersion RPD-18 was obtained in the same manner as in Example 211 except that the comparative copolymer RCP-17 was used instead of the copolymer 211 in the preparation of the pigment dispersion 211 of Example 211.

Thereafter, comparative aqueous ink RGJ-18 was obtained in the same manner as in Example 211 except that the comparative pigment dispersion RPD-18 was used instead of the pigment dispersion 211 in the manufacturing of the ink 211 of Example 211.

Comparative Example 19: Preparation of Comparative Aqueous Ink RGJ-19

Comparative pigment dispersion RPD-19 was obtained in the same manner as in Example 212 except that the comparative copolymer RCP-17 was used instead of the copolymer 201 in the preparation of the pigment dispersion 212 of Example 212.

Thereafter, comparative aqueous ink RGJ-19 was obtained in the same manner as in Example 212 except that the comparative pigment dispersion RPD-19 was used instead of the pigment dispersion 212 in the manufacturing of the ink 212 of Example 212.

Comparative Example 20: Preparation of Comparative Aqueous Ink RGJ-20

Thereafter, comparative pigment dispersion RPD-20 was obtained in the same manner as in Example 213 except that the comparative copolymer RCP-17 was used instead of the copolymer 213 in the preparation of the pigment dispersion 213 of Example 213.

Thereafter, comparative aqueous ink RGJ-20 was obtained in the same manner as in Example 213 except that the comparative pigment dispersion RPD-20 was used instead of the pigment dispersion 213 in the manufacturing of the ink 213 of Example 213.

Comparative Example 21: Synthesis of Comparative Copolymer RCP-21 and Preparation of Comparative Aqueous Ink RGJ-21

Synthesis of Comparative Copolymer RCP-21

80 g of 2-phenoxyethyl methacrylate as monomer, 3.7 g of 3-mercapto-1-propanol as chain transfer agent, and 0.3 g of 2,2-azobis(2,4-dimethyl valero nitrile) as initiator were dissolved in 160 mL of tetrahydrofuran (THF) followed by heating to 65 degrees C. to conduct reaction in nitrogen atmosphere for seven hours. The thus-obtained solution was naturally cooled down and 80 mg of dibutyl tin (IV) dilaurate and a catalyst amount of hydroquinone were added thereto. 10.0 g of 2-methacryloyloxy ethylisocyanate was dripped to the resultant. The resultant was heated to 50 degrees C. to conduct reaction for 2.5 hours. Thereafter, the resultant was re-precipitated by a liquid mixture of water and methanol for refinement to obtain 71 g of macromonomer MM-21 (weight average molecular weight (Mw): 4,000, number average molecular weight (Mn): 1,900).

Thereafter, 20 g of methylethylketone was heated to 75 degrees C. in nitrogen atmosphere. A solution in which 1.16 g of dimethyl-2,2'-azobis isobutylate, 9 g of macromonomer MM-21 obtained as described above, 1.8 g of p-styrene sulfonic acid, and 49.2 g of methylmethacrylate were dissolved in 40 g of methylethylketone was dripped to the heated methylethylketone in three hours. After the dripping, the reaction was caused to continue another hour. Thereafter, a solution in which 0.6 g of methylethylketone was dissolved in 0.2 g of dimethyl-2,2'-azobis isobutylate was added followed by heating to 80 degrees C. and stirring for four hours while being heated. Furthermore, a solution in which 0.2 g of dimethyl-2,2'-azobis isobutylate was dissolved in 0.6 g of methylethylketone was added followed by stirring for six hours while being heated. Subsequent to being cooled down, the thus-obtained reaction solution was dripped to hexane to precipitate a graft polymer followed by filtration and drying to obtain comparative copolymer RCP-21.

Comparative Example RPD-21: Preparation of Comparative Aqueous Ink RGJ-21

Thereafter, comparative pigment dispersion RPD-21 was obtained in the same manner as in Example 201 except that the comparative copolymer RCP-21 was used instead of the copolymer 201 in the preparation of the pigment dispersion 201 of Example 201.

Thereafter, comparative aqueous ink RGJ-21 was obtained in the same manner as in Example 201 except that the comparative pigment dispersion RPD-21 was used instead of the pigment dispersion 201 in the manufacturing of the ink of Example 201.

Comparative Example 22: Synthesis of Comparative Copolymer RCP-22 and Preparation of Comparative Aqueous Ink RGJ-22

Synthesis of Comparative Copolymer RCP-22

3.00 g (41.6 mmol) of acrylic acid (manufactured by Sigma-Aldrich Corporation) and 7.14 g (27.6 mmol) of the monomer RM-17 were dissolved in 50 mL of methylethyl ketone to prepare a monomer solution. After 10 percent by weight of the monomer solution was heated to 75 degrees C.

in an argon atmosphere, a solution in which 0.381 g (2.32 mmol) of 2,2'-azoiso(butylonitrile) (manufactured by Tokyo Chemical Industry Co., Ltd.) and 0.123 g (1.16 mmol) of 3-mercapto propionic acid (manufactured by Tokyo Chemical Industry Co., Ltd.) were dissolved in the rest of the monomer solution was dripped to the heated monomer in 2 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 9.98 g of a copolymer RCP-22 (weight average molecular weight (Mw): 9,800, number average molecular weight (Mn): 3,600).

Preparation of Comparative Aqueous Ink RGJ-22

Comparative pigment dispersion RPD-22 was obtained in the same manner as in Example 201 except that the comparative copolymer RCP-22 was used instead of the copolymer in the preparation of the pigment dispersion of Example 201.

Thereafter, comparative aqueous ink RGJ-22 was obtained in the same manner as in Example 201 except that the comparative pigment dispersion RPD-22 was used instead of the pigment dispersion 201 in the manufacturing of the ink 201 of Example 201.

Comparative Example 23: Synthesis of Comparative Copolymer RCP-23 and Preparation of Comparative Aqueous Ink RGJ-23

Synthesis of Comparative Copolymer RCP-23

Comparative copolymer RCP-23 (solid portion concentration: 30 percent) was obtained in the same manner as in Example 215 except that the monomer of the Chemical structure 14 was used instead of the monomer 1 of Chemical structure 1.

Preparation of Comparative Aqueous Ink RGJ-23

The aqueous solution 215 was prepared in the same manner as in Example 215. 22.50 parts of the cyan pigment dispersion CB-C23 (solid portion: 20.0 percent, same as the pigment dispersion 215) prepared in Example 215 was added to the aqueous solution 215 followed by stirring for 30 minutes. Furthermore, 6.67 parts of the comparative copolymer RCP-23 (solid portion concentration: 30 percent) was added followed by stirring for 30 minutes.

Thereafter, comparative aqueous ink RGJ-723 was obtained by filtering the resultant with a membrane filter having an average hole diameter of 0.8 μm.

Comparative Example 24: Preparation of Comparative Aqueous Ink RGJ-24

The aqueous solution 214 was prepared in the same manner as in Example 216. 37.50 parts of the magenta dispersion element CB-M23 (solid portion: 20.0 percent, same as the pigment dispersion 216) prepared in Example 216 was added to the aqueous solution 214 followed by stirring for 30 minutes. Furthermore, 6.67 parts of the comparative copolymer RCP-24 (solid portion concentration: 30 percent) was added followed by stirring for 30 minutes. Thereafter, comparative aqueous ink RGJ-24 was obtained by filtering the resultant with a membrane filter having an average hole diameter of 1.2 μm.

Comparative Example 25: Preparation of Comparative Aqueous Ink RGJ-25

Thereafter, comparative aqueous ink RGJ-25 was obtained in the same manner as in Example 217 except that the comparative pigment dispersion RPD-18 (i.e., dispersion element formed of comparative copolymer RCP-17) was used instead of the cyan pigment dispersion 211 in the manufacturing of the ink 217 of Example 217 and the comparative copolymer RCP-23 was used instead of the copolymer 215 used in Example 217.

The results of the pigment dispersions are shown in Table 9 and the results of the aqueous inks are shown in Table 10.

TABLE 9

| Copolymer | Pigment dispersion | Copolymer | Coloring material | Storage stability of pigment dispersion |
|---|---|---|---|---|
| Example 201 | Pigment dispersion 201 | Copolymer 201 | Carbon black | A |
| Example 202 | Pigment dispersion 202 | Copolymer 202 | Carbon black | A |
| Example 203 | Pigment dispersion 203 | Copolymer 203 | Carbon black | A |
| Example 204 | Pigment dispersion 204 | Copolymer 204 | Carbon black | B |
| Example 205 | Pigment dispersion 205 | Copolymer 205 | Carbon black | A |
| Example 206 | Pigment dispersion 206 | Copolymer 206 | Carbon black | A |
| Example 207 | Pigment dispersion 207 | Copolymer 207 | Carbon black | A |
| Example 208 | Pigment dispersion 208 | Copolymer 208 | Carbon black | A |
| Example 209 | Pigment dispersion 209 | Copolymer 209 | Carbon black | B |
| Example 210 | Pigment dispersion 210 | Copolymer 210 | Carbon black | B |
| Example 211 | Pigment dispersion 211 | Copolymer 211 | Cyan pigment | A |
| Example 212 | Pigment dispersion 212 | Copolymer 212 | Magenta pigment | A |
| Example 213 | Pigment dispersion 213 | Copolymer 213 | Yellow pigment | A |
| Comparative Example 17 | RPD-17 | RCP-17 | Carbon Black | C |
| Comparative Example 18 | RPD-18 | RCP-17 | Cyan pigment | C |
| Comparative Example 19 | RPD-19 | RCP-17 | Magenta pigment | C |
| Comparative Example 20 | RPD-20 | RCP-17 | Yellow pigment | C |
| Comparative Example 21 | RPD-21 | RCP-21 | Carbon Black | C |
| Comparative Example 22 | RPD-22 | RCP-22 | Carbon Black | C |

Characteristics of the pigment dispersions and aqueous inks prepared in Examples 201 to 217 and Comparative Examples 17 to 25 were evaluated in the following manner.

Storage Stability of Pigment Dispersion

A glass container was filled with each pigment dispersion and stored at 70 degrees C. for two weeks. The change rate of the viscosity after storage to the viscosity before storage was obtained from the following relation and evaluated according to the following criteria.

Change rate of viscosity (%)=(Viscosity of pigment dispersion after storage)/viscosity of pigment dispersion before storage)×100

The viscosity was measured by a viscometer (RE80L, manufactured by TOKI SANGYO CO., LTD.) to measure the viscosity of the ink at 25 degrees C. at 50 rotations.

Evaluation Criteria

A: Change rate of viscosity within + or −5%

B: Change rate of viscosity within the range of from −8% to less than −5% and more than 5% to 8%

C: Change rate of viscosity within −10% to less than −8% and greater than 8% to 10%.
D: Change rate of viscosity within the range of from less than −10% to −30% and more than 10% to 30%
E: Change rate of viscosity less than 30% or greater than 30% (gelated to the degree that evaluation was not possible)

Storage Stability of Ink

An ink cartridge was filled with each ink and stored at 70 degrees C. for one week. The change rate of the viscosity after storage to the viscosity before storage was obtained from the following relation and evaluated according to the following criteria.

The change rate of viscosity (%)=(Viscosity of ink after storage)/(viscosity of ink before storage)×100

The viscosity was measured by a viscometer (RE80L, manufactured by TOKI SANGYO CO., LTD.) to measure the viscosity of the ink at 25 degrees C. at 50 rotations.

Evaluation Criteria
A: Change rate of viscosity within + or −5%
B: Change rate of viscosity within the range of from −8% to less than −5% and more than 5% to 8%
C: Change rate of viscosity within −10% to less than −8% and greater than 8% to 10%.
D: Change rate of viscosity within the range of from less than −10% to −30% and more than 10% to 30%
E: change rate of viscosity less than 30% or greater than 30% (gelated to the degree that evaluation was not possible)

Image Density

An inkjet printer (IPSiO GX5000) was filled with each ink at 23 degrees C. and 50 percent RH. A chart including general symbols of 64 point JIS.X.0208 (1997) and 2223 made by Microsoft Word 2000 (manufactured by Microsoft Corporation) was printed on plain paper 1 (Xerox 4200, manufactured by Xerox Corporation) and paper 2 (My Paper, manufactured by Ricoh Company Ltd. The symbol portion on image surface was measured by X-Rite 938 (manufactured by X-Rite Inc.) and evaluated according to the following criteria.

The printing mode used was: A modified mode in which "Plain Paper—Standard Fast" was modified to "No Color Calibration" from the user setting for plain paper by the driver installed onto the printer.

Incidentally, the symbols of JIS X 0208 (1997) and 2223 have squares for the exterior and the inside thereof is entirely painted with ink.

Evaluation Criteria
A: 1.25 or higher
B: 1.20 to less than 1.25
C: 1.10 to less than 1.20
D: Less than 1.10
E: pigment was gelated and not dispersed, impossible to print symbols.

Beading

The general symbols of JIS X 0208 (1997) and 2223 of were printed in the same manner as for Image Density except that the print mode was changed to the mode "gloss paper—fast" using LumiArt Gloss 90 GSM™ (manufactured by Stora Enso Japan K.K.) as the recording medium and the printed symbols were evaluated according to the following criteria.

Evaluation Criteria
A: No beading or beading occurred to less than 10% of the entire image
B: Beading occurred to 10% to less than 20% of the entire image
C: Beading occurred to 20% to less than 40% of the entire image
D: Beading occurred to 40% to less than 90% of the entire image
E: Beading occurred to 90% or more of the entire image
F: Gelated pigment not dispersed, impossible to print symbols

TABLE 10

| Example | Ink | Dispersion element of pigment | Copolymer | Usage | Coloring material |
|---|---|---|---|---|---|
| Example 201 | Ink 201 | Pigment dispersion 201 | Copolymer 201 | Pigment dispersion | Carbon black |
| Example 202 | Ink 202 | Pigment dispersion 202 | Copolymer 202 | Pigment dispersion | Carbon black |
| Example 203 | Ink 203 | Pigment dispersion 203 | Copolymer 203 | Pigment dispersion | Carbon black |
| Example 204 | Ink 204 | Pigment dispersion 204 | Copolymer 204 | Pigment dispersion | Carbon black |
| Example 205 | Ink 205 | Pigment dispersion 205 | Copolymer 205 | Pigment dispersion | Carbon black |
| Example 206 | Ink 206 | Pigment dispersion 206 | Copolymer 206 | Pigment dispersion | Carbon black |
| Example 207 | Ink 207 | Pigment dispersion 207 | Copolymer 207 | Pigment dispersion | Carbon black |
| Example 208 | Ink 208 | Pigment dispersion 208 | Copolymer 208 | Pigment dispersion | Carbon black |
| Example 209 | Ink 209 | Pigment dispersion 209 | Copolymer 209 | Pigment dispersion | Carbon black |
| Example 210 | Ink 210 | Pigment dispersion 210 | Copolymer 210 | Pigment dispersion | Carbon black |
| Example 211 | Ink 211 | Pigment dispersion 211 | Copolymer 201 | Pigment dispersion | Cyan pigment |
| Example 212 | Ink 212 | Pigment dispersion 212 | Copolymer 201 | Pigment dispersion | Magenta pigment |
| Example 213 | Ink 213 | Pigment dispersion 213 | Copolymer 201 | Pigment dispersion | Yellow pigment |
| Example 214 | Ink 214 | Pigment dispersion 214 | Copolymer 214 | Addition | Carbon black |

TABLE 10-continued

| Example | Ink | Pigment dispersion | Copolymer | | Pigment |
|---|---|---|---|---|---|
| Example 215 | Ink 215 | Pigment dispersion 215 | Copolymer 215 | Addition | Cyan pigment |
| Example 216 | Ink 216 | Pigment dispersion 216 | Copolymer 215 | Addition | Magenta pigment |
| Example 217 | Ink 217 | Pigment dispersion 217 | Copolymer 201 + 2115 | Pigment dispersion, addition | Cyan pigment |
| Comparative Example 17 | RGJ-17 | RPD-17 | RCP-17 | Pigment dispersion | Carbon black |
| Comparative Example 18 | RGJ-18 | RPD-18 | RCP-17 | Pigment dispersion | Cyan pigment |
| Comparative Example 19 | RGJ-19 | RPD-19 | RCP-17 | Pigment dispersion | Magenta pigment |
| Comparative Example 20 | RGJ-20 | RPD-20 | RCP-17 | Pigment dispersion | Yellow pigment |
| Comparative Example 21 | RGJ-21 | RPD-21 | RCP-21 | Pigment dispersion | Carbon black |
| Comparative Example 22 | RGJ-22 | RPD-22 | RCP-22 | Pigment dispersion | Carbon black |
| Comparative Example 23 | RGJ-23 | CB-C23 | RCP-23 | Addition | Cyan pigment |
| Comparative Example 24 | RGJ-24 | CB-M24 | RCP-23 | Addition | Magenta pigment |
| Comparative Example 25 | RGJ-25 | RPD-18 | RCP-17 + RCP-23 | Pigment dispersion, addition | Cyan pigment |

| | Ink | Image Density | | |
|---|---|---|---|---|
| Example | Storage Stability | Plain paper 1 | Plain paper 2 | Beading |
| Example 201 | A | A | A | A |
| Example 202 | A | A | A | A |
| Example 203 | A | A | A | A |
| Example 204 | B | A | A | A |
| Example 205 | A | A | A | B. |
| Example 206 | A | A | A | A |
| Example 207 | B | A | A | A |
| Example 208 | A | A | A | A |
| Example 209 | B | A | A | A |
| Example 210 | B | A | A | A |
| Example 211 | A | A | A | B. |
| Example 212 | A | A | A | B. |
| Example 213 | A | A | A | A |
| Example 214 | A | A | A | A |
| Example 215 | A | A | A | A |
| Example 216 | B | A | A | A |
| Example 217 | A | A | A | A |
| Comparative Example 17 | D | C | D | D |
| Comparative Example 18 | E | D | D | F |
| Comparative Example 19 | E | D | D | F |
| Comparative Example 20 | E | D | D | F |
| Comparative Example 21 | E | C | D | D |
| Comparative Example 22 | E | C | D | D |
| Comparative Example 23 | E | C | C | C |
| Comparative Example 24 | E | C | C | C |
| Comparative Example 25 | E | E | E | F |

The pigment dispersions prepared by using copolymers having a naphtyl group at their end of the side chain of Examples 201 to 213 have excellent storage stability in comparison with the pigment dispersions prepared by using copolymers having no naphtyl group at their end of the side chain of Comparative Examples 17 to 21. This is inferred to be the result of improved adsorption property to the pigment due to the π-π interaction between the naphtyl group in the copolymer and the pigment The inks manufactured by using the dispersion elements formed of the copolymers having a naphtyl group at the end of the side chain thereof in Examples 201 to 213 and 217 have high levels of storage stability and are excellent with regard to image density and beading in comparison with the inks manufactured by using the dispersion elements formed of the copolymers having no naphtyl group at the end of the side chain thereof in Comparative Examples 17 to 21 and 25.

Moreover, the inks manufactured by adding emulsions formed of the copolymers having a naphtyl group at their end of the side chain of Examples 214 to 217 are particularly excellent with regard to beading in comparison with the inks manufactured by adding emulsions formed of the copolymers having no naphtyl group at their end of the side chain thereof of Comparative Examples 22 to 24. This is inferred that, due to π-π stacking between the naphtyl group present in the emulsion and the pigment in the ink, the pigment rapidly agglomerates on the surface of a recording medium during printing, thereby to prevent occurrence of beading.

Having now fully described embodiments of the present invention, it will be apparent to one of ordinary skill in the art that many changes and modifications can be made thereto without departing from the spirit and scope of embodiments of the invention as set forth herein.

What is claimed is:

1. A copolymer, comprising:
a structure unit represented by Chemical Formula I:

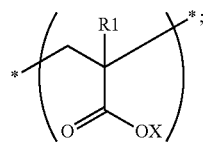

Chemical Formula I and
a structure unit represented by Chemical Formula II:

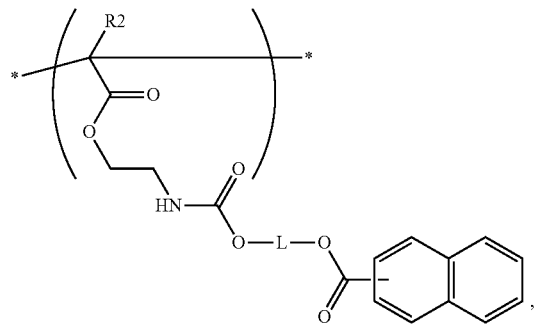

Chemical Formula II wherein:
R1 and R2 each, independently represent hydrogen atoms or methyl groups;
X represents a hydrogen atom or a cation; and
L represents an alkylene group having 2 to 18 carbon atoms.

2. The copolymer according to claim 1, further comprising a structure unit represented by Chemical Formula III:

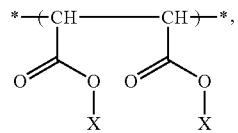

Chemical formula III wherein each X, independently, represents a hydrogen atom or a cation.

3. The copolymer according to claim 1, further comprising:
at least one of a structure unit represented by Chemical Formula IV or a structure unit represented by Chemical Formula V:

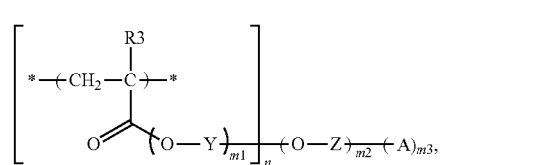

Chemical Formula IV

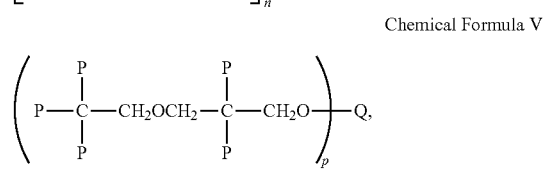

Chemical Formula V wherein:
R3 represents a hydrogen atom or a methyl group;
Y represents a divalent organic group;
Z represents a (n+m3) valent organic group having 1 to 15 carbon atoms;
A represents a substituted or non-substituted monovalent alkyl group, a substituted or non-substituted monovalent aryl group, or a substituted or non-substituted monovalent heteroaryl group;
n ranges from 1 to 15;
m1, m2, and m3 each, independently, represent 0 or 1;
P is represented by Chemical formula VI;

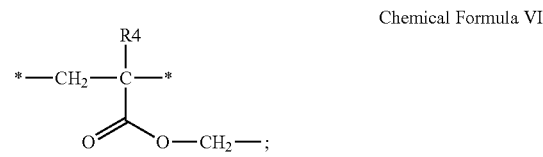

Chemical Formula VI

Q represents an alkylene group having 1 to 6 carbon atoms or p-valent organic group having 1 to 6 nitrogen atoms, 1 to 6 oxygen atoms, and 2 to 40 hydrogen atoms, where p represents 2 or 3; and
R4 represents a hydrogen atom or a methyl group.

4. The copolymer according to claim 1, further comprising:
a structure unit represented by Chemical Formula VII:

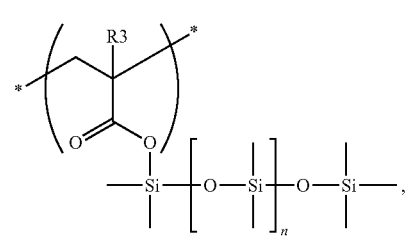

Chemical Formula VII wherein:
R3 represents a hydrogen atom or a methyl group; and
n represents an integer of from 2 to 300.

5. The copolymer according to claim 1, wherein a molar ratio of the structure unit represented by Chemical formula I to the structure unit represented by Chemical formula II ranges from 0.5:1 to 3:1.

6. The copolymer according to claim 2, wherein a molar ratio of the structure unit represented by Chemical formula I to the structure unit represented by Chemical formula II to the structure unit represented by Chemical formula III ranges from 0.25 to 1.5:1:0.25 to 1.5.

7. The copolymer according to claim 3, wherein a molar ratio of the structure unit represented by Chemical formula I to the structure unit represented by Chemical formula II to the structure unit represented by Chemical formula IV ranges from 0.5 to 3:1:0.01 to 0.15.

8. The copolymer according to claim 4, wherein the structure unit represented by Chemical formula VII accounts for 1% by weight to 12% by weight of a total amount of the copolymer.

9. The copolymer according to claim 1, wherein L in the structure unit represented by Chemical formula II represents an alkylene group having 2 to 12 carbon atoms.

10. An aqueous ink, comprising:
   water;
   a coloring material; and
   the copolymer of claim 1.

11. The aqueous ink according to claim 10, wherein the coloring material is a pigment.

12. The aqueous ink according to claim 10, further comprising:
   at least one water soluble organic solvent or at least one surfactant.

13. An ink cartridge, comprising:
   a container accommodating an aqueous ink comprising water, a coloring material, and the copolymer of claim 1.

* * * * *